(12) United States Patent
Kako

(10) Patent No.: US 8,306,065 B2
(45) Date of Patent: Nov. 6, 2012

(54) DATA DISTRIBUTION APPARATUS, RELAY APPARATUS AND DATA DISTRIBUTION METHOD

(75) Inventor: Masaharu Kako, Osaka (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 12/569,317

(22) Filed: Sep. 29, 2009

(65) Prior Publication Data

US 2010/0103932 A1 Apr. 29, 2010

(30) Foreign Application Priority Data

Oct. 23, 2008 (JP) ................................ 2008-273501

(51) Int. Cl.
*H04J 3/24* (2006.01)
(52) U.S. Cl. ........................................ 370/474; 370/473
(58) Field of Classification Search ........................ None
See application file for complete search history.

(56) References Cited

U.S. PATENT DOCUMENTS

| | | | | |
|---|---|---|---|---|
| 6,349,097 B1* | 2/2002 | Smith | ........................... | 370/390 |
| 6,721,335 B1* | 4/2004 | Gregg | ........................... | 370/473 |
| 6,859,442 B1* | 2/2005 | Agarwal et al. | ............... | 370/316 |
| 7,590,721 B2* | 9/2009 | Alfano | ........................... | 709/223 |
| 2002/0131425 A1* | 9/2002 | Shalom | ........................ | 370/401 |
| 2003/0174699 A1* | 9/2003 | Van Asten et al. | ............ | 370/389 |
| 2004/0264459 A1* | 12/2004 | Yun | ................................ | 370/389 |

FOREIGN PATENT DOCUMENTS

JP 10-257001 9/1998

* cited by examiner

*Primary Examiner* — Robert Wilson
(74) *Attorney, Agent, or Firm* — Staas & Halsey LLP

(57) ABSTRACT

A distribution apparatus includes a packet divider which divides contents data into multiple contents data and packetizing each of the divided contents data to generate a transfer packet. A priority degree setter assigns a phase to each transfer packet generated by the packet divider according to each position in contents data and sets, for each transfer packet to which the phase has been assigned, a priority degree indicating the degree of priority of being transmitted to a transmission destination. A packet transmitter transmits the transfer packets to which the priority degrees have been set by the priority degree setter, beginning with the top of the contents data. A phase controller, when one round of transmission of all the transfer packets by the packet transmitter ends, performs control so that the phase assigned to each of the transfer packets is changed.

8 Claims, 64 Drawing Sheets

*FIG. 5*

[CORRESPONDENCE TO PRIORITY DEGREE]

| PHASE[x] | PRIORITY DEGREE[Pr(x)] |
|---|---|
| 0 | T |
| 1+2k | 0 |
| 2(1+2k) | 1 |
| ⋮ | ⋮ |
| $2^i$(1+2k) | i |
| ⋮ | ⋮ |
| $2^{T-1}$(1+2k) | T−1 |

FIG. 6

[PROGRAM DISTRIBUTION CONTROL DATA]

| DISTRIBUTION STATE |
|---|
| i |
| Pn |
| TRANSMISSION INTERVAL |

[CORRESPONDENCE TO PRIORITY DEGREE]

| [x] | [Pr(x)] | ACCUMULATED FREQUENCY | SPEED RATIO (CLIENT RECEIVING SPEED / CONTENTS FOLDER TRANSMISSION SPEED) | | | | | | | | |
|---|---|---|---|---|---|---|---|---|---|---|---|
| | | | $1/2^T$ | | $1/2^{i+1}$ | $1/2^i$ | $1/2^{i-1}$ | | 1 | | |
| 0 | T | $1/2^T$ | △ | O | O | O | O | O | O | O | O |
| ... | ... | | × | | O | O | O | O | O | O | O |
| $2^{i+1}(1+2k)$ | i+1 | $1/2^{i+1}$ | × | × | ×/△ | O | O | O | O | O | O |
| $2^i(1+2k)$ | i | $1/2^i$ | × | × | × | × | O | O | O | O | O |
| $2^{i-1}(1+2k)$ | i−1 | $1/2^{i-1}$ | × | × | × | × | △ | O | O | O | O |
| ... | ... | | × | × | × | × | × | △ | O | O | O |
| 1+2k | 0 | 1 | × | × | × | × | × | × | ×/△ | O | O |

FIG. 9

| SPEED RATE (x) | SELECTIVELY RECEIVED PACKET |
|---|---|
| x≧1 | i, i+1, i+2, i+3, i+4, i+5, i+6, i+7, i+8, i+9, i+10, i+11, i+12, i+13, i+14, i+15, i+16, i+17, ··· |
| 1/2≦x<1 | i, i+2, i+4, i+6, i+8, i+10, i+12, i+14, i+16, ··· |
| 1/4≦x<1/2 | i, i+4, i+8, i+12, i+16, ··· |
| 1/8≦x<1/4 | i, i+8, i+16, ··· |
| 1/16≦x<1/8 | i, i+16, ··· |
| x<1/16 | NONE |

| Client | PACKET WHICH HAS BEEN SELECTIVELY RECEIVED |
|---|---|
| A | i, i+1, i+2, i+3, i+4, i+5, i+6, i+7, i+8, i+9, i+10, i+11, i+12, i+13, i+14, i+15, i+16, i+17, ··· |
| C, D | i, i+2, i+4, i+6, i+8, i+10, i+12, i+14, i+16, ··· |
| B | i, i+4, i+8, i+12, i+16, ··· |

| SPEED RATE(x) | SELECTIVELY RECEIVED PACKET |
|---|---|
| x≧1 | i, i+1, i+2, i+3, i+4, i+5, i+6, i+7, i+8, i+9, i+10, i+11, i+12, i+13, i+14, i+15, i+16, i+17, ... |
| 1/2≦x<1 | i+1, i+3, i+5, i+7, i+9, i+11, i+13, i+15, i+17, ... |
| 1/4≦x<1/2 | i+3, i+7, i+11, i+15, i+19, ... |
| 1/8≦x<1/4 | i+7, i+15, i+23, ... |
| 1/16≦x<1/8 | i+15, i+31, ... |
| x<1/16 | NONE |

| Client | PACKET WHICH HAS BEEN SELECTIVELY RECEIVED |
|---|---|
| A | i, i+1, i+2, i+3, i+4, i+5, i+6, i+7, i+8, i+9, i+10, i+11, i+12, i+13, i+14, i+15, i+16, i+17, ... |
| C, D | i, i+1, i+2, i+3, i+4, i+5, i+6, i+7, i+8, i+9, i+10, i+11, i+12, i+13, i+14, i+15, i+16, i+17, ... |
| B | i, i+3, i+4, i+7, i+8, i+11, i+12, i+15, i+16, i+19, ... |

FIG. 12

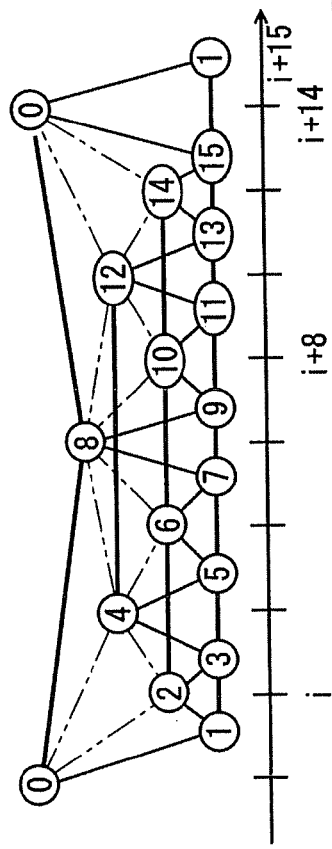

| SPEED RATE (x) | SELECTIVELY RECEIVED PACKET |
|---|---|
| $x \geq 1$ | $i, i+1, i+2, i+3, i+4, i+5, i+6, i+7, i+8, i+9, i+10, i+11, i+12, i+13, i+14, i+15, i+16, i+17, \ldots$ |
| $1/2 \leq x < 1$ | $i, i+2, i+4, i+6, i+8, i+10, i+12, i+14, i+16, \ldots$ |
| $1/4 \leq x < 1/2$ | $i+2, i+6, i+10, i+14, i+18, \ldots$ |
| $1/8 \leq x < 1/4$ | $i+6, i+14, i+22, \ldots$ |
| $1/16 \leq x < 1/8$ | $i+14, i+30, \ldots$ |
| $x < 1/16$ | NONE |

| Client | PACKET WHICH HAS BEEN SELECTIVELY RECEIVED |
|---|---|
| A | $i, i+1, i+2, i+3, i+4, i+5, i+6, i+7, i+8, i+9, i+10, i+11, i+12, i+13, i+14, i+15, i+16, i+17, \ldots$ |
| C, D | $i, i+1, i+2, i+3, i+4, i+5, i+6, i+7, i+8, i+9, i+10, i+11, i+12, i+13, i+14, i+15, i+16, i+17, \ldots$ |
| B | $i, i+2, i+3, i+4, i+6, i+7, i+8, i+10, i+11, i+12, i+14, i+15, i+16, i+18, i+19, \ldots$ |

FIG. 13

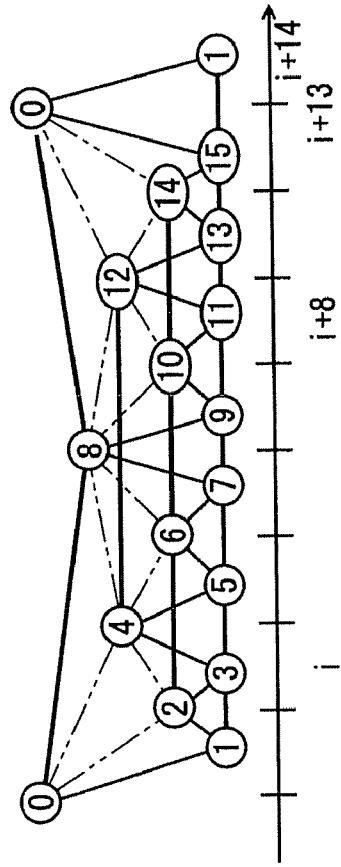

| SPEED RATE (x) | SELECTIVELY RECEIVED PACKET |
|---|---|
| $x \geq 1$ | i, i+1, i+2, i+3, i+4, i+5, i+6, i+7, i+8, i+9, i+10, i+11, i+12, i+13, i+14, i+15, i+16, i+17, ... |
| $1/2 \leq x < 1$ | i+1, i+3, i+5, i+7, i+9, i+11, i+13, i+15, i+17, ... |
| $1/4 \leq x < 1/2$ | i+1, i+5, i+9, i+13, i+17, ... |
| $1/8 \leq x < 1/4$ | i+5, i+13, i+21, ... |
| $1/16 \leq x < 1/8$ | i+13, i+29, ... |
| $x < 1/16$ | NONE |

| Client | PACKET WHICH HAS BEEN SELECTIVELY RECEIVED |
|---|---|
| A | i, i+1, i+2, i+3, i+4, i+5, i+6, i+7, i+8, i+9, i+10, i+11, i+12, i+13, i+14, i+15, i+16, i+17, ... |
| C, D | i, i+1, i+2, i+3, i+4, i+5, i+6, i+7, i+8, i+9, i+10, i+11, i+12, i+13, i+14, i+15, i+16, i+17, ... |
| B | i, i+1, i+2, i+3, i+4, i+5, i+6, i+7, i+8, i+9, i+10, i+11, i+12, i+13, i+14, i+15, i+16, i+17, ... |

FIG. 17A

[PROGRAM FILE DISTRIBUTION INFORMATION]

| FILENAME |
|---|
| FILE SIZE |
| DISTRIBUTION CHANNEL |

FIG. 17B

[RECEIVED SECTION INFORMATION TABLE]

| STARTING POSITION | ENDING POSITION |
|---|---|
| X1 | Y1 |
| ⋮ | ⋮ |
| Xi | Yi |
| ⋮ | ⋮ |

FIG. 18A

[RECEIVING STATE]

| THE NUMBER OF BYTES RECEIVED |
| --- |
| FINAL RECEIVING POSITION |
| PREVIOUS FINAL RECEIVING POSITION |

FIG. 18B

[PROGRAM TRANSFER PACKET]

| STARTING POSITION(SQN)=n*i |
| --- |
| THE NUMBER OF BYTES=n |
| PRIORITY DEGREE |
| PROGRAM FILE DIVIDED DATA #i |
| TRANSMISSION SOURCE |
| DESTINATION |

FIG. 23

[CORRESPONDENCE TO PRIORITY DEGREE]

| PHASE[x] | PRIORITY DEGREE [Pr(x)] |
|---|---|
| 0 | T |
| 1+2k | 0 |
| 2(1+2k) | 1 |
| ⋮ | ⋮ |
| $2^i$(1+2k) | i |
| ⋮ | ⋮ |
| $2^{T-1}$(1+2k) | T−1 |

[RECEIVING STATE AGGREGATION]

| EFFECTIVENESS DISPLAY |
|---|
| THE NUMBER OF BYTES RECEIVED |
| ESTIMATED TOTAL AMOUNT |
| ESTIMATED SPEED |
| RECEIVING RATE |
| EFFECTIVE SPEED |

[PROGRAM DISTRIBUTION CONTROL DATA]

| DISTRIBUTION STATE |
|---|
| i |
| Pn |
| TRANSMISSION INTERVAL |
| SPEED STATE |
| ACCELERATION RATE |
| ACCELERATION THRESHOLD (=y%) |
| TRANSITION-TO-ACCELERATION CONDITION THRESHOLD (=U) |
| TRANSITION-TO-ACCELERATION COUNT |
| DECELERATION THRESHOLD (=x%) |
| DISTRIBUTION SUSPENSION THRESHOLD |
| DISTRIBUTION SUSPENSION COUNT |
| MINIMUM TRANSMISSION INTERVAL RESTRICTION |

FIG. 24

[RECEIVED SECTION INFORMATION TABLE]

| STARTING POSITION | ENDING POSITION |
|---|---|
| X1 | Y1 |
|  |  |
| Xi | Yi |
|  |  |

[PROGRAM FILE DISTRIBUTION INFORMATION]

| FILENAME |
|---|
| FILE SIZE |
| DISTRIBUTION CHANNEL |

[RECEIVING STATE]

| THE NUMBER OF BYTES RECEIVED |
|---|
| FINAL RECEIVING POSITION |
| PREVIOUS FINAL RECEIVING POSITION |

| ACTIVATION CYCLE (=10 SEC) |
|---|

*FIG. 25*

| [RECEIVING STATE NOTIFICATION] |
|---|
| THE NUMBER OF BYTES RECEIVED |
| ESTIMATED TOTAL AMOUNT |
| ESTIMATED SPEED |
| RECEIVING RATE |

FIG. 29

[RECEIVING STATE AGGREGATION]

| EFFECTIVENESS DISPLAY |
|---|
| THE NUMBER OF BYTES RECEIVED |
| ESTIMATED TOTAL AMOUNT |
| ESTIMATED SPEED |
| RECEIVING RATE |
| EFFECTIVE SPEED |

*FIG. 32*

[CORRESPONDENCE TO PRIORITY DEGREE]

| PHASE[x] | PRIORITY DEGREE [Pr(x)] |
|---|---|
| 0 | T |
| 1+2k | 0 |
| 2(1+2k) | 1 |
| ⋮ | ⋮ |
| $2^i$(1+2k) | i |
| ⋮ | ⋮ |
| $2^{T-1}$(1+2k) | T−1 |

[RECEIVING STATE AGGREGATION]

| |
|---|
| EFFECTIVENESS DISPLAY |
| THE NUMBER OF BYTES RECEIVED |
| ESTIMATED TOTAL AMOUNT |
| ESTIMATED SPEED |
| RECEIVING RATE |
| EFFECTIVE SPEED |

[PROGRAM DISTRIBUTION CONTROL DATA]

| |
|---|
| DISTRIBUTION STATE |
| i |
| Pn |
| TRANSMISSION INTERVAL |
| WEIGHTED RECEIVING RATE |
| WEIGHTING RATE (%) |
| ACCELERATION RATE |
| DISTRIBUTION SUSPENSION THRESHOLD |
| DISTRIBUTION SUSPENSION COUNT |
| MINIMUM TRANSMISSION INTERVAL RESTRICTION |

FIG. 34

[CORRESPONDENCE TO PRIORITY DEGREE]

| [x] | [Pr(x)] |
|---|---|
| 0 | T |
| 1+2k | 0 |
| 2(1+2k) | 1 |
| ⋮ | ⋮ |
| $2^i$(1+2k) | i |
| ⋮ | ⋮ |
| $2^{T-1}$(1+2k) | T−1 |

[INITIAL PRIORITY DEGREE PHASE]
(FOR EACH PROGRAM FILE)

| Pn |
|---|
| TRANSMISSION SOURCE |
| DESTINATION |
| timer |

[PROGRAM DIVISION CONTROL DATA]
(FOR EACH COMMUNICATION INTERFACE)

| M |
|---|

*FIG. 37*

[RECEIVING STATE NOTIFICATION]

| THE NUMBER OF BYTES RECEIVED |
|---|
| ESTIMATED TOTAL AMOUNT |
| ESTIMATED SPEED |
| RECEIVING RATE |
| RETRANSMISSION STARTING POSITION |

FIG. 38

[CORRESPONDENCE TO PRIORITY DEGREE]

| PHASE[x] | PRIORITY DEGREE [Pr(x)] |
|---|---|
| 0 | T |
| 1+2k | 0 |
| 2(1+2k) | 1 |
| ⋮ | ⋮ |
| $2^i$(1+2k) | i |
| ⋮ | ⋮ |
| $2^{T-1}$(1+2k) | T−1 |

[RECEIVING STATE AGGREGATION]

| |
|---|
| EFFECTIVENESS DISPLAY |
| THE NUMBER OF BYTES RECEIVED |
| ESTIMATED TOTAL AMOUNT |
| ESTIMATED SPEED |
| RECEIVING RATE |
| EFFECTIVE SPEED |
| RETRANSMISSION STARTING POSITION |
| PREVIOUS RETRANSMISSION STARTING POSITION |

[PROGRAM DISTRIBUTION CONTROL DATA]

| |
|---|
| DISTRIBUTION STATE |
| i |
| Pn |
| TRANSMISSION INTERVAL |
| SPEED STATE |
| ACCELERATION RATE |
| ACCELERATION THRESHOLD (=y%) |
| TRANSITION-TO-ACCELERATION CONDITION THRESHOLD (=U) |
| TRANSITION-TO-ACCELERATION COUNT |
| DECELERATION THRESHOLD (=x%) |
| DISTRIBUTION SUSPENSION THRESHOLD |
| DISTRIBUTION SUSPENSION COUNT |
| MINIMUM TRANSMISSION INTERVAL RESTRICTION |
| RETRANSMISSION STARTING POSITION |

*FIG. 43*

[RECEIVING STATE AGGREGATION]

| |
|---|
| EFFECTIVENESS DISPLAY |
| THE NUMBER OF BYTES RECEIVED |
| ESTIMATED TOTAL AMOUNT |
| ESTIMATED SPEED |
| RECEIVING RATE |
| EFFECTIVE SPEED |
| RETRANSMISSION STARTING POSITION |
| PREVIOUS RETRANSMISSION STARTING POSITION |

*FIG. 46*

[CORRESPONDING TO PRIORITY DEGREE]

| [x] | [Pr(x)] |
|---|---|
| 0 | T |
| 1+2k | 0 |
| 2(1+2k) | 1 |
| ⋮ | ⋮ |
| $2^i$(1+2k) | i |
| ⋮ | ⋮ |
| $2^{T-1}$(1+2k) | T-1 |

[INITIAL PRIORITY DEGREE PHASE] (FOR EACH PROGRAM FILE)

| Pn |
|---|
| TRANSMISSION SOURCE |
| DESTINATION |
| timer |
| OBSERVATION TARGET |
| PRIORITY DEGREE |
| COUNTER |

[PROGRAM DIVISION CONTROL DATA] (FOR EACH COMMUNICATION INTERFACE)

| M |
|---|

DATA DISTRIBUTION APPARATUS, RELAY APPARATUS AND DATA DISTRIBUTION METHOD

CROSS-REFERENCE TO RELATED APPLICATIONS

This application is based upon and claims the benefit of priority of the prior Japanese Patent Application No. 2008-273501, filed on Oct. 23, 2008, the entire contents of which are incorporated herein by reference.

FIELD

The embodiments relate to a data distribution apparatus for transmitting contents data, a relay apparatus and a data distribution method.

BACKGROUND

Conventionally, a technique of performing distribution by unicast communication or multicast communication has been used as a method for distributing the same contents such as contents data (for example, a program file) to a lot of client apparatuses at the same time.

In the case of performing unicast distribution, a communication path is provided between a contents distribution apparatus and each client apparatus. Therefore, as the number of client apparatuses which perform downloading increases, the number of communication paths near the contents distribution apparatus increases, and the download time is lengthened.

On the other hand, in the case of performing multicast distribution, there may be a case where loss of data is caused and complete reconfiguration of contents on a the client side cannot be ensured. For example, when a client apparatus in a low-speed area is receiving contents, loss of a packet occurs in the client apparatus in the low-speed area if data is distributed at a speed exceeding the speed of the area of the client apparatus.

Therefore, in order to avoid the loss problem caused by multicast distribution, client apparatuses detect loss of a packet and, if a client apparatus detects loss of a packet, the client apparatus specifies a packet to be retransmitted, to the contents distribution apparatus. For example, Japanese Patent Laid-Open No. 10-257001 discloses a technique in which a contents distribution apparatus to which a packet to be retransmitted has been specified retransmits the specified packet immediately.

SUMMARY

According to an aspect of the embodiment, a distribution apparatus includes a packet divider which divides contents data into multiple contents data and packetizing each of the divided contents data to generate a transfer packet, a priority degree setter which assigns a phase to each transfer packet generated by the packet divider according to each position in the whole contents data and sets, for each transfer packet to which the phase has been assigned, a priority degree indicating the degree of priority of being transmitted to a transmission destination, a packet transmitter which sequentially transmits the transfer packets to which the priority degrees have been set by the priority degree setter, beginning with the top of the contents data, and a phase controller which, when one round of transmission of all the transfer packets by the packet transmitter ends, performs control so that the phase assigned to each of the transfer packets is changed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

The above-described embodiments of the present invention are intended as examples, and all embodiments of the present invention are not limited to including the features described above.

BRIEF DESCRIPTION OF THE DRAWINGS

FIG. 5 is a diagram illustrating an example of a priority correspondence table;

FIG. 6 is a diagram illustrating an example of program distribution control data;

FIG. 9 is a diagram illustrating the relation between speed ratio and distribution accuracy and the relation between phase and distribution accuracy;

FIG. 12 is a diagram for illustrating an example of transition of the contents distribution state;

FIG. 13 is a diagram for illustrating an example of transition of the contents distribution state;

FIG. 17A is a diagram illustrating an example of program file distribution information;

FIG. 17B is a diagram illustrating an example of a received section information table;

FIG. 18A is a diagram illustrating an example of a receiving state;

FIG. 18B is a diagram illustrating an example of the data configuration of a program transfer packet;

FIG. 23 is a diagram illustrating an example of the control data configuration of the contents distribution apparatus;

FIG. 24 is a diagram illustrating an example of the control data configuration of the client apparatus;

FIG. 25 is a diagram illustrating an example of the data configuration of a receiving state notification;

FIG. 29 is a diagram illustrating an example of the control data configuration of an aggregation apparatus;

FIG. 32 is a diagram for illustrating an example of the control data configuration of a contents distribution apparatus;

FIG. 34 is a diagram illustrating an example of the control data configuration of a relay apparatus;

FIG. 37 is a diagram illustrating an example of the data configuration of a receiving state notification;

FIG. 38 is a diagram illustrating an example of the control data configuration of a contents distribution apparatus;

FIG. 43 is a diagram illustrating an example of the control data configuration of an aggregation apparatus;

FIG. 46 is a diagram for illustrating an example of the control data configuration of a relay apparatus;

DESCRIPTION OF EMBODIMENTS

Figure 1:
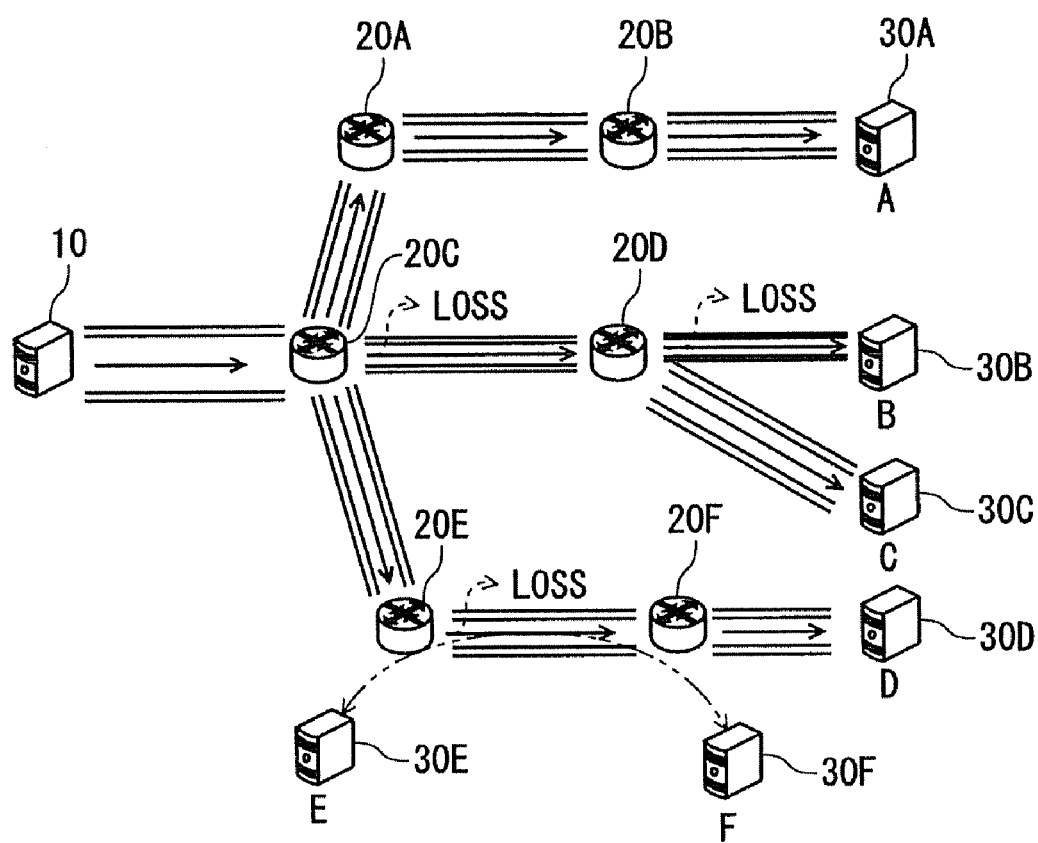
FIG. 1 is a diagram illustrating the network configuration of a multicast data distribution system according to a first embodiment.

Reference may now be made in detail to embodiments of the invention, examples of which are illustrated in the accompanying drawings, wherein like reference numerals refer to like elements throughout.

In conventional packet retransmission techniques, a contents distribution apparatus receives a packet request from each client apparatus and retransmits the packet requested by the client apparatus immediately.

Therefore, in the conventional packet retransmission techniques, if there are a lot of client apparatuses, a lot of retransmission requests are received, and each client apparatus stochastically receives a packet it needs, being influenced by other traffics in the network.

As a result, the conventional packet retransmission techniques have a problem that the time required for each client apparatus to receive all packets is lengthened.

Accordingly, the present invention has been made to solve the problem of the conventional techniques described above. One object may be to prevent the receiving time required for a client apparatus to receive all packets from being lengthened and efficiently transmit all the packets to the client apparatuses.

In order to solve the problem described above and achieve the object, the disclosed apparatus assigns a phase and sets a priority degree corresponding to the phase, for each transfer packet. The apparatus sequentially transmits the transfer packets for which the priority degrees are set, beginning with the top of contents data. Then, when one round of transmission of all the transfer packets ends, the disclosed apparatus necessarily performs control so that the phase assigned to each transfer packet is changed.

The disclosed apparatus has an advantage of being capable of preventing the time required for a client apparatus to receive all packets from being lengthened and efficiently transmitting all the packets to the client apparatus.

The data distribution apparatus, the relay apparatus, the data distribution method and the data distribution program according to the present invention will be described below with reference to accompanying drawings.

In the embodiment described below, the configurations and processing flows of a contents distribution apparatus, a relay apparatus and a client apparatus according to a first embodiment will be sequentially described, and the advantages of the first embodiment will be described last.

[Configuration of Contents Distribution Apparatus]

Figure 2A:
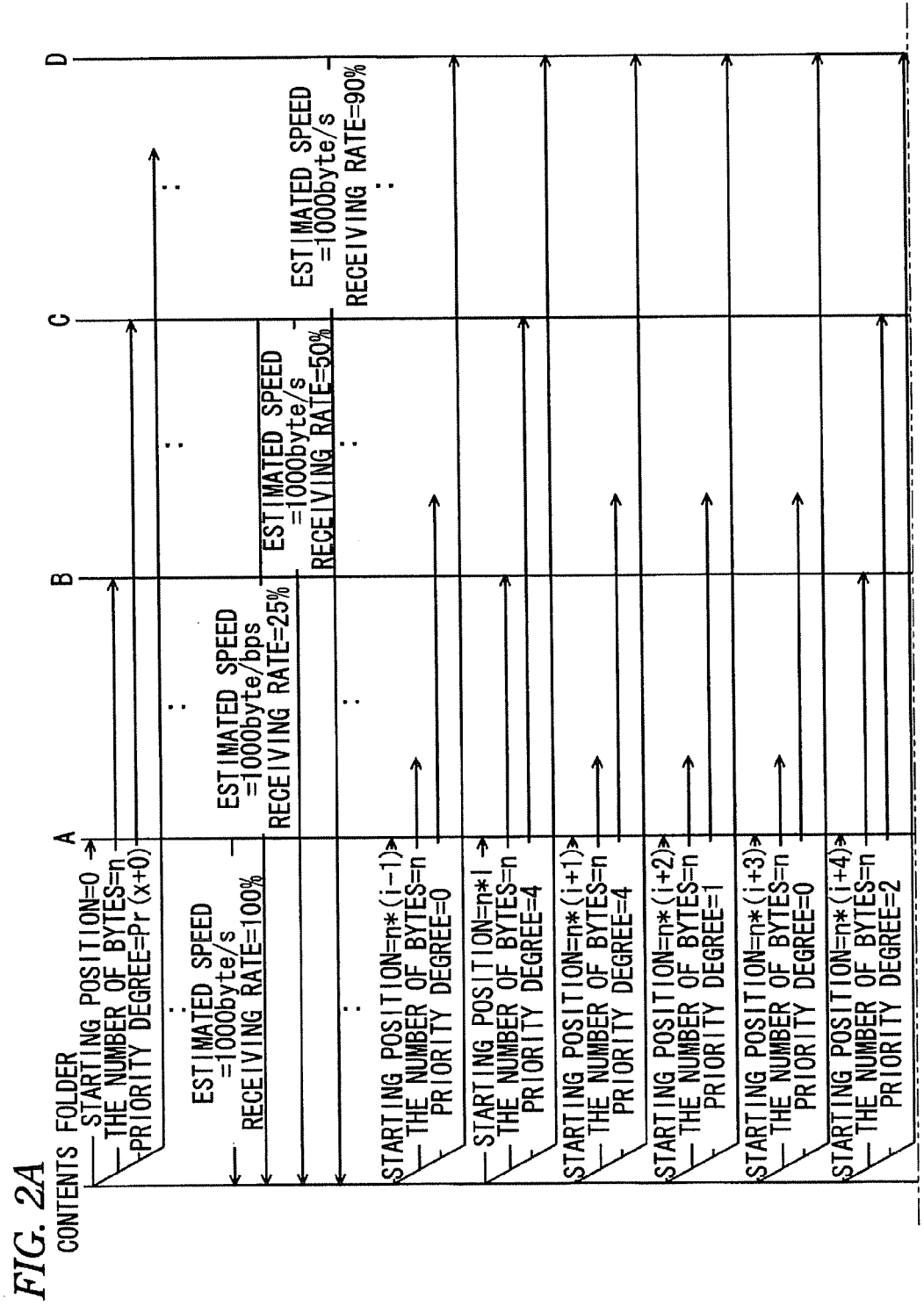
FIGS. 2A and 2B are diagrams for illustrating multicast distribution.
Figure 2B:
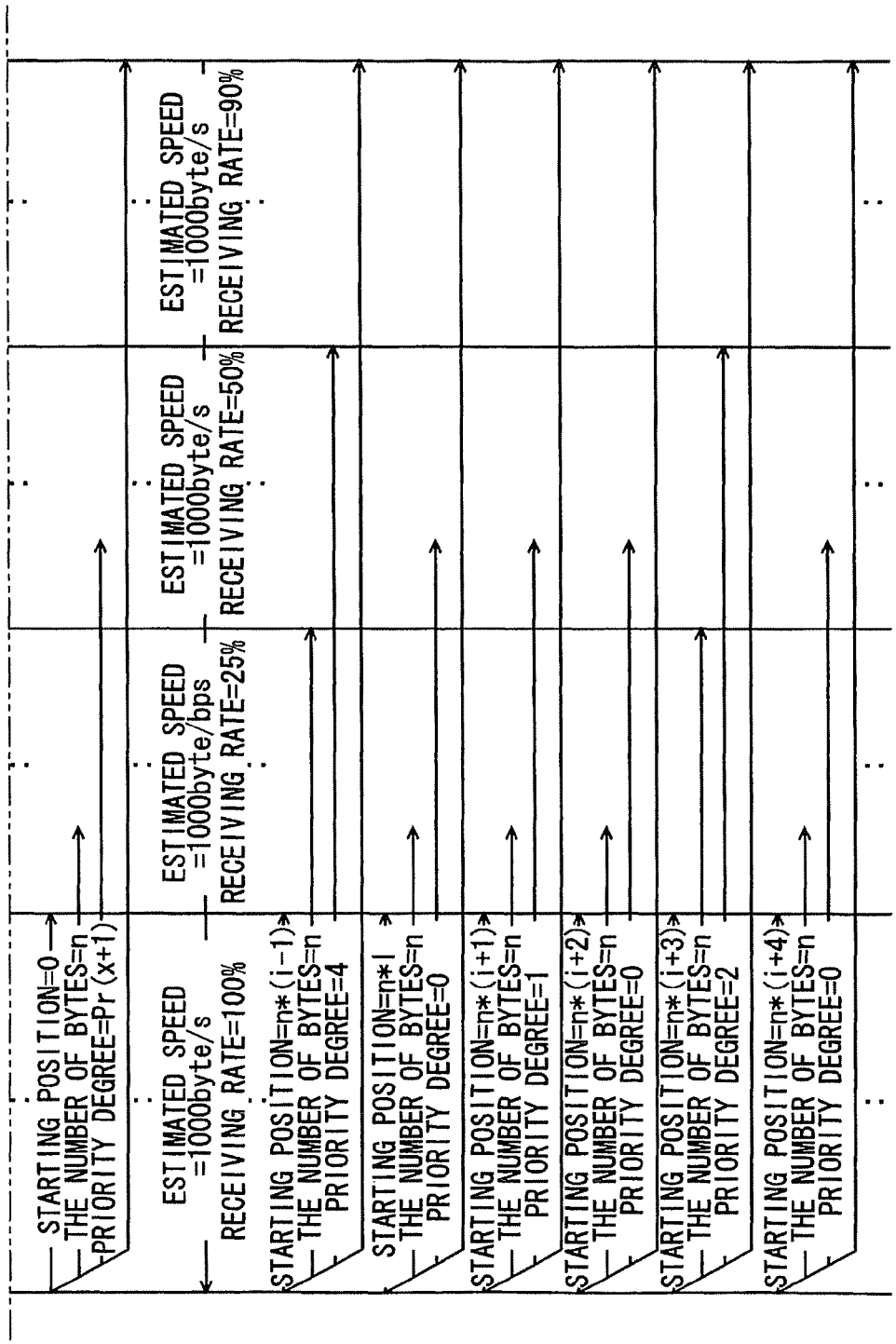
Figure 3:
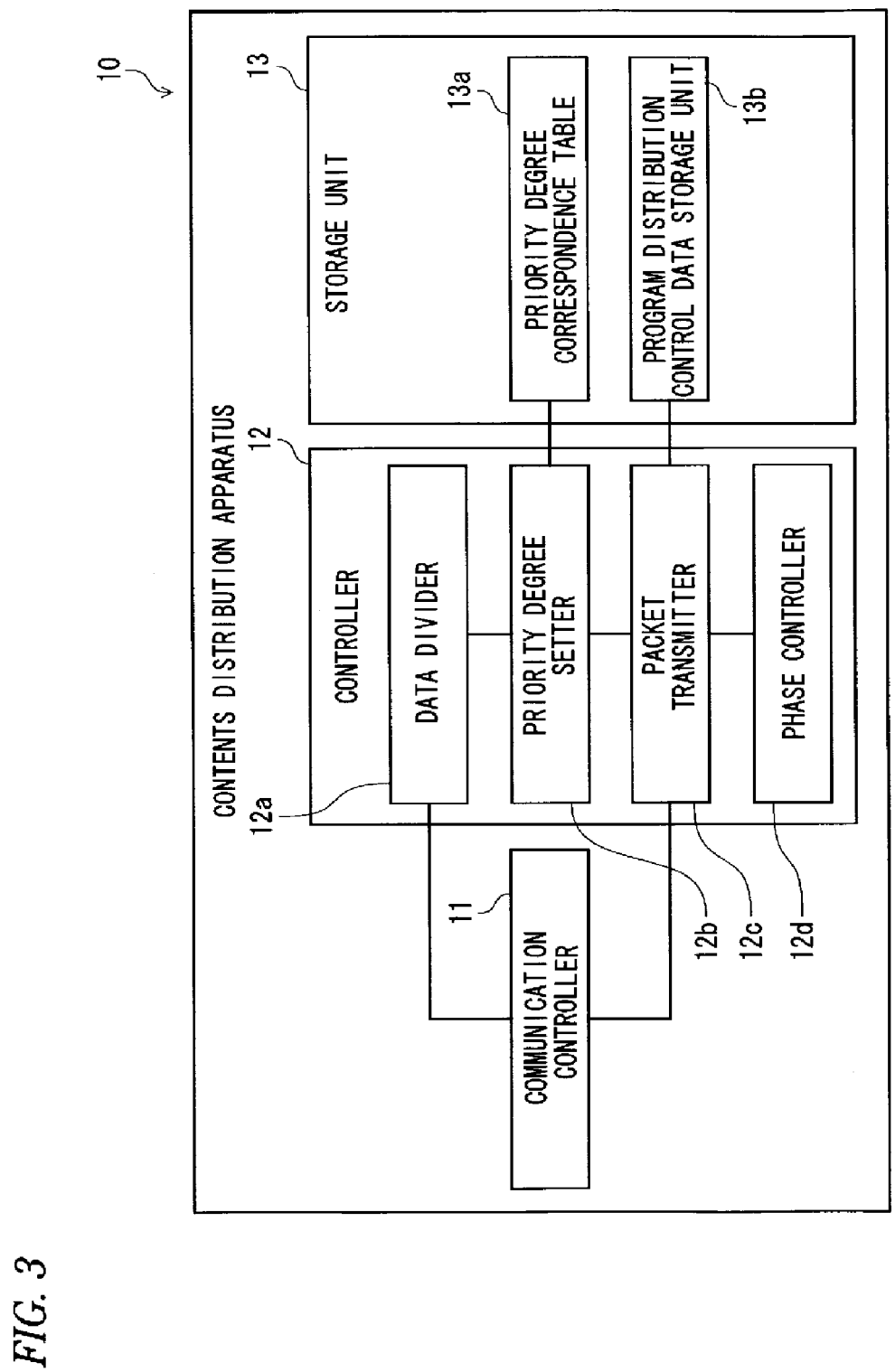
FIG. 3 is a block diagram illustrating the configuration of a contents distribution apparatus according to the first embodiment.
Figure 4A:
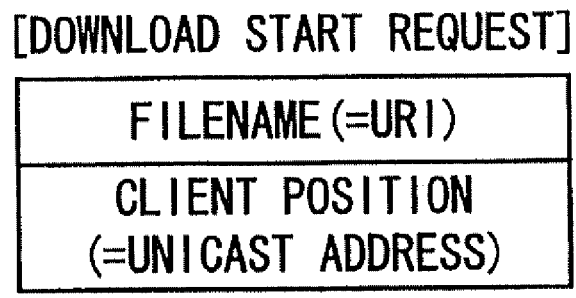
FIG. 4A is a diagram illustrating an example of the data configuration of a download start request.
Figure 4B:
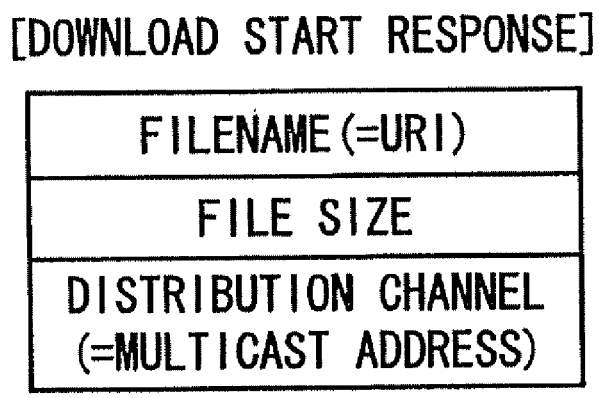
FIG. 4B is a diagram illustrating an example of the data configuration of a download start response.
Figure 7:
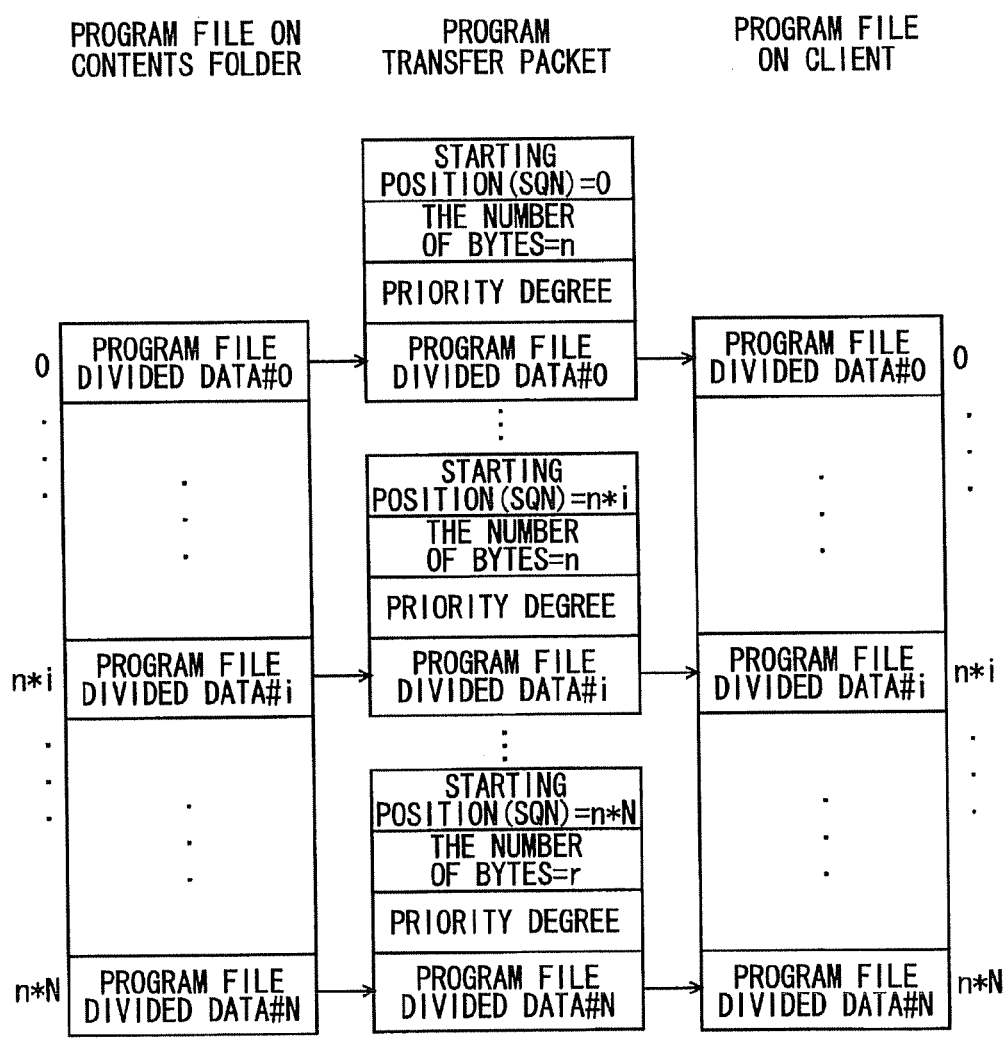
FIG. 7 is a diagram illustrating an example of division of a program transfer packet.
Figure 8:
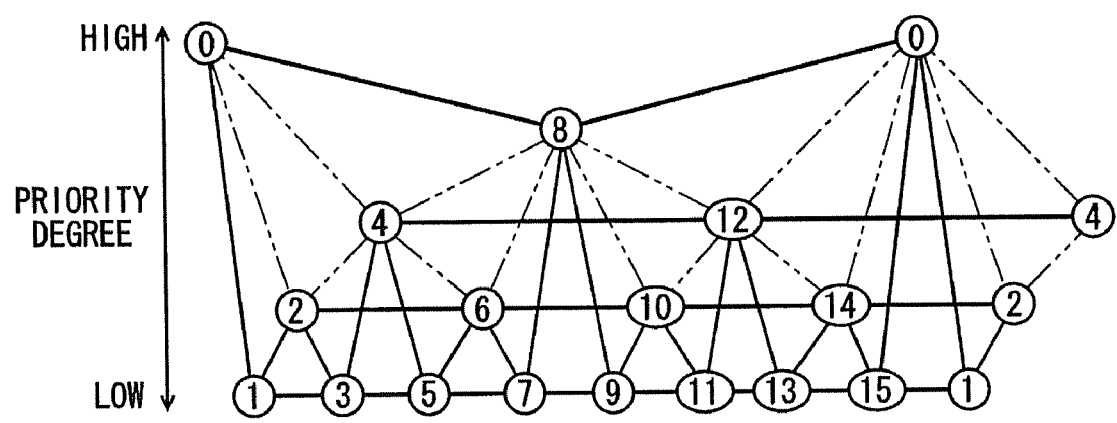
FIG. 8 is a diagram illustrating the relation between a phase and a priority degree corresponding to the phase.

First, the configuration of a contents distribution apparatus 10 will be described below with the use of FIGS. 1 to 14. FIG. 1 is a diagram illustrating the network configuration of a multicast data distribution system according to a first embodiment. FIGS. 2A and 2B are diagrams for illustrating multicast distribution. FIG. 3 is a block diagram illustrating the configuration of a contents distribution apparatus according to the first embodiment. FIGS. 4A and 4B are diagrams illustrating examples of the data configuration of a download start request and a download start response, respectively. FIG. 5 is a diagram illustrating an example of a priority correspondence table. FIG. 6 is a diagram illustrating an example of program distribution control data. FIG. 7 is a diagram illustrating an example of division of a program transfer packet. FIG. 8 is a diagram illustrating the relation between a phase and a priority degree corresponding to the phase. FIG. 9 is a diagram illustrating the relation between speed ratio and distribution accuracy based on a phase. FIGS. 10 to 14 are diagrams for illustrating examples of transition of a contents distribution state.

First, the network configuration of the multicast data distribution system which includes the contents distribution apparatus 10 according to the first embodiment will be described with the use of FIG. 1. As illustrated in the figure, the multicast data distribution system has the contents distribution apparatus (contents folder) 10, multiple relay apparatuses 20A to 20F and multiple client apparatuses 30A to 30F, which are connected via a network.

In the multicast data distribution system, the contents distribution apparatus 10 performs multicast distribution to the client apparatuses 30A to 30F via the relay apparatuses 20A to 20F. The packet receiving speeds of the client apparatuses 30A to 30F differ according to the areas where they are installed.

For example, as illustrated in FIGS. 2A and 2B, when the contents distribution apparatus 10 performs multicast distribution at a particular speed (for example, at a speed optimal for the client apparatus 30A), the clients 30A, 30B, 30C and 30D receive "100%", "25%", "50%" and "90%" of packets from the contents distribution apparatus 10, respectively.

Next, the configuration of the contents distribution apparatus 10 according to the first embodiment will be described with the use of FIG. 3. As illustrated in the figure, this contents distribution apparatus 10 has a communication controller 11, a controller 12 and a storage unit 13, and it is connected to the relay apparatuses 20 and the client apparatuses 30 via the network. The processing by each of these units will be described below.

The communication controller 11 controls communication for various information exchanged between the connected relay apparatuses 20 and client apparatuses 30. Specifically, the communication controller 11 performs multicast distribution to the client apparatuses 30A to 30F via the relay apparatuses 20A to 20F.

Furthermore, the communication controller 11 receives a download start request from a client apparatus 30 and returns a download start request response. Now, the data configurations of the download start request and the download start request response will be described with the use of FIGS. 4A and 4B.

As illustrated in FIG. 4A, the download start request response includes a filename of contents data requested to be downloaded and the position of the request-source client apparatus 30, as information. As illustrated in FIG. 4B, the download start request response further includes a distribution channel, which is a multicast address, as information together with the filename and the position of the client apparatus 30 (a unicast address) as information.

The storage unit 13 stores data and programs required for various processes performed by the controller 12. The storage unit 13, especially, has a priority degree correspondence table 13a and a program distribution control data storage unit 13b.

As illustrated in FIG. 5, a phase "x" and a priority degree "Pr(x)" corresponding to the phase are stored, being associated with each other in the priority degree correspondence table 13a. This priority degree correspondence table 13a is a table used by a priority degree setter 12b to be described later, to give a priority degree to each packet.

The program distribution control data storage unit 13b stores data for controlling program distribution processing. Specifically, the program distribution control data storage unit 13b stores a "distribution state" indicating a packet distribution state ("distributing" or "under suspension"), "i" indicating a sequence number, "Pn" indicating the number of transmission rounds, and a "transmission interval" indicating the interval between packet transmissions, as illustrated in FIG. 6.

The controller 12 has an internal memory for storing programs specifying various processes and necessary data and executes various processes using the programs and data. Especially, the controller 12 has a data divider 12a, a priority degree setter 12b, a packet transmitter 12c and a phase controller 12d.

The data divider 12a divides contents data at a particular length and packetizes each of the divided contents data to generate a program transfer packet. Specifically, when receiving a download start request from a client apparatus 30, the data divider 12a divides contents data (for example, a program file) at a particular length as illustrated in FIG. 7.

Then, the data divider 12a puts the divided program files onto program transfer packets to generate program transfer packets, and sends them to the priority degree setter 12b. A program file divider "n" is assumed to be a fixed value, and a power of two is desirable.

The priority degree setter 12b assigns a phase to each of the generated program transfer packets according to the divided data position in the whole contents data and sets a priority degree corresponding to the phase for each transfer packet. Specifically, the priority degree setter 12b assigns a phase to each program transfer packet received from the data divider 12a according to the divided data position in the whole contents data.

Then, the priority degree setter 12b acquires a priority degree Pr(x) corresponding to a phase "x" assigned to each program transfer packet from the priority degree correspondence table 13a, sets the priority degree to each transfer packet and sends it to the packet transmitter 12c.

Now, the relation between a phase and a priority degree corresponding to the phase will be described with the use of FIG. 8. In the example in FIG. 8, the values of 0 to 15 are phases, and it is shown that a value at a higher position in the figure is given a higher priority degree, and a value at a lower position in the figure is given a lower priority degree. The example in FIG. 8 shows an example of giving five kinds of priority degrees to the phases 0 to 15. In the contents distribution apparatus 10, priority degrees in a superposed wave shape are set for transfer packets, wherein setting of the "priority degrees" for the transfer packets vertically fluctuate, as illustrated in FIG. 8.

To explain this specifically, the superposed wave shape forms a shape in which priority and non-priority are repeated every time, priority and non-priority are furthermore repeated every two cycles and priority and non-priority are furthermore repeated every four cycles so that priority and non-priority are repeated every $2^i$ cycles.

That is, as illustrated in FIG. 8, the superposed shape forms a shape in which: priority (in the example in FIG. 8, phases 0, 2, 4, 6, 8, 10, 12 and 14) and non-priority (in the example in FIG. 8, phases 1, 3, 5, 7, 9, 11, 13 and 15) are repeated. Furthermore, by assuming the values given priority to be given primary priority, the values given the primary priority repeat priority (in the example in FIG. 8, phases 0, 4, 8, 12) and non-priority (in the example in FIG. 8, phases 2, 6, 10, 14). Furthermore, by assuming the values given priority among the values given the primary priority to be given secondary priority, the values given the secondary priority repeat priority (in the example in FIG. 8, phases 0 and 8) and non-priority (in the example in FIG. 8, phases 4 and 12). Furthermore, by assuming the values given priority among the values given the secondary priority to be given tertiary priority, the values given the tertiary priority repeat priority (in the example in FIG. 8, a phase 0) and non-priority (in the example in FIG. 8, phase 8).

The relation between the phase "x" and the priority degree "Pr(x)" corresponding to the phase "x" will be described with the use of FIG. 9. As illustrated in the figure, it is assumed that, when the phase "x" is an odd number "1+2k", the priority degree "Pr(x)" is "0". That is, that the priority degree "Pr(x)" is "0" means that the value is a non-priority value (in the example in FIG. 8, the phases 1, 3, 5, 7, 9, 11, 13 and 15). When the phase "x" is "0", the highest priority degree "k" is given.

When the priority degree of a phase "$2^i(1+2k)$" is "i" (for example, in the example in FIG. 8, when the priority degree of the phase "4" is "i"), the priority degree of a phase "$2^{i-1}(1+2k)$" is "i−1" (in the example in FIG. 8, the priority degrees of the phases "2" and "6" are lower than the priority degree of the phase "4" by one), and the priority degree of a phase "$2^{i-1}(1+2k)$" is "i+1" (that is, to explain this using the example in FIG. 8, the priority degree of the phase "8" is higher than the priority degree of the phase "4" by one).

As described above, in the contents distribution apparatus 10, priority degrees in a superposed wave shape are set for transfer packets, wherein priority and non-priority are repeated every time, priority and non-priority are furthermore repeated every two cycles, priority and non-priority are furthermore repeated every four cycles, and priority and non-priority are furthermore repeated every $2^i$ cycles.

The packet transmitter 12c sequentially transmits the program transfer packets for which priority degrees have been set, beginning with the top of the contents data. Specifically, if the distribution state in the program distribution control data stored in the program distribution control data storage unit 13b is "distributing", the packet transmitter 12c transmits the program transfer packets for which priority degrees have been set.

The packet transmitter 12c sequentially transmits the program transfer packets, and, when one round of transmission of the program transfer packets ends, notifies the phase controller 12d that one round has ended.

Then, when one round of transmission of all the transfer packets ends, the phase controller 12d performs control so that the phase assigned to each program transfer packet is changed. Specifically, when one round of transmission of the contents data ends, the phase controller 12d changes the phase of a priority degree corresponding to a sequence number (the position of divided data) by advancing the phase by one.

Description will be made on transition of the contents distribution state caused by changing the phases of priority degrees, with the use of the examples in FIGS. 10 to 14. FIGS. 10 to 14 illustrate the receiving states of the client apparatuses 30A, 30B, 30C and 30D in the case where the first to fifth rounds of contents data distribution have been performed.

In the examples in FIGS. 10 to 14, description will be made on an example in which, when the contents distribution apparatus 10 performs multicast distribution at a particular speed (for example, a speed optimal for the client 30A), the client 30A, the client 30B, and the clients 30C and 30D receive 100% (in the example in FIG. 10, at a speed ratio corresponding to x≧1), 25% (in the example in FIG. 10, at a speed ratio corresponding to ¼≦x<½) and 50% (in the example in FIG. 10, at a speed ratio corresponding to ½≦x<1) of packets from the contents distribution apparatus, respectively.

Figure 10:
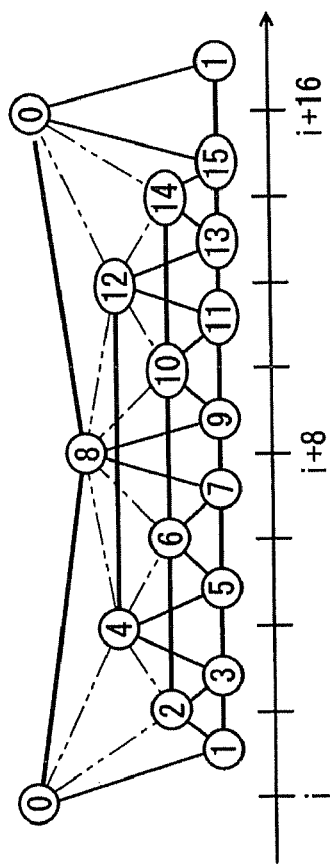
FIG. 10 is a diagram for illustrating an example of transition of a contents distribution state.

First, as illustrated in FIG. 10, the contents distribution apparatus 10 performs the first round of contents data distribution. In FIG. 10, for example, a phase "0" is assigned to a packet with the sequence number "i", and a priority degree corresponding to the phase "0" (in the example in FIG. 10, the highest priority degree corresponding to the phase "0") is set for the packet.

Here, the client apparatus 30A completes receiving of all the packets by the first round of contents data distribution. The client apparatus 30B receives ¼ of the packets by the first round of contents data distribution, and the client apparatuses 30C and 30D receive ½ of the packets.

Figure 11:
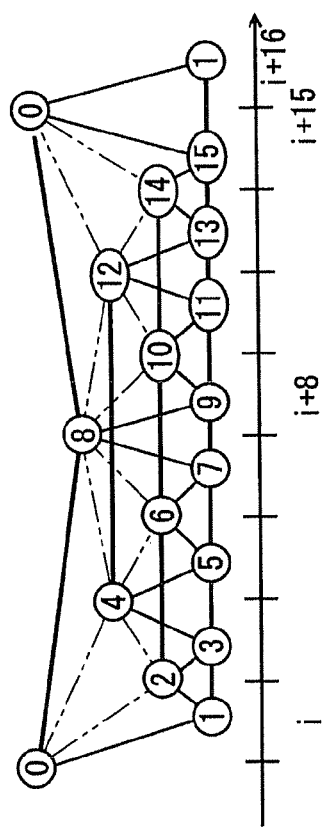
FIG. 11 is a diagram for illustrating an example of transition of the contents distribution state.

Next, as illustrated in FIG. 11, the contents distribution apparatus 10 changes the phases of priority degrees for the sequence numbers and performs the second round of contents data distribution. That is, in FIG. 11, for example, the phase for the packet with the sequence number "i" is changed to a phase "1", and a priority degree corresponding to the phase "1" (in the example in FIG. 11, the lowest priority degree corresponding to the phase "1") is set for the packet.

Here, the client apparatus 30B receives ½ of the packets by the second round of contents data distribution, and the client apparatuses 30C and 30D complete receiving of all the packets.

Figure 14:
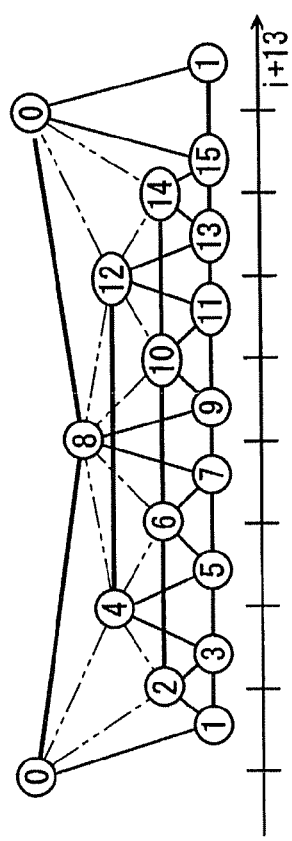
FIG. 14 is a diagram for illustrating an example of transition of the contents distribution state.

After that, in the third to fifth rounds of contents data distribution also, the phases of priority degrees are changed and contents data distribution processing is performed similarly, and the client apparatus 30B completes receiving of all the packets by the fourth round, as illustrated in FIGS. 12 to 14.

Here, each of the relation between speed ratio and distribution accuracy and the relation between a phase and distribution accuracy will be described with the use of FIG. 9. As illustrated in FIG. 9, the speed ratio is a value obtained by dividing the receiving speed of a client apparatus 30 by the transmission speed of the contents distribution apparatus 10. That is, in the case of a client apparatus 30 with a speed ratio of "1", loss of packets does not occur in principle.

As illustrated in FIG. 9, when a packet of the phase "0" with the highest priority degree "Pr(x)" is transmitted, the distribution accuracy is high even in the case of a client apparatus 30 with a low speed ratio. When a packet of the phase "1+2k" with the lowest priority degree "Pr(x)" is transmitted, the distribution accuracy is low.

As described above, the contents distribution apparatus 10 sequentially fluctuates the setting of the "priority degrees" of packets. That is, since the contents distribution apparatus 10 changes the priority degree of each packet to transmit the packet for each of the first, second . . . rounds, the relay apparatuses 20 selectively change a relay target for each of the first, second . . . rounds, so that all packets constituting contents can efficiently reach the client apparatuses 30.

[Configuration of Relay Apparatus]

Figure 15:
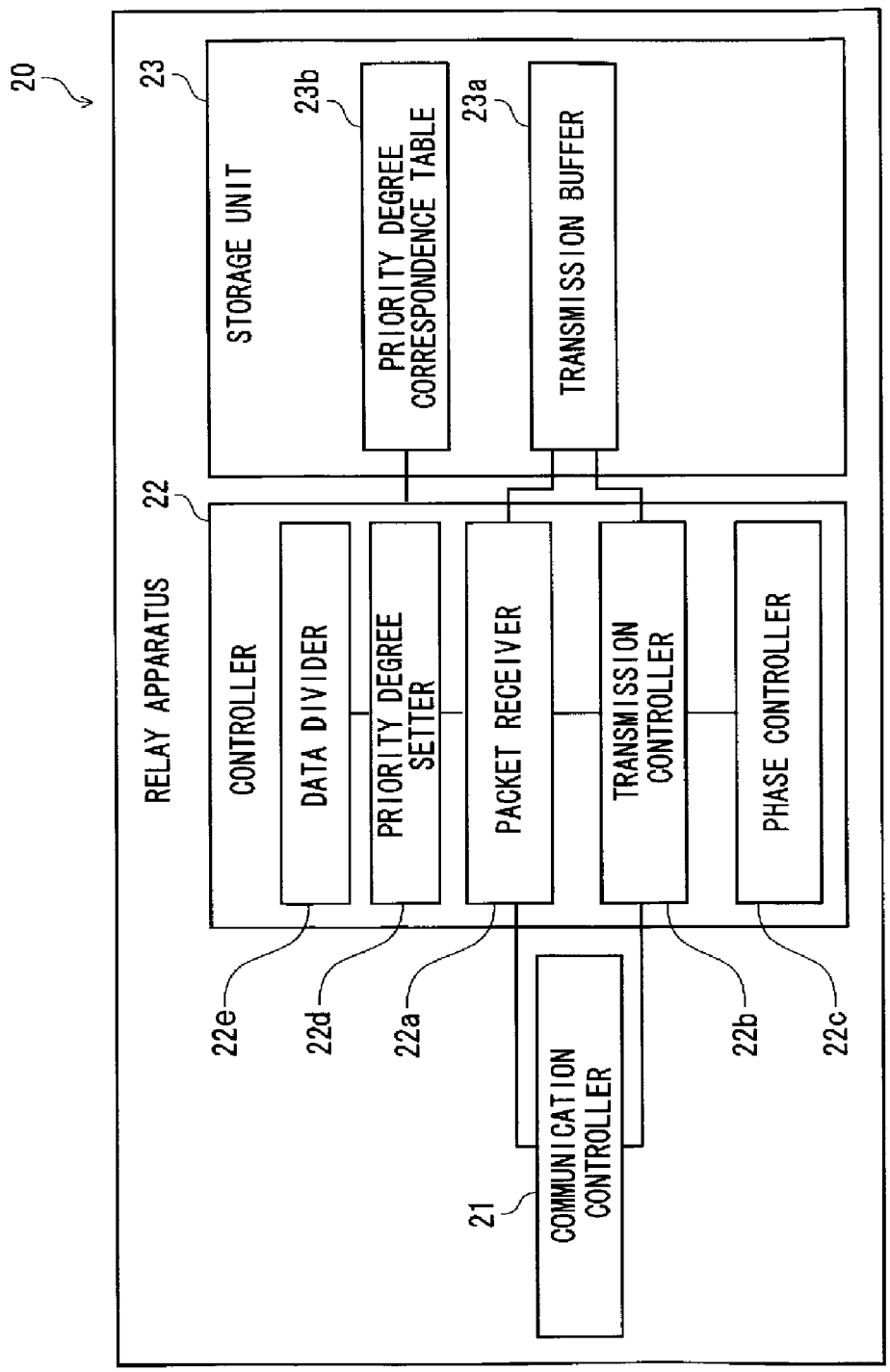
FIG. 15 is a block diagram illustrating the configuration of a relay apparatus according to the first embodiment.

Next, the configuration of the relay apparatus 20 illustrated in FIG. 1 will be described with the use of FIG. 15. FIG. 15 is a block diagram illustrating the configuration of the relay apparatus 20 according to the first embodiment. As illustrated in FIG. 15, this relay apparatus 20 has a communication controller 21, a controller 22, and a storage unit 23. The relay apparatus 20 is connected to the contents distribution apparatus 10 and a client apparatus 30 via the network, as shown in FIG. 1. The processing by each of these units will be described below.

The communication controller 21 controls communications for various information exchanged between the connected contents distribution apparatus 10 and client apparatus 30. Specifically, the communication controller 21 relays a multicast packet or a download start request response distributed from the contents distribution apparatus 10 to the client apparatus 30. Furthermore, the communication controller 21 relays a download start request transmitted from the client apparatus 30 to the contents distribution apparatus 10.

The storage unit 23 stores data and programs required for various processes performed by the controller 22, and especially, it has a transmission buffer 23a and a priority degree correspondence table 23b. The transmission buffer 23a stores a received program transfer packet.

The controller 22 has an internal memory for storing programs specifying various processes and necessary data and executes various processes using the programs and data. Especially, the controller 22 has a packet receiver 22a, a transmission controller 22b, a phase controller 22c, a priority degree setter 22d, and a data divider 22e.

The packet receiver 22a receives a multicast packet distributed to the client apparatus 30 from the contents distribution apparatus 10. Specifically, when receiving a program transfer packet from the contents distribution apparatus 10, the packet receiver 22a secures the transmission buffer 23a and judges whether the transmission buffer 23a is secured.

As a result, if the transmission buffer 23a is not secured, the packet receiver 22a judges whether the priority degree of the received program transfer packet is higher than the priority degree of a program transfer packet waiting to be transmitted and having the lowest priority degree.

If the transmission buffer 23a is secured, the packet receiver 22a copies the received program transfer packet to the transmission buffer 23a without discarding a program transfer packet waiting to be transmitted.

As a result, if the priority degree of the received program transfer packet is higher than the priority degree of the program transfer packet waiting to be transmitted and having the lowest priority degree, the packet receiver 22a cancels the transmission waiting state of the program transfer packet waiting to be transmitted and having the lowest priority degree. Then, the packet receiver 22a copies the received program transfer packet to the transmission buffer 23a.

If the priority degree of the received program transfer packet is higher than the priority degree of the program transfer packet waiting to be transmitted and having the lowest priority degree, the packet receiver 22a discards the received program transfer packet without copying it to the transmission buffer 23a.

That is, in the case of an excess of speed of the relay apparatus 20 (area shortage of the transmission buffer), a program transfer packet with a low priority degree is discarded, and a program transfer packet with a high priority degree is copied to the transmission buffer 23a.

The transmission controller 22b transmits a program transfer packet to the client apparatus 30. Specifically, the transmission controller 22b transmits a program transfer packet waiting to be transmitted, which is stored in the transmission buffer 23a, to the client apparatus 30.

That is, in the case of excess of the speed of the relay apparatus 20 (area shortage of the transmission buffer), a program transfer packet with a low priority degree is discarded, and a program transfer packet with a high priority degree is selectively relayed to the client apparatus 30.

The data divider 22e subdivides a transfer packet transmitted from a data distribution apparatus. The priority degree setter 22d assigns a phase to each transfer packet subdivided by the packet divider 22e, according to each division data position in the whole contents data stored in the priority degree correspondence table 23b, and resets a priority degree corresponding to the phase for each of the transfer packets. The phase controller 22c, when receiving the top of the transfer packets from the data distribution apparatus, performs control so that the phase assigned to each of the transfer packets is changed.

[Configuration of Client Apparatus]

Figure 16:
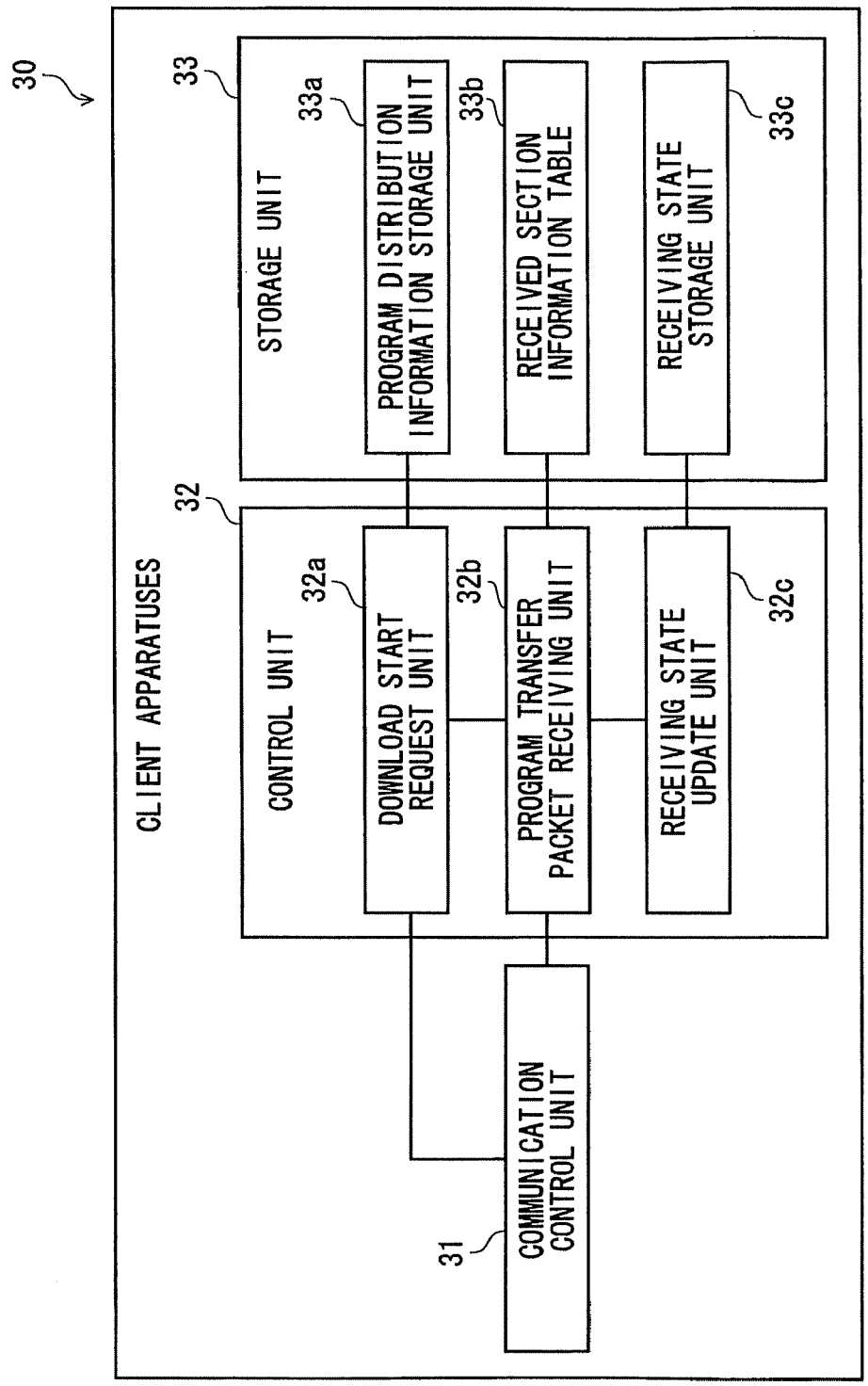
FIG. 16 is a block diagram illustrating the configuration of a client apparatus according to the first embodiment.

Next, the configuration of the client apparatus 30 illustrated in FIG. 1 will be described with the use of FIG. 16. FIG. 16 is a block diagram illustrating the configuration of the client apparatus 30 according to the first embodiment. As illustrated in the figure, this client apparatus 30 has a communication controller 31, a controller 32 and a storage unit 33, and it is connected to the contents distribution apparatus 10 and a relay apparatus 20 via the network. The processing by each of these units will be described below.

The communication controller 31 controls communications for various information exchanged between the connected contents distribution apparatus 10 and relay apparatus 20. Specifically, the communication controller 31 transmits a download start request to the contents distribution apparatus 10 via the relay apparatus 20. The communication controller 21 also receives a multicast packet or a download start request response distributed from the contents distribution apparatus 10 via the relay apparatus 20.

The storage unit 33 stores data and programs required for various processes performed by the controller 32. The storage unit 33, especially, has a program distribution information storage unit 33a, a received section information table 33b, and a receiving state storage unit 33c.

The program distribution information storage unit 33a stores program distribution information about program transfer packets distributed from the contents distribution apparatus 10. Specifically, the program distribution information storage unit 33a stores the "filename" of a distributed program file, the "file size" of the distributed program file, and a "distribution channel" indicating a multicast address, as illustrated in FIG. 17A.

The received section information table 33b stores divided data of a program file received from the contents distribution apparatus 10. Specifically, the received section information table 33b stores the starting positions and the ending positions of the received divided data of the program file as illustrated in FIG. 17B.

The receiving state storage unit 33c stores a program transfer packet receiving state. Specifically, the receiving state storage unit 33c stores "the number of bytes received" indicating the number of bytes of a program transfer packet, a "final receiving position" indicating the starting position of the received program transfer packets and a "previous final receiving position" indicating the starting position of program transfer packets received last, as illustrated in FIG. 18.

The controller 32 has an internal memory for storing programs specifying various processes and necessary data and executes various processes using the programs and data. Especially, the controller 32 has a download start request unit 32a, a program transfer packet receiver 32b and a receiving state update unit 32c.

The download start request unit 32a transmits a download start request to the contents distribution apparatus 10 via the relay apparatus 20, and receives a download start request response transmitted from the contents distribution apparatus 10 via the relay apparatus 20. Then, the download start request unit 32a causes information in the received download start request response to be stored into the program distribution information storage unit 33a.

The program transfer packet receiver 32b receives program transfer packets transmitted from the contents distribution apparatus 10 via the relay apparatus 20 and reconstructs a program file. Specifically, when receiving a program transfer packet illustrated in FIG. 18B, the program transfer packet receiver 32b stores that it has received divided data of a program file, of the received program transfer packet, into the received section information table 33b.

Each time the receiving state update unit 32c receives a program transfer packet, it updates the receiving state. Specifically, when receiving a program transfer packet, the receiving state update unit 32c updates the receiving state stored in the receiving state storage unit 33c.

[Processing by Contents Distribution Apparatus]

Figure 19:
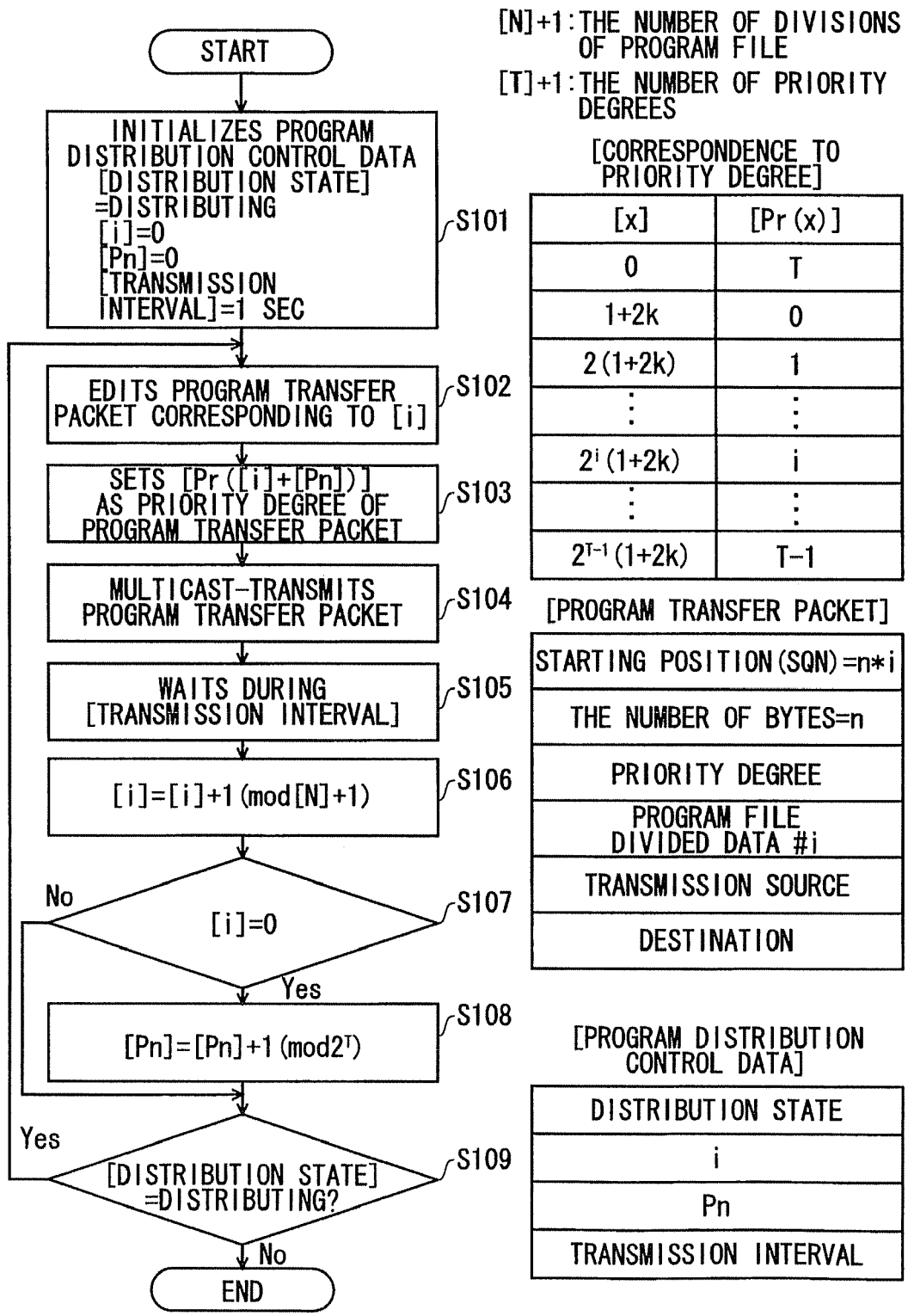
FIG. 19 is a flowchart illustrating the operation of transmission processing by the contents distribution apparatus according to the first embodiment.

Next, processing by the contents distribution apparatus 10 according to the first embodiment will be described with the use of FIG. 19. FIG. 19 is a flowchart illustrating the operation of transmission processing by the contents distribution apparatus according to the first embodiment.

As illustrated in FIG. 19, when initializing the program distribution control data stored in the program distribution control data storage unit 13b (operation S101), the contents distribution apparatus 10 edits a program transfer packet corresponding to the sequence number "i" in the program distribution control data (operation S102), and sets a priority degree "Pr([i]+[Pn])" for the program transfer packet (operation S103).

Then, the contents distribution apparatus 10 multicast-transmits the program transfer packet (operation S104), and waits during the transmission interval in the program distribution control data (operation S105).

After that, the contents distribution apparatus 10 sets a value obtained by adding 1 to "i", for the sequence number "i" in the program distribution control data (operation S106), and judges whether the set "i" is 0 (operation S107). That is, the contents distribution apparatus 10 judges whether or not one round of the sequence has ended and the value obtained by adding 1 to "i" is the same as "[N]+1", which is the number of divisions of the program file.

As a result, if the set "i" is 0 (operation S107: YES), the contents distribution apparatus 10 judges that one round of the sequence has ended, and adds 1 to "Pn", which is the number of rounds of program distribution control data transmission (operation S108). That is, if 1 is added to "Pn", the phase of the priority degree for a sequence number is changed in the next transmission of contents.

Then, the contents distribution apparatus 10 judges whether the distribution state in the program distribution control data is "distributing" (operation S109). If the distribution state in the program distribution control data is "distributing" (operation S109: YES), the contents distribution apparatus 10 repeats the processing from S102 to S109. When the distribution state in the program distribution control data is not "distributing" any more (operation S109: NO), the contents distribution apparatus 10 terminates the transmission processing.

[Processing by Packet Relay Apparatus]

Figure 20:
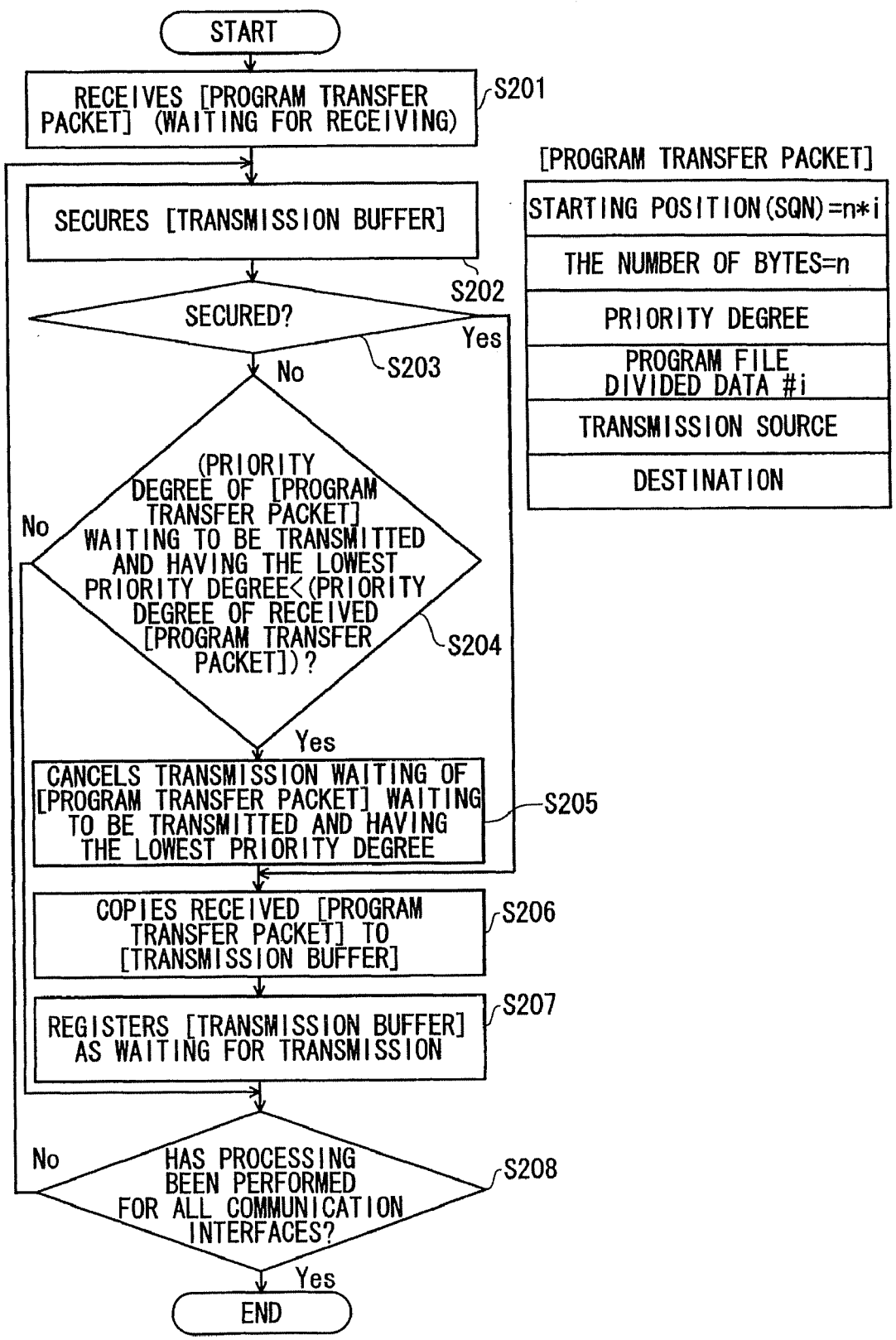
FIG. 20 is a flowchart illustrating the operation of relay processing by a packet relay apparatus according to the first embodiment.

Next, processing by the packet relay apparatus 20 according to the first embodiment will be described with the use of FIG. 20. FIG. 20 is a flowchart illustrating the operation of transmission processing by the packet relay apparatus 20 according to the first embodiment.

As illustrated in FIG. 20, when receiving a program transfer packet from the contents distribution apparatus 10 (operation S201), the packet relay apparatus 20 secures the transmission buffer 23a (operation S202), and judges whether the transmission buffer 23a is secured (operation S203).

As a result, if the transmission buffer 23a is not secured (operation S203: NO), the packet relay apparatus 20 judges whether the priority degree of the received program transfer packet is higher than the priority degree of a program transfer packet waiting to be transmitted and having the lowest priority degree (operation S204).

As a result, if the priority degree of the received program transfer packet is higher than the priority degree of the program transfer packet waiting to be transmitted and having the lowest priority degree (operation S204: YES), the packet relay apparatus 20 cancels the transmission waiting of the program transfer packet waiting to be transmitted and having the lowest priority degree (operation S205).

If the transmission buffer 23a is secured at S203 (operation S203: YES), the packet relay apparatus 20 advances to S206 without discarding a program transfer packets waiting to be transmitted.

Then, the packet relay apparatus 20 copies the received program transfer packet to the transmission buffer 23a (operation S206) and registers the transmission buffer 23a as waiting for transmission (operation S207).

If the priority degree of the received program transfer packet is lower than the priority degree of the program transfer packet waiting to be transmitted and having the lowest priority degree at S204 (operation S204: NO), the packet relay apparatus 20 advances to S208 without copying the received program transfer packet to the transmission buffer 23a.

Then, the packet relay apparatus 20 judges whether the processing of S202 to S207 has been performed for all the communication interfaces (operation S208). If the processing has not been performed for all the communication interfaces (operation S208: NO), the packet relay apparatus 20 repeats the processing of S202 to S208 until the processing is performed for all the communication interfaces. When the processing has been performed for all the communication interfaces (operation S208: YES), the packet relay apparatus 20 terminates the relay processing.

[Processing by Client Apparatus]

Next, processing by the client apparatus 30 according to the first embodiment will be described with the use of FIGS. 21 and 22. FIGS. 21A and 21B are flowcharts illustrating the operation of receiving processing by the client apparatus 30 according to the first embodiment. FIG. 22 is a flowchart illustrating the operation of receiving completion management processing by the client apparatus 30 according to a first embodiment.

Figure 21A:
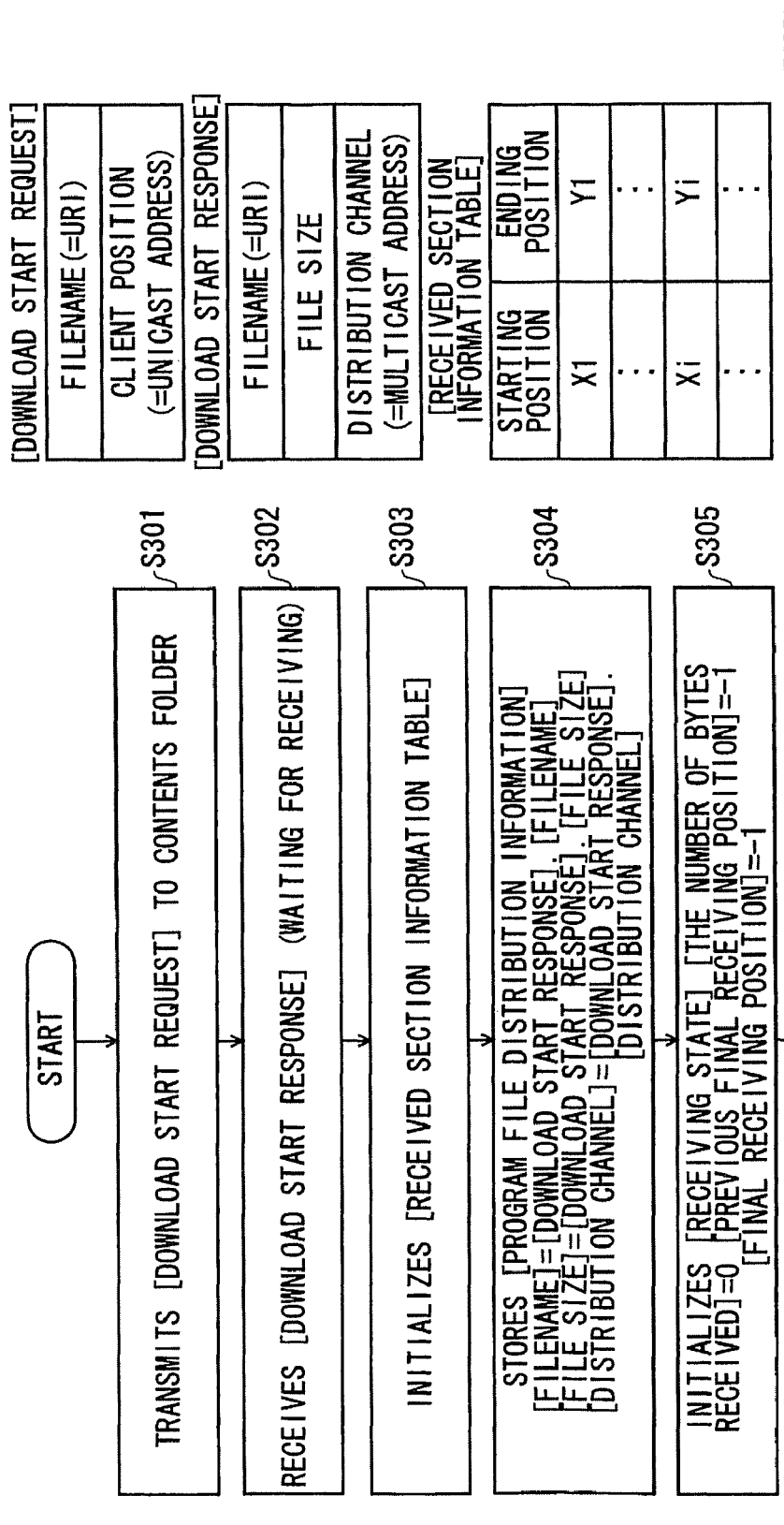
FIGS. 21A and 21B are flowcharts illustrating the operation of receiving processing by the client apparatus according to the first embodiment.
Figure 21B:
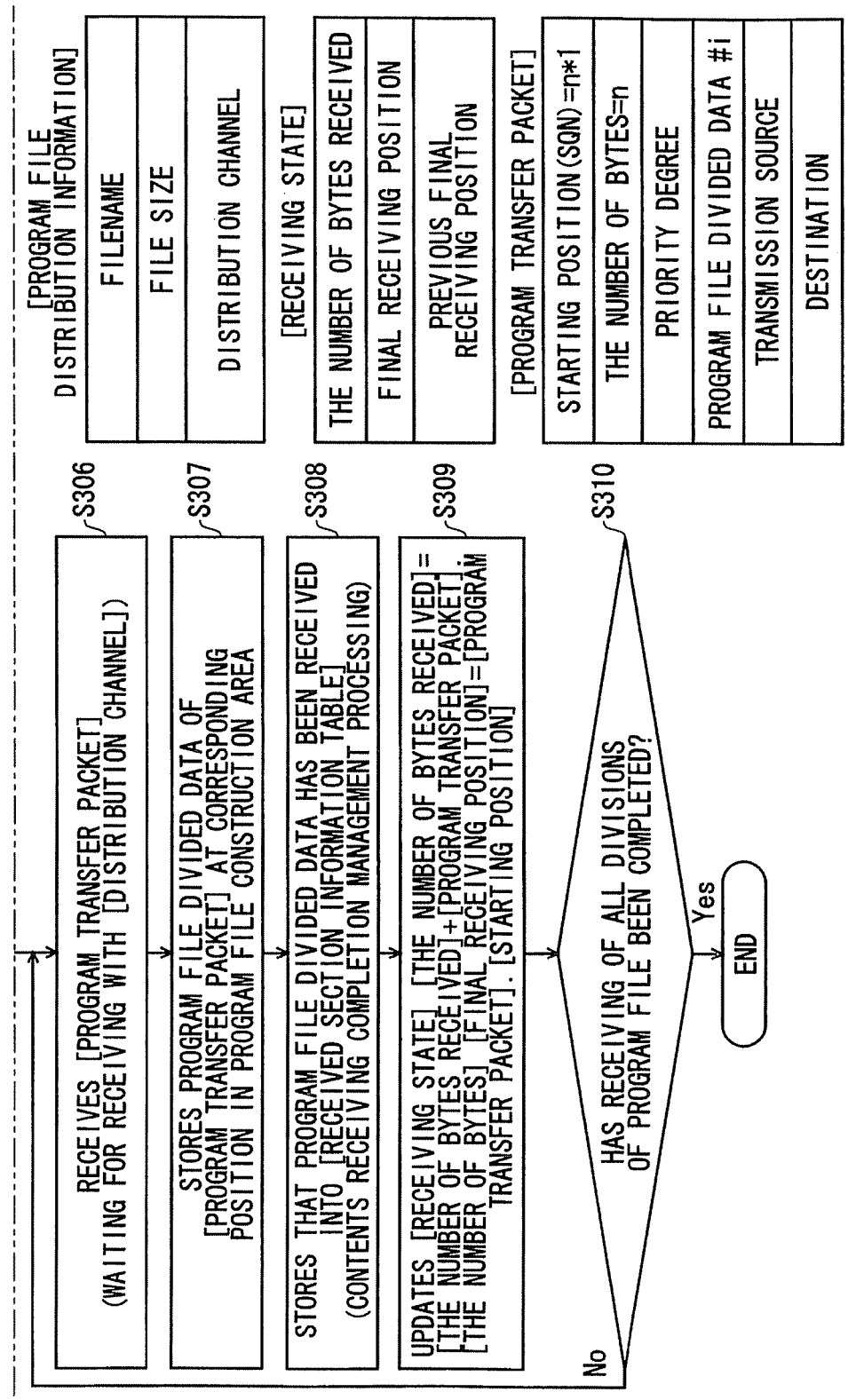
Figure 22:
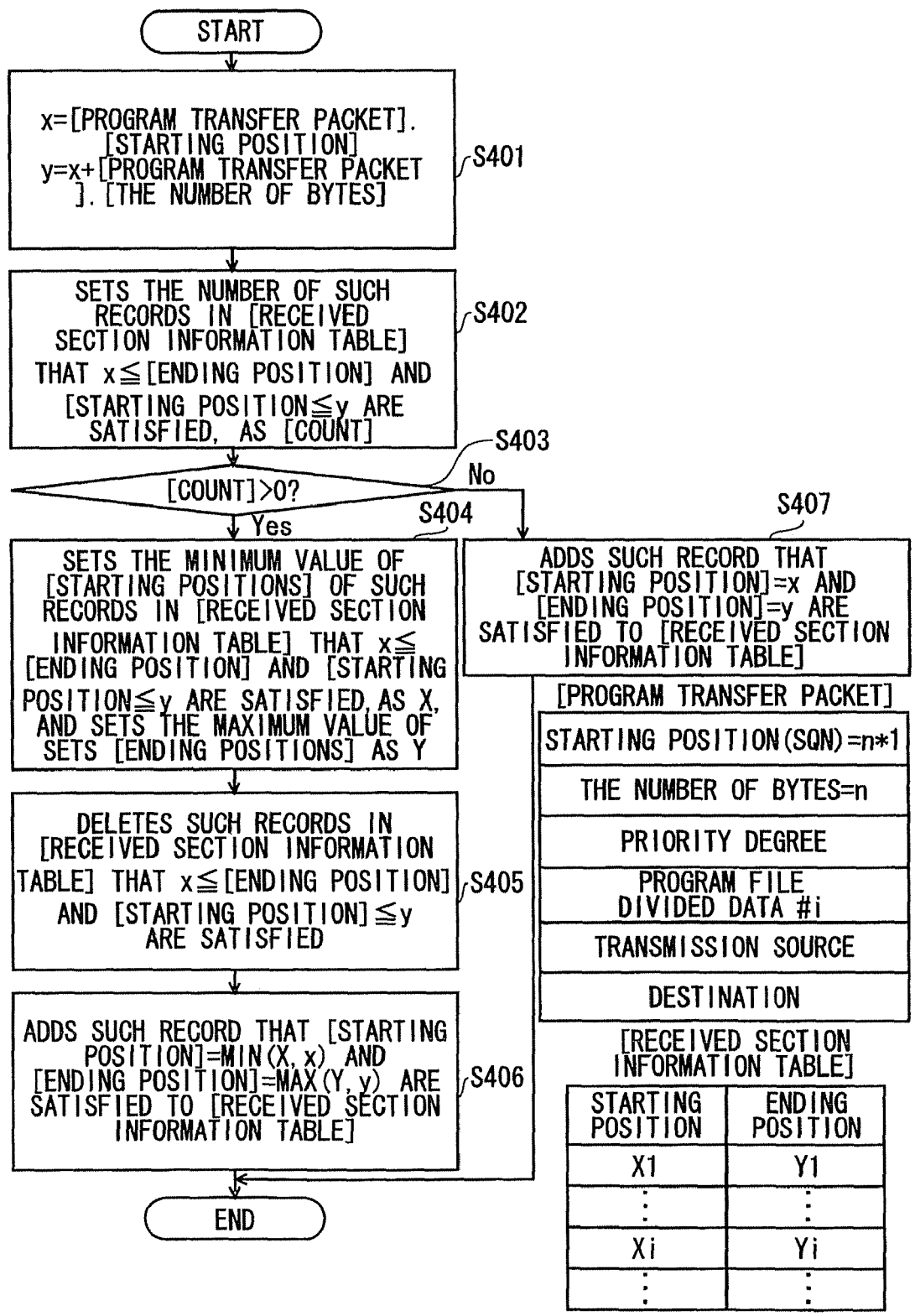
FIG. 22 is a flowchart illustrating the operation of receiving completion management processing by the client apparatus according to the first embodiment.

As illustrated in FIGS. 21A and 21B, the client apparatus 30 transmits a download start request to the contents distribution apparatus (contents folder) 10 (operation S301). Then, the client apparatus 30 receives a download start response from the contents distribution apparatus 10 (operation S302).

Next, the client apparatus 30 initializes the received section information table 33b (operation S303), and stores program file distribution information (operation S304). Then, the client apparatus 30 initializes the receiving state (operation S305).

When receiving a program transfer packet (operation S306), the client apparatuses 30 stores divided data of a program file in the program transfer packet, at a corresponding position in a program file construction area (operation S307).

Next, the client apparatus 30 performs contents receiving completion management processing (to be described in detail later with the use of FIG. 22) for storing that the division data of the program file has been received, into the received section information table 33b (operation S308) and updates the receiving state (operation S309).

After that, the client apparatuses 30 judges whether receiving of all the divisions of the program file has been completed (operation S310). If receiving of all the divisions of the program file has not been completed (operation S310: NO), the client apparatus 30 repeats the processing of S306 to S310. When receiving of all the divisions of the program file has been completed (operation S310: YES), the client apparatuses 30 terminates the receiving processing.

Next, the contents receiving completion management processing by the client apparatuses 30 will be described with the use of FIG. 22. As illustrated in the figure, the client apparatuses 30 acquires a program transfer packet starting position "x", and "y" obtained by adding "x" to the number of bytes of the program transfer packet (operation S401).

Then, the client apparatus 30 counts the number of records in the received section information table 33b which satisfy "x"≦ending position and the starting position≦"y" (operation S402) and judges whether the count is larger than 0 (operation S403).

As a result, if the count is equal to or smaller than 0 (operation S403: NO), the client apparatus 30 adds a record with the starting position "x" and the ending position "y" to the received section information table 33b (operation S407).

If the count is larger than 0 (operation S403: YES), the client apparatus 30 sets the minimum value of the starting positions and the maximum value of the ending positions of such records in the received section information table 33b that satisfy "x"≦ending position and the starting position≦"y", as X and Y, respectively (operation S404).

Next, the client apparatus 30 deletes such records in the received section information table 33b that satisfy "x"≦ending position and the starting position≦"y" (operation S405), adds a record with a starting position of "min (X, x)" and an ending position of "max (Y, y)" to the received section information table 33b (operation S406) and terminates the contents receiving completion management processing.

Advantages of First Embodiment

As described above, the contents distribution apparatus 10 divides contents data at a particular length and packetizes each of the divided contents data to generate a transfer packet. Then, the contents distribution apparatus 10 assigns a phase to each of the generated program transfer packets according to the divided data position in the whole contents data and sets a priority degree corresponding to the phase for each program transfer packet. Next, the contents distribution apparatus 10 sequentially transmits the program transfer packets for which priority degrees have been set, beginning with the top of contents data, and performs control so that, when one round of transmission of all the program transfer packets ends, the phase assigned to each program transfer packet is changed.

Therefore, since the contents distribution apparatus 10 changes the priority degree of each packet to transmit the packet for each of the first, second . . . rounds, the relay apparatuses 20 selectively change a relay target for each of the first, second . . . rounds, so that all packets constituting contents can efficiently reach the client apparatuses 30. As a result, it is possible to prevent the receiving time required for each client apparatus 30 to receive all packets from being lengthened and to efficiently transmit all the packets to the client apparatuses 30.

Furthermore, according to the first embodiment, since the contents distribution apparatus 10 sets priority degrees in a superposed wave shape for transfer packets, the setting of the "priority degrees" of the packets fluctuates, and as a result, all the program transfer packets are definitely selected. Therefore, it is possible to prevent the receiving time required for each client apparatus 30 to receive all the packets from being lengthened and to efficiently transmit all the packets to the client apparatuses 30.

Furthermore, according to the first embodiment, even if the contents distribution apparatus 10 has an increased number of distribution destination client apparatuses, loads on the contents distribution apparatus 10 and the neighbor network equipment are constant, and the download time of each client apparatus 30 is constant. Furthermore, even if simultaneous distribution is performed to client apparatuses 30 with different speeds, the download time of each client apparatus 30 can be constant.

Second Embodiment

In the above embodiment, the program transfer packet transmission interval may be adjusted. Accordingly, in a second embodiment described below, the configuration of and the processing by a contents distribution apparatus 10a in the second embodiment will be described as a case where the contents distribution apparatus 10a adjusts the program transfer packet transmission interval according to the receiving state of the client apparatuses 30, with the use of FIGS. 23 to 28.

Figure 26:
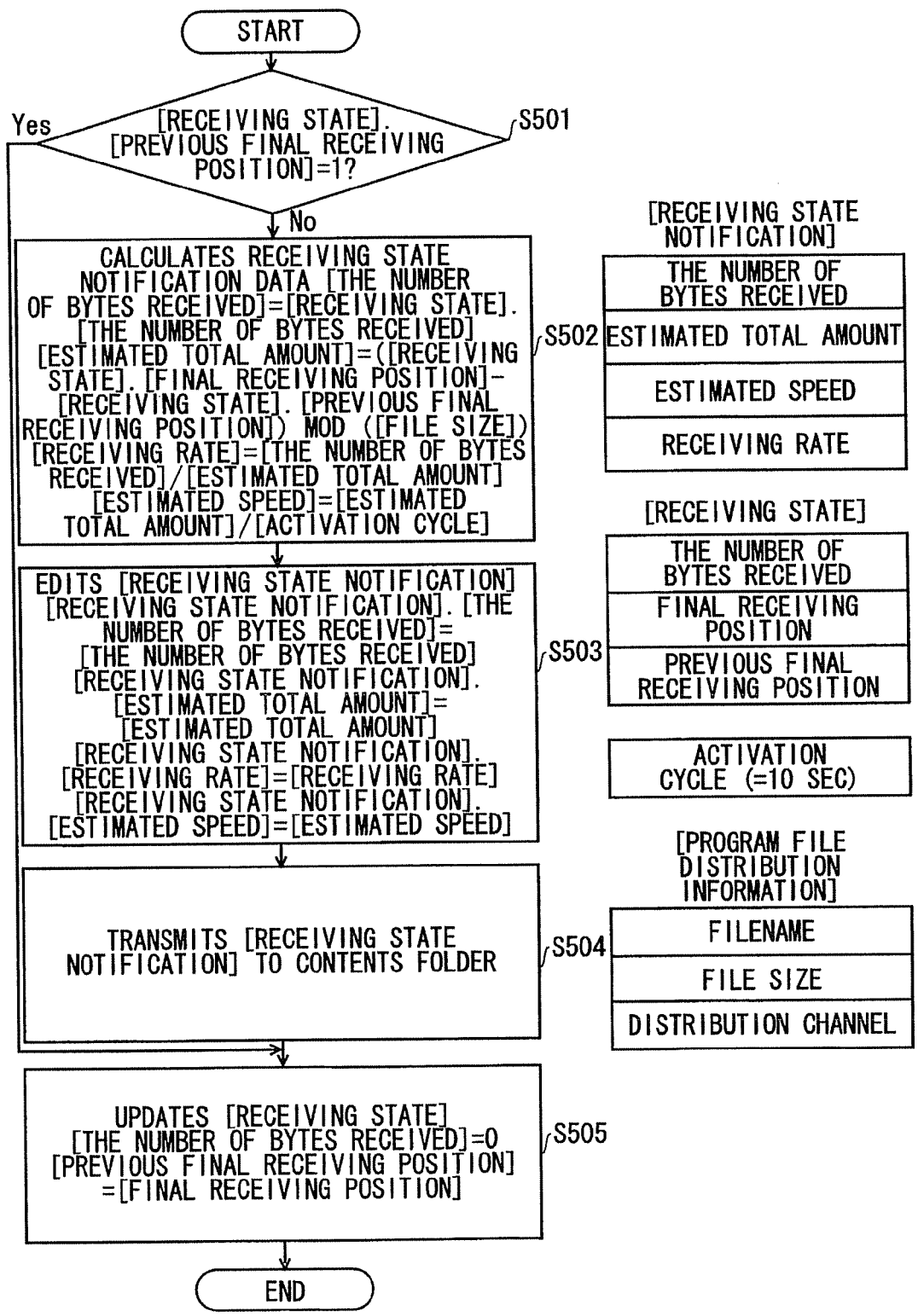
FIG. 26 is a flowchart illustrating the operation of receiving state notification transmission processing by a client apparatus according to a second embodiment.
Figure 27:
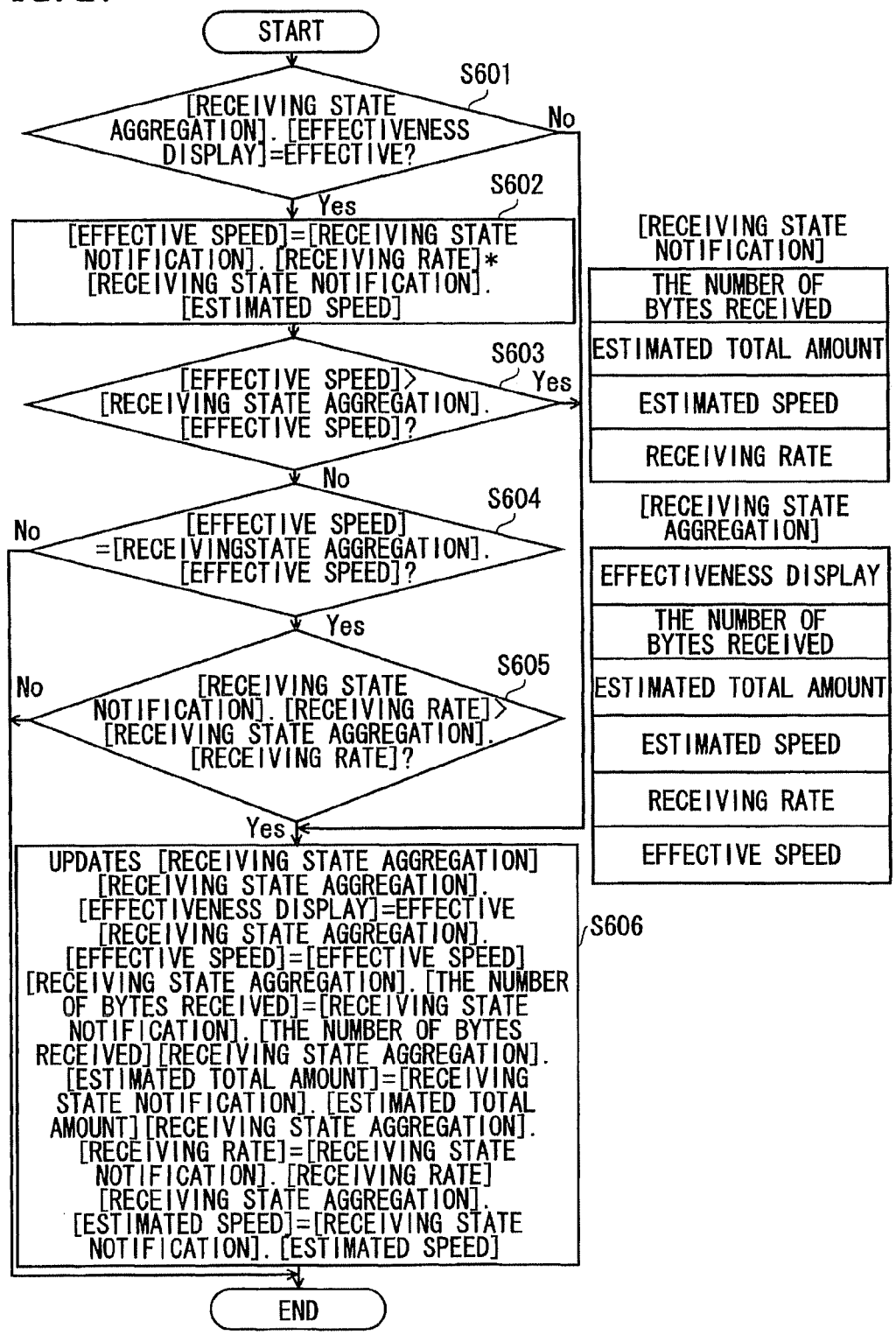
FIG. 27 is a flowchart illustrating the operation of receiving state notification receiving processing by a contents distribution apparatus according to the second embodiment.
Figure 28A:
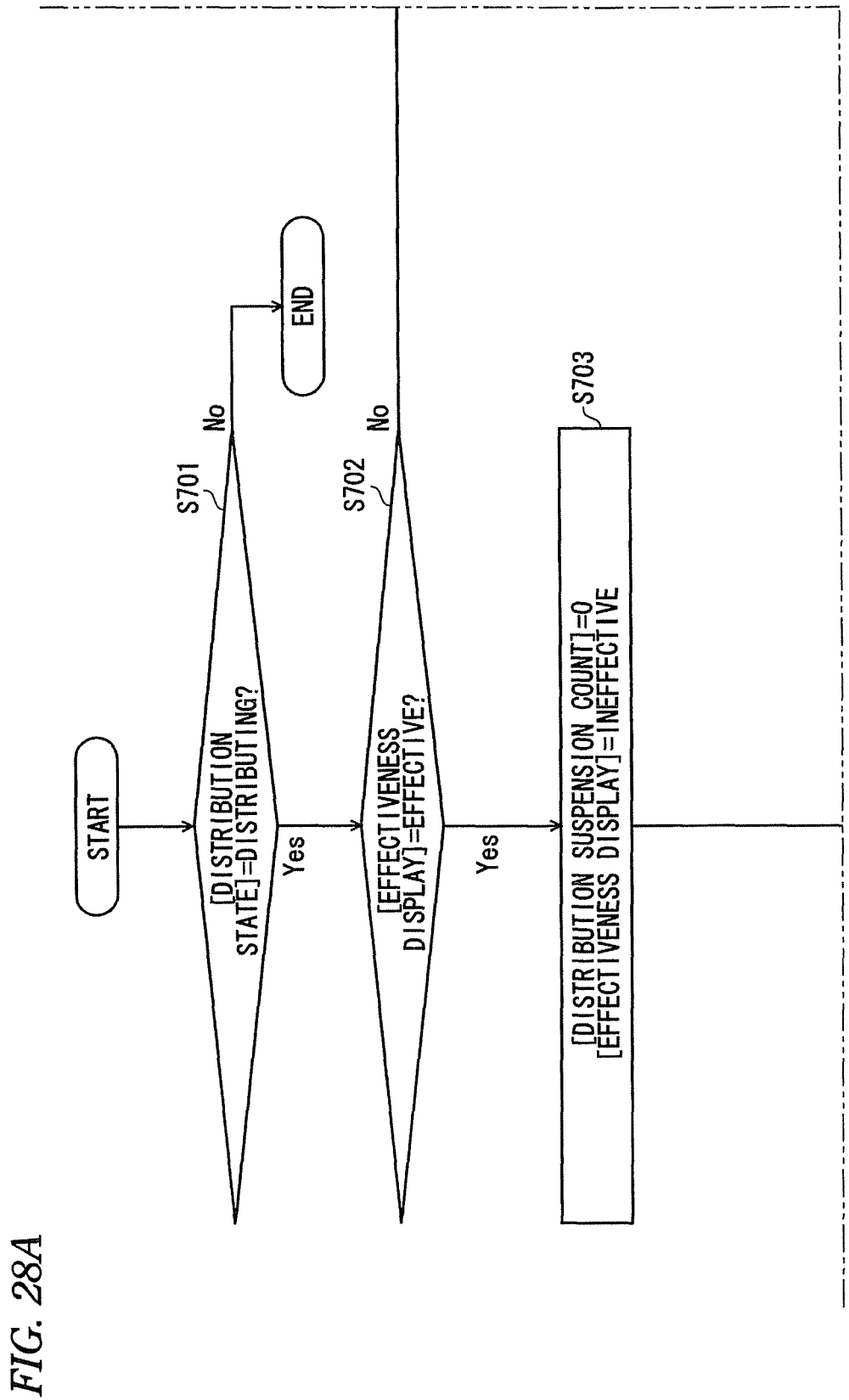
FIGS. 28A-D are flowcharts illustrating the operation of transmission speed parameter adjustment processing by the contents distribution apparatus according to the second embodiment.
Figure 28B:
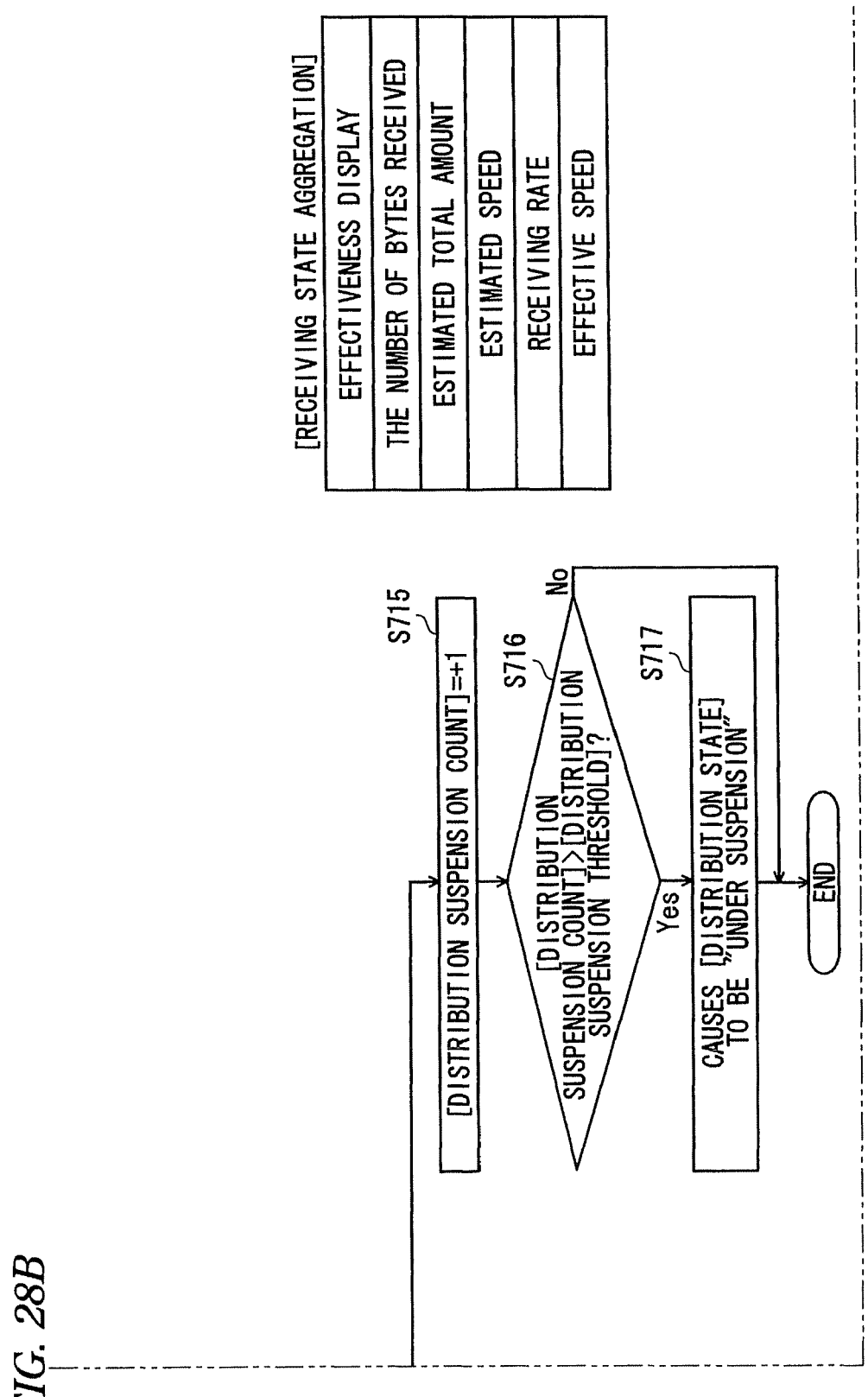
Figure 28C:
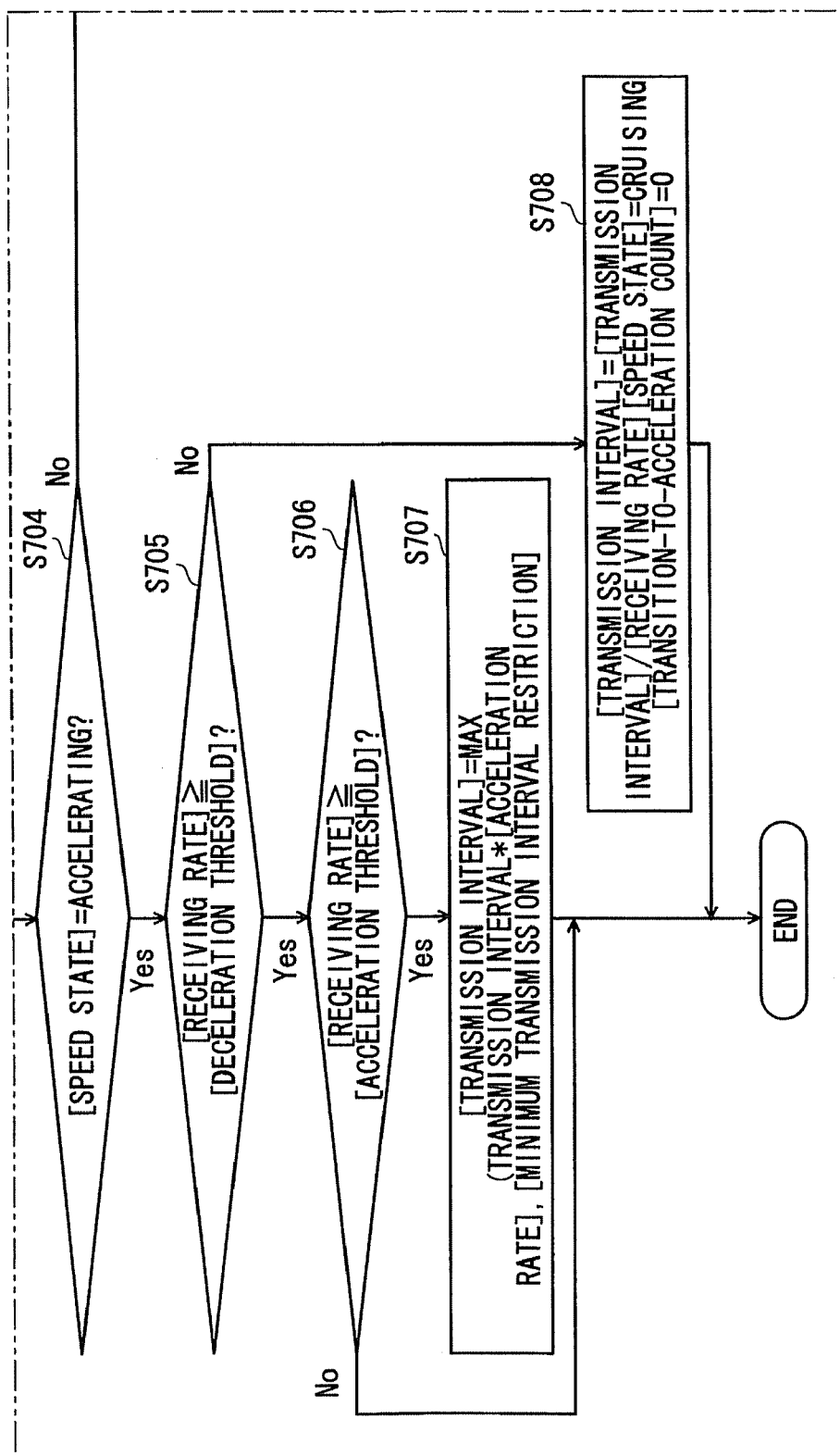
Figure 28D:
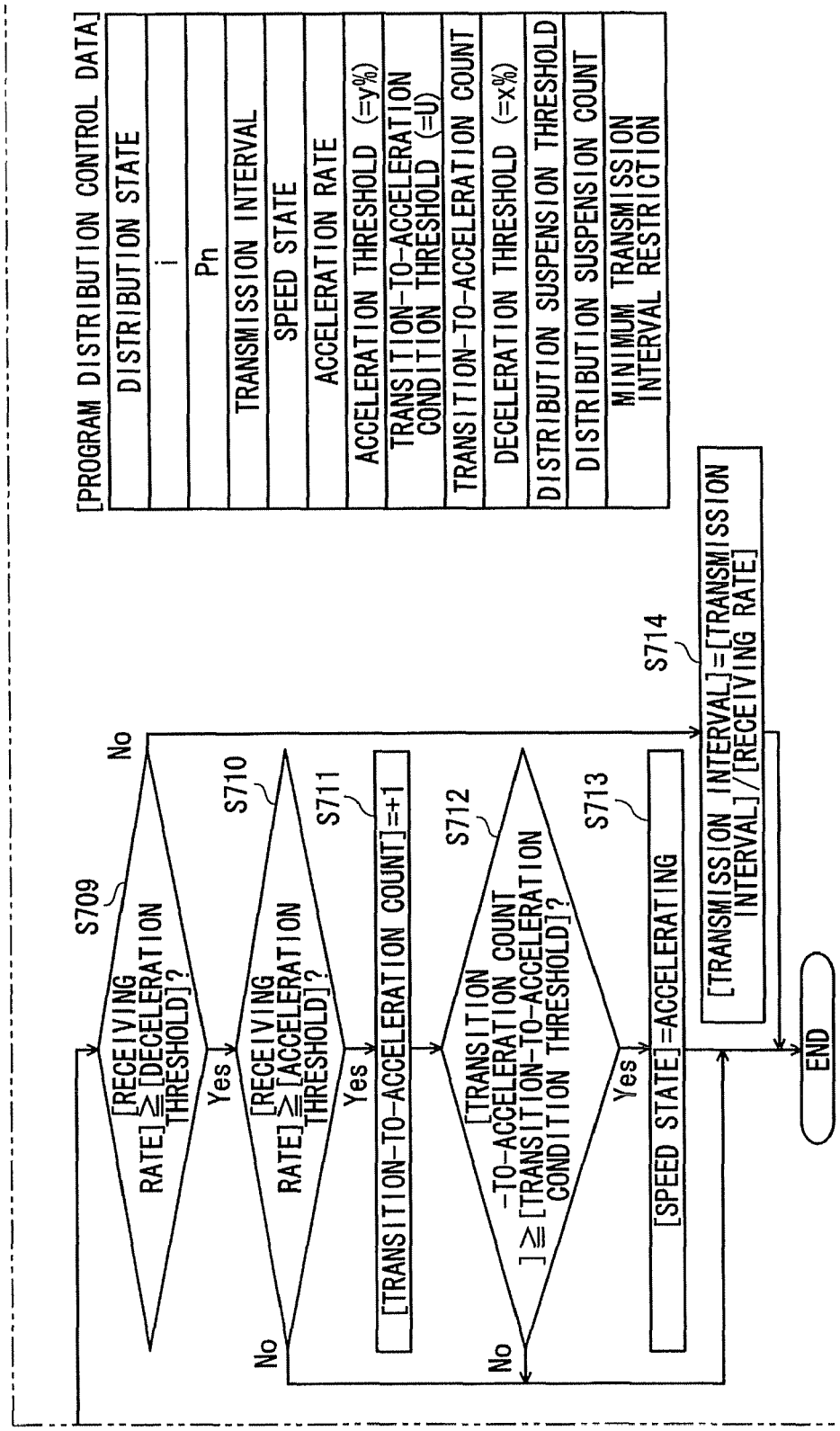

FIG. 23 is a diagram illustrating an example of the control data configuration of the contents distribution apparatus. FIG. 24 is a diagram illustrating an example of the control data configuration of the client apparatus. FIG. 25 is a diagram illustrating an example of the data configuration of a receiving state notification. FIG. 26 is a flowchart illustrating the operation of receiving state notification transmission transmission processing by the client apparatus according to the second embodiment. FIG. 27 is a flowchart illustrating the operation of receiving state notification receiving processing by the contents distribution apparatus according to the second embodiment. FIGS. 28A-D are flowcharts illustrating the operation of transmission speed parameter adjustment processing by the contents distribution apparatus according to the second embodiment.

First, an example of the control data configuration of the contents distribution apparatus 10a according to the second embodiment will be described with the use of FIG. 23. As illustrated in FIG. 23, the contents distribution apparatus 10a according to the second embodiment newly stores "receiving state aggregation information" in which receiving states received from the multiple client apparatuses 30a are aggregated.

In this "receiving state aggregation", there are stored "effectiveness display" indicating whether processing for adjusting a transmission interval is effective or ineffective, "the number of bytes received" indicating the number of bytes received by the client apparatuses and an "estimated total amount" indicating an estimated total amount of the file size. Furthermore, in the "receiving state aggregation", there are also stored an "estimated speed" indicating an estimated receiving speed, a "receiving rate" indicating the rate of the number of bytes received against the total amount of the file size and an "effective speed" determined in accordance with the receiving rate and the estimated speed.

Furthermore, in the contents distribution apparatus 10a, there are newly stored a "speed state" indicating whether the state of the distribution speed is accelerating or cruising, an "acceleration rate" indicating the rate of accelerating the distribution speed and an "acceleration threshold" which is a threshold used for determining whether or not to accelerate the distribution speed, as program distribution control data. Furthermore, in the contents distribution apparatus 10a, there are newly stored a "transition-to-acceleration condition threshold" which is a threshold used for determining whether or not to cause the speed state to be an accelerating state, a "transition-to-acceleration count" which is a count used for determining whether or not to transition to the accelerating state, and a "deceleration threshold" which is a threshold used for determining whether or not to decelerate the speed, as program distribution control data.

Furthermore, in the contents distribution apparatus 10a, there are newly stored a "distribution suspension threshold" which is a threshold for determining whether or not to cause the distribution state to be "under suspension", a "distribution suspension count" which is a count for determining whether or not to cause the distribution state to be "under suspension", and "minimum transmission interval restriction" indicating restriction of the transmission interval, as program distribution control data.

Next, an example of the control data configuration of the client apparatus 30a according to the second embodiment will be described with the use of FIG. 24. As illustrated in FIG. 24, the client apparatus 30a according to the second embodiment newly stores a "receiving state" which indicates the receiving state of program transfer packets distributed from the contents distribution apparatus 10a.

The contents distribution apparatus 10a stores "the number of bytes received" indicating the number of bytes of a program transfer packet, a "final receiving position" indicating the starting position of the received program transfer packets, a "previous final receiving position" indicating the starting position of a program transfer packets received last, and an "activation cycle" indicating the activation cycle (for example, ten seconds) of receiving state notification transmission processing, as the receiving state.

Furthermore, as illustrated in FIG. 25, the client apparatus 30a transmits a "receiving state notification" for notifying the receiving state of program transfer packets, to the contents distribution apparatus 10a. This "receiving state notification" includes the number of bytes received, an estimated total amount, an estimated speed and a receiving rate as information.

Next, the receiving state notification transmission processing by the client apparatus 30a according to the second embodiment will be described. The client apparatus 30a executes the receiving state notification transmission processing described below at a predetermined cycle (for example, at a 10-second cycle). The client apparatus 30a transmits a receiving state notification to the contents distribution apparatus 10a.

As illustrated in FIG. 26, the client apparatus 30a judges whether the previous final receiving position in the receiving state is "1" or not (operation S501). If the previous final receiving position in the receiving state is not "1" (operation S501: NO), the client apparatus 30a calculates receiving state notification data (operation S502) and edits a receiving state notification (operation S503).

Then, the client apparatus 30a transmits the receiving state notification to the contents distribution apparatus 10a (operation S504) and updates the receiving state (operation S505). If the previous final receiving position in the receiving state is "1" at S101 (operation S501: YES), the client apparatus 30a updates the receiving state without transmitting the receiving state notification (operation S505).

Next, the receiving state notification receiving processing and the transmission speed parameter adjustment processing by the contents distribution apparatus 10a according to the second embodiment will be described. When receiving the receiving state notifications, the contents distribution apparatus 10a performs the receiving state notification receiving processing described below to aggregate the receiving states of the lot of client apparatuses. The contents distribution apparatus 10a executes the transmission speed parameter adjustment processing described below at a predetermined cycle (for example, at a 10-second cycle) to adjust the program transfer packet transmission interval.

First, the receiving state notification receiving processing will be described with the use of FIG. 27. As illustrated in the figure, the contents distribution apparatus 10a judges whether the effectiveness display in the receiving state aggregation indicates "effective" (operation S601). As a result, if the effectiveness display in the receiving state aggregation does not indicate "effective" (operation S601: NO), the contents distribution apparatus 10a updates the receiving state aggregation (operation S606).

If the effectiveness display in the receiving state aggregation indicates "effective" (operation S601: YES), the contents distribution apparatus 10a multiplies the "receiving rate" and the "estimated speed" in the receiving state notification together to calculate an effective speed (operation S602). The contents distribution apparatus 10a judges whether the calculated effective speed is faster than the effective speed in the receiving state aggregation (operation S603). If the calculated effective speed is faster (operation S603: YES), the contents distribution apparatus 10a updates the receiving state aggregation (operation S606).

On the other hand, if the calculated effective speed is not faster than the effective speed in the receiving state aggregation (operation S603: NO), the contents distribution apparatus 10a judges whether the calculated effective speed and the effective speed in the receiving state aggregation are the same (operation S604). As a result, if the calculated effective speed and the effective speed in the receiving state aggregation are the same (operation S604: YES), the contents distribution apparatus 10a judges whether the receiving rate in the receiving state notification is higher than the receiving rate in the receiving state aggregation (operation S605).

As a result, if the receiving rate in the receiving state notification is higher than the receiving rate in the receiving state aggregation (operation S605: YES), the contents distribution apparatus 10a updates the receiving state aggregation (operation S606).

If the calculated effective speed and the effective speed in the receiving state aggregation are not the same (operation S604: NO) or if the receiving rate in the receiving state notification is equal to or below the receiving rate in the receiving state aggregation (operation S605: NO), the contents distribution apparatus 10a terminates the processing without updating the receiving state aggregation.

Next, the transmission speed parameter adjustment processing by the contents distribution apparatus 10a according to the second embodiment will be described with the use of FIGS. 28A-D. As illustrated in the figure, if the distribution state in the program distribution control data is "distributing" (operation S701: YES), the contents distribution apparatus 10a judges whether the effectiveness display in the receiving state aggregation indicates "effective" (operation S702).

As a result, if the effectiveness display in the receiving state aggregation indicates "ineffective" (operation S702: NO), the contents distribution apparatus 10a adds 1 to the distribution suspension count in the program distribution control data (operation S715) and judges whether the distribution suspension count is larger than the distribution suspension threshold (operation S716). As a result, if the distribution suspension count is larger than the distribution suspension threshold (operation S716: YES), the contents distribution apparatus 10a causes the distribution state in the program distribution control data to be "under suspension" (operation S717). If the distribution suspension count is equal to or below the distribution suspension threshold (operation S716: NO), the contents distribution apparatus 10a terminates the processing.

If the effectiveness display in the receiving state aggregation indicates "effective" (operation S702: YES), the contents distribution apparatus 10a causes the distribution suspension count in the program distribution control data to be "0" and causes the effectiveness display in the receiving state aggregation to be "ineffective" (operation S703). Then, the contents distribution apparatus 10a judges whether the speed state is "accelerating" (operation S704).

As a result, if the speed state is "accelerating" (operation S704: YES), the contents distribution apparatus 10a judges whether the receiving rate is above the deceleration threshold (operation S705). As a result, if the receiving rate is below the deceleration threshold (operation S705: NO), the contents distribution apparatus 10a causes a value obtained by dividing the transmission interval in the program distribution control data by the receiving rate in the receiving state aggregation, to be a new "transmission interval" in the program distribution control data, causes the speed acceleration state to be "cruising" and causes the "transition-to-acceleration count" to be "0" (operation S708).

If the receiving rate is equal to or above the deceleration threshold (operation S705: YES), the contents distribution apparatus 10a judges whether the receiving rate is equal to or above the acceleration threshold (operation S706).

As a result, if the receiving rate is equal to or above the acceleration threshold (operation S706: YES), the contents distribution apparatus 10a updates the transmission interval in the program distribution control data using a value which is obtained by multiplying the transmission interval in the program distribution control data by the acceleration rate in the program distribution control data and which does not exceed the minimum transmission interval restriction as a new "transmission interval" (operation S707). If the receiving rate is below the deceleration threshold (operation S706: NO), the contents distribution apparatus 10a terminates the processing.

Returning to the description of S704, if the speed state is "cruising" (operation S704: NO), the contents distribution apparatus 10a judges whether the receiving rate is equal to or above the deceleration threshold (operation S709). As a result, if the receiving rate is below the deceleration value (operation S709: NO), the contents distribution apparatus 10a updates the transmission interval in the program distribution control data using a value obtained by dividing the transmission interval in the program distribution control data by the receiving rate in the receiving state aggregation as a new "transmission interval" (operation S714).

If the receiving rate is equal to or above the deceleration threshold (operation S709: YES), the contents distribution apparatus 10a judges whether the receiving rate is equal to or above the acceleration threshold (operation S710).

As a result, if the receiving rate is equal to or above the acceleration threshold (operation S710: YES), the contents distribution apparatus 10a adds "1" to the transition-to-acceleration count in the program distribution control data (operation S711) and judges whether the transition-to-acceleration count in the program distribution control data is equal to or above the transition-to-acceleration condition threshold (operation S712).

As a result, if the transition-to-acceleration count in the program distribution control data is equal to or above the transition-to-acceleration condition threshold (operation S712: YES), the contents distribution apparatus 10a updates the speed state in the program distribution control data to "accelerating" (operation S713).

If the receiving rate is below the acceleration threshold (operation S710: NO) or if the transition-to-acceleration count is below the transition-to-acceleration condition threshold (operation S712: NO), the contents distribution apparatus 10a terminates the processing immediately.

Thus, the speed of transmitting program transfer packets is adjusted according to the receiving state of each of the transfer packet transmission destination client apparatuses 30, and the program transfer packets are sequentially transmitted from the top of contents data at the adjusted transmission speed. Therefore, the program transfer packet transmission interval is changed to an interval suitable for the state of each of the client apparatuses 30, and it is possible to transmit all the packets to the client apparatuses more efficiently.

Third Embodiment

Though description has been made on a case where client apparatuses transmit receiving state notifications to a contents distribution apparatus in the above second embodiment, the embodiment is not limited thereto. It is also possible that an aggregation apparatus transmits the receiving state notification to the contents distribution apparatus after aggregating receiving states from the multiple client apparatuses.

Figure 30:
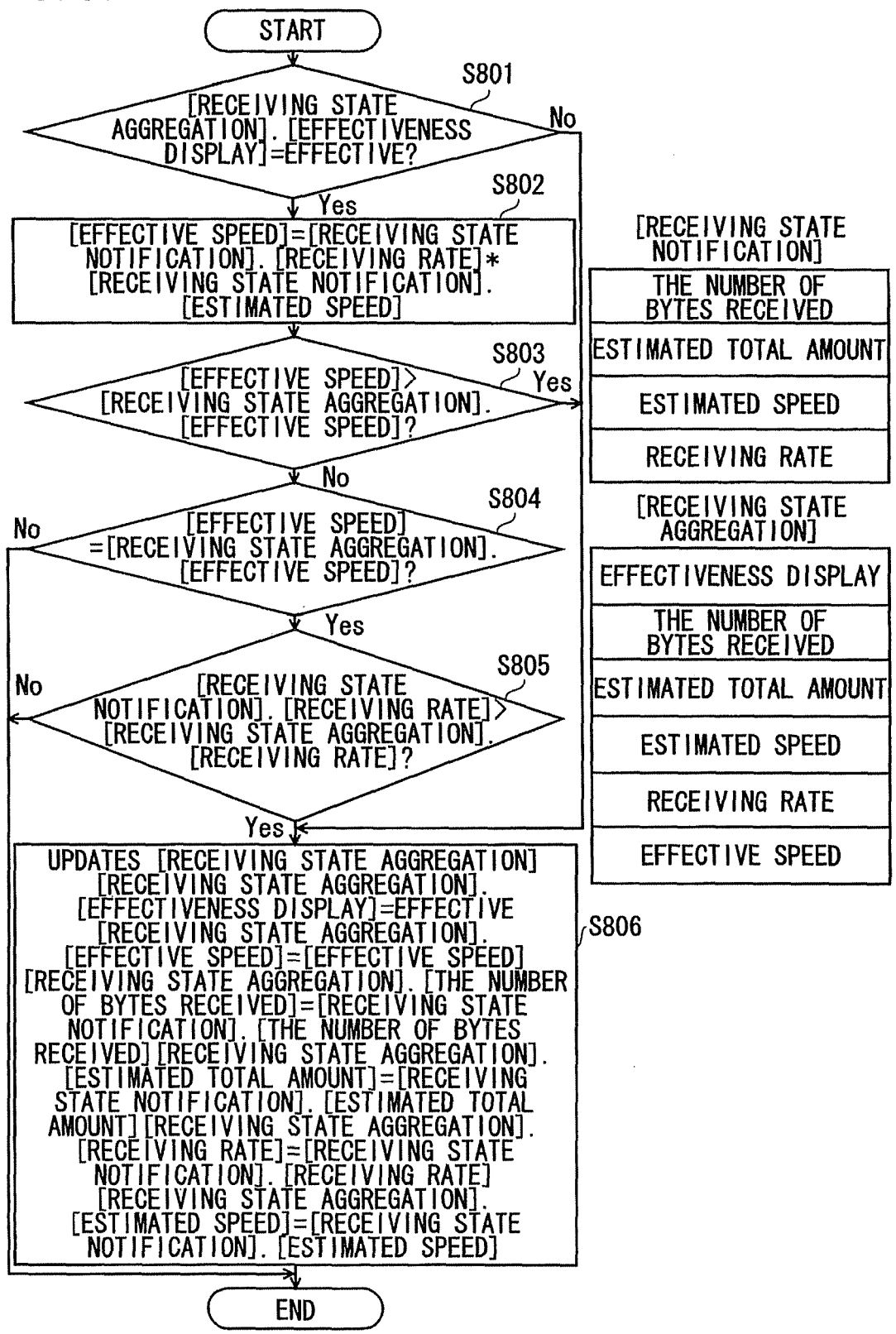
FIG. 30 is a flowchart illustrating the operation of receiving state notification receiving processing by an aggregation apparatus according to a third embodiment.
Figure 31:
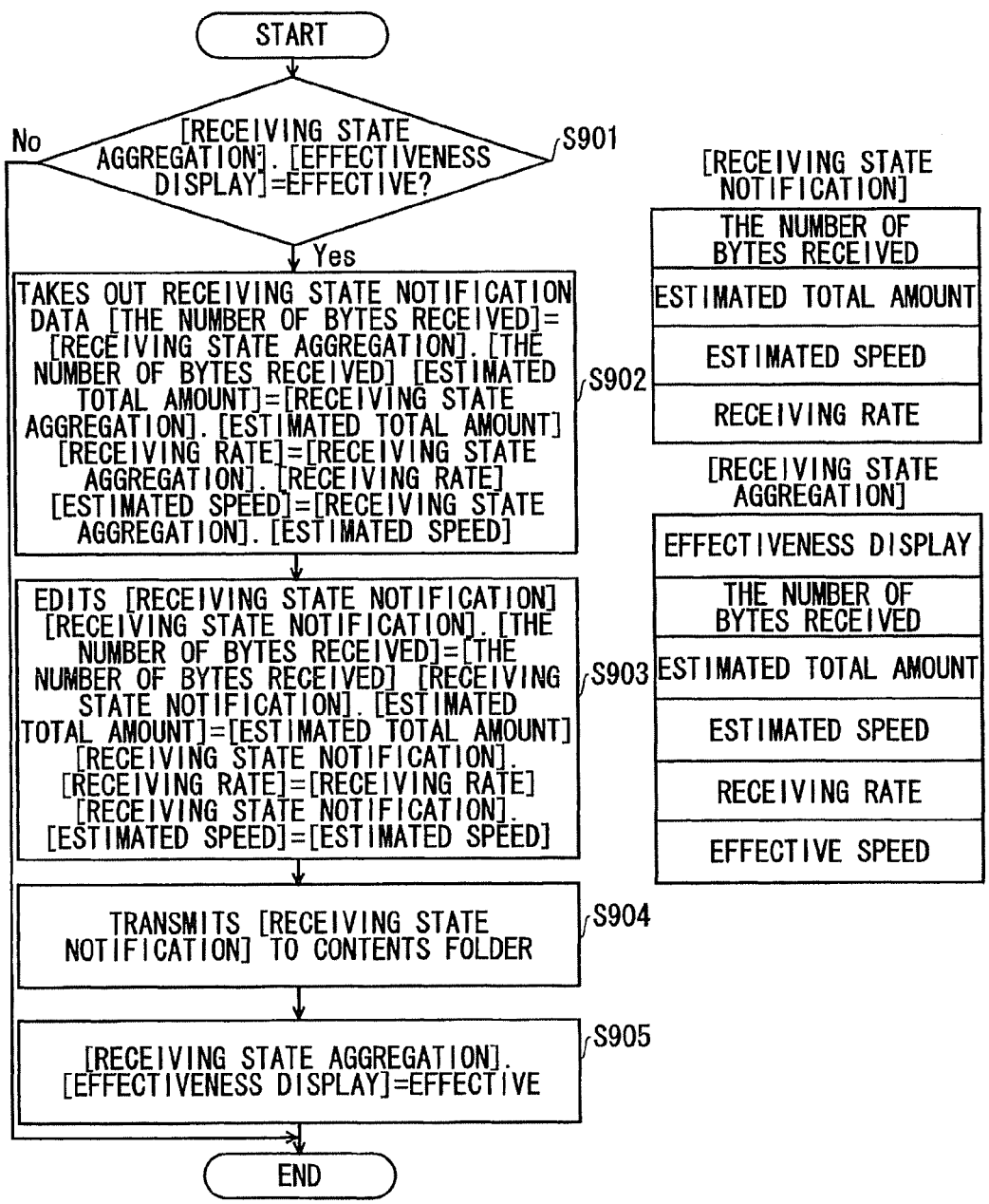
FIG. 31 is a flowchart illustrating the operation of receiving state notification transmission processing by the aggregation apparatus according to the third embodiment.

Accordingly, in a third embodiment described below, the configuration of and the processing by an aggregation apparatus 40 in the third embodiment will be described as a case where the aggregation apparatus 40 transmits the receiving state notification to a contents distribution apparatus 10b after aggregating receiving states from multiple client apparatuses, with the use of FIGS. 29 to 32. FIG. 29 is a diagram illustrating an example of the control data configuration of the aggregation apparatus. FIG. 30 is a flowchart illustrating the operation of receiving state notification receiving processing by the aggregation apparatus according to the third embodiment. FIG. 31 is a flowchart illustrating the operation of receiving state notification transmission processing by the aggregation apparatus according to the third embodiment.

First, an example of the control data configuration of the aggregation apparatus 40 according to the third embodiment will be described with the use of FIG. 29. As illustrated in FIG. 29, the aggregation apparatus 40 according to the third embodiment stores "receiving state aggregation" in which receiving states received from the multiple client apparatuses 30a are aggregated. This receiving state aggregation has information similar to the information in the receiving state aggregation of the contents distribution apparatus 10*a* according to the second embodiment illustrated in FIG. 23.

Next, the receiving state notification receiving processing and the receiving state notification transmission processing by the aggregation apparatus 40 according to the third embodiment will be described. When receiving receiving state notifications, the aggregation apparatus 40 according to the third embodiment performs the receiving state notification receiving processing described below to aggregate receiving states of the lot of client apparatuses. The aggregation apparatus 40 executes the receiving state notification transmission processing described below at a predetermined cycle (for example, at a 10-second cycle) and transmits a receiving state notification to the contents distribution apparatus 10*b* or an upper aggregation apparatus.

First, the receiving state notification receiving processing by the aggregation apparatus 40 will be described with the use of FIG. 30. As illustrated in the figure, the aggregation apparatus 40 judges whether the effectiveness display in the receiving state aggregation indicates "effective" (operation S801). As a result, if the effectiveness display in the receiving state aggregation does not indicate "effective" (operation S801: NO), the aggregation apparatus 40 updates the receiving state aggregation (operation S806).

If the effectiveness display in the receiving state aggregation indicates "effective" (operation S801: YES), the aggregation apparatus 40 multiplies the "receiving rate" and the "estimated speed" in the receiving state notification together to calculate an effective speed (operation S802). The aggregation apparatus 40 judges whether the calculated effective speed is faster than the effective speed in the receiving state aggregation (operation S803). If the calculated effective speed is faster (operation S803: YES), the aggregation apparatus 40 updates the receiving state aggregation (operation S806).

On the other hand, if the calculated effective speed is not faster than the effective speed in the receiving state aggregation (operation S803: NO), the aggregation apparatus 40 judges whether the calculated effective speed and the effective speed in the receiving state aggregation are the same (operation S804). As a result, if the calculated effective speed and the effective speed in the receiving state aggregation are the same (operation S804: YES), the aggregation apparatus 40 judges whether the receiving rate in the receiving state notification is higher than the receiving rate in the receiving state aggregation (operation S805).

As a result, if the receiving rate in the receiving state notification is higher than the receiving rate in the receiving state aggregation (operation S805: YES), the aggregation apparatus 40 updates the receiving state aggregation (operation S806).

If the calculated effective speed and the effective speed in the receiving state aggregation are not the same (operation S804: NO) or if the receiving rate in the receiving state notification is equal to or below the receiving rate in the receiving state aggregation (operation S805: NO), the aggregation apparatus 40 terminates the processing without updating the receiving state aggregation.

Next, the receiving state notification transmission processing by the aggregation apparatus 40 will be described with the use of FIG. 31. As illustrated in the figure, the aggregation apparatus 40 judges whether the effectiveness display in the receiving state aggregation indicates "effective" (operation S901). As a result, if the effectiveness display in the receiving state aggregation does not indicate "effective" (operation S901: NO), the aggregation apparatus 40 terminates the processing.

If the effectiveness display in the receiving state aggregation indicates "effective" (operation S901: YES), the aggregation apparatus 40 takes out receiving state notification data (operation S902) and edits a receiving state notification using the taken-out receiving state notification data (operation S903).

Then, the aggregation apparatus 40 transmits the receiving state notification to the contents distribution apparatus (or an upper aggregation apparatus) (operation S904) and causes the effectiveness display in the receiving state aggregation to be "effective" (operation S905).

Thus, since the aggregation apparatus 40 aggregates the receiving state notifications of the multiple client apparatuses 30 and notifies the result to the contents distribution apparatus, it is possible to efficiently transmit all packets to the client apparatuses while reducing the load on the contents distribution apparatus 10*b*.

Fourth Embodiment

Figure 33:
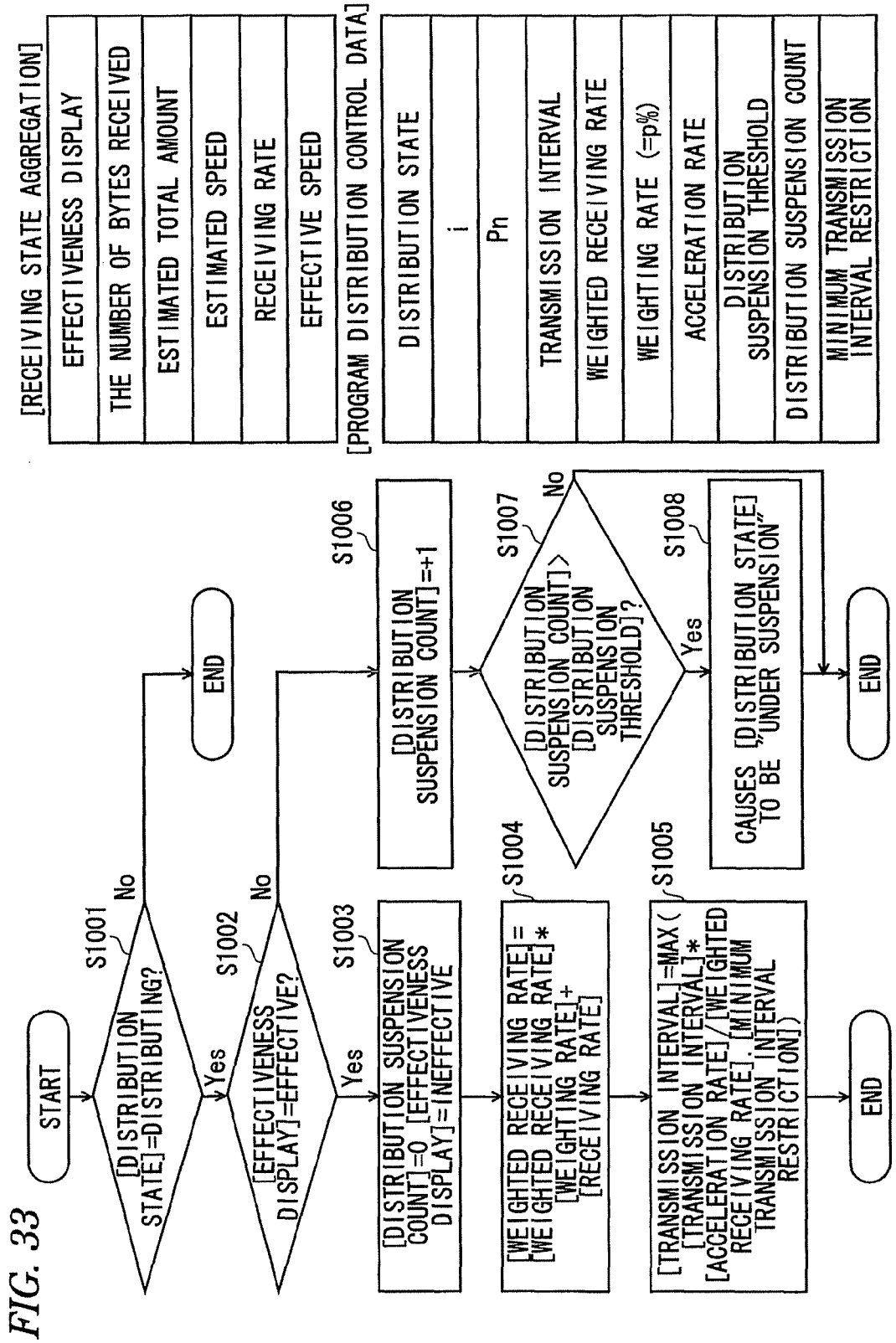
FIG. 33 is a flowchart illustrating the operation of transmission speed parameter adjustment processing by a contents distribution apparatus according to a fourth embodiment.

In the above embodiment, the program transfer packet transmission interval may be adjusted by performing weighting according to the time elapsed. Accordingly, in a fourth embodiment described below, the configuration of and the processing by a contents distribution apparatus 10*c* in the fourth embodiment will be described as a case where the contents distribution apparatus 10*c* adjusts the program transfer packet transmission interval by performing weighting according to the time elapsed, with the use of FIGS. 32 to 36. FIG. 32 is a diagram for illustrating an example of the control data configuration of the contents distribution apparatus. FIG. 33 is a flowchart illustrating the operation of transmission speed parameter adjustment processing by the contents distribution apparatus according to the fourth embodiment.

First, an example of the control data configuration of the contents distribution apparatus 10*c* according to the fourth embodiment will be described with the use of FIG. 32. As illustrated in FIG. 32, in the program distribution control data stored by a program distribution control data storage section of the contents distribution apparatus 10*c* according to the fourth embodiment, there are newly stored a "weighted receiving rate" and a "weighting rate", in comparison with the program distribution data illustrated in FIG. 23. The "weighted receiving rate" and the "weighting rate" are parameters for adjusting the transmission interval in the program distribution control data by performing weighting according to the time elapsed.

Next, the transmission speed parameter adjustment processing by the contents distribution apparatus 10*c* according to the fourth embodiment will be described. The contents distribution apparatus 10*c* executes the transmission speed parameter adjustment processing described below at a predetermined cycle (for example, at a 10-second cycle) to adjust the program transfer packet transmission interval.

First, the transmission speed parameter adjustment processing by the contents distribution apparatus 10*c* will be described with the use of FIG. 33. As illustrated in the figure, if the distribution state in the program distribution control data is "distributing" (operation S1001: YES), the contents distribution apparatus 10*c* judges whether the effectiveness display in the receiving state aggregation indicates "effective" (operation S1002).

As a result, if the effectiveness display in the receiving state aggregation indicates "ineffective" (operation S1002: NO), the contents distribution apparatus 10c adds 1 to the distribution suspension count in the program distribution control data (operation S1006) and judges whether the distribution suspension count is above the distribution suspension threshold (operation S1007). As a result, if the distribution suspension count is above the distribution suspension threshold (operation S1007: YES), the contents distribution apparatus 10c causes the distribution state in the program distribution control data to be "under suspension" (operation S1008). If the distribution suspension count is equal to or below the distribution suspension threshold (operation S1007: NO), the contents distribution apparatus 10a terminates the processing.

If the effectiveness display in the receiving state aggregation indicates "effective" (operation S1002: YES), the contents distribution apparatus 10c causes the distribution suspension count in the program distribution control data to be "0" and causes the effectiveness display in the receiving state aggregation to be "ineffective" (operation S1003). Then, the contents distribution apparatus 10c multiplies the weighted receiving rate in the program distribution control data by the weighting rate, and adds the receiving rate (operation S1004).

After that, the contents distribution apparatus 10c updates the transmission interval in the program distribution control data using a value which is obtained by dividing a value obtained by multiplying the transmission interval in the program distribution control data by the acceleration rate in the program distribution control data, by the weighted receiving rate and which does not exceed the minimum transmission interval restriction as a new "transmission interval" (operation S1005).

Thus, since the transmission interval in the program distribution control data is adjusted by performing weighting according to the time elapsed, it is possible to adjust the program transfer packet transmission interval according to the time elapsed, and, as a result, it is possible to efficiently transmit all packets to the client apparatuses.

Fifth Embodiment

Figure 35:
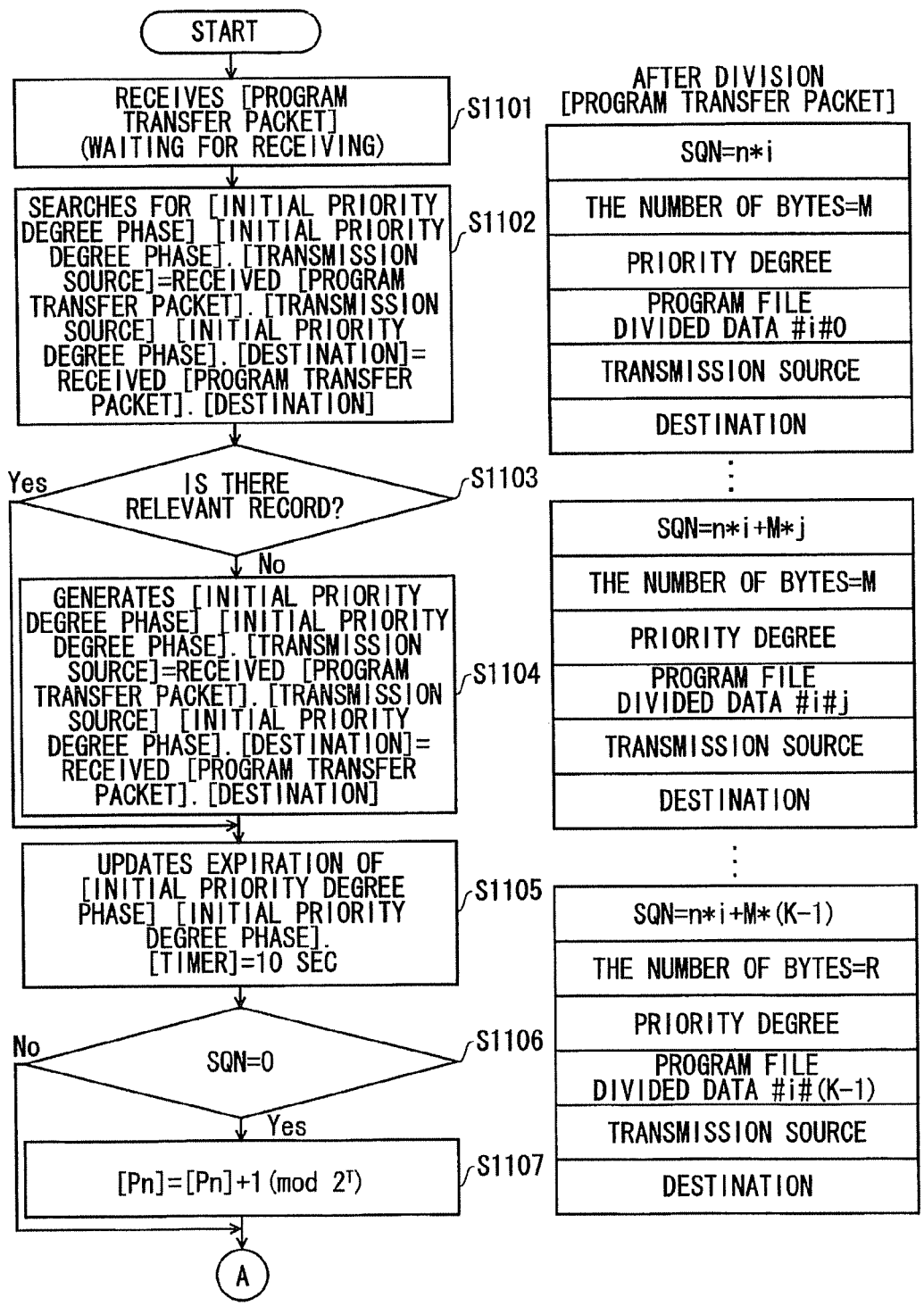
FIG. 35 is a flowchart (1) illustrating the operation of relay processing by the relay apparatus according to a fifth embodiment.
Figure 36A:
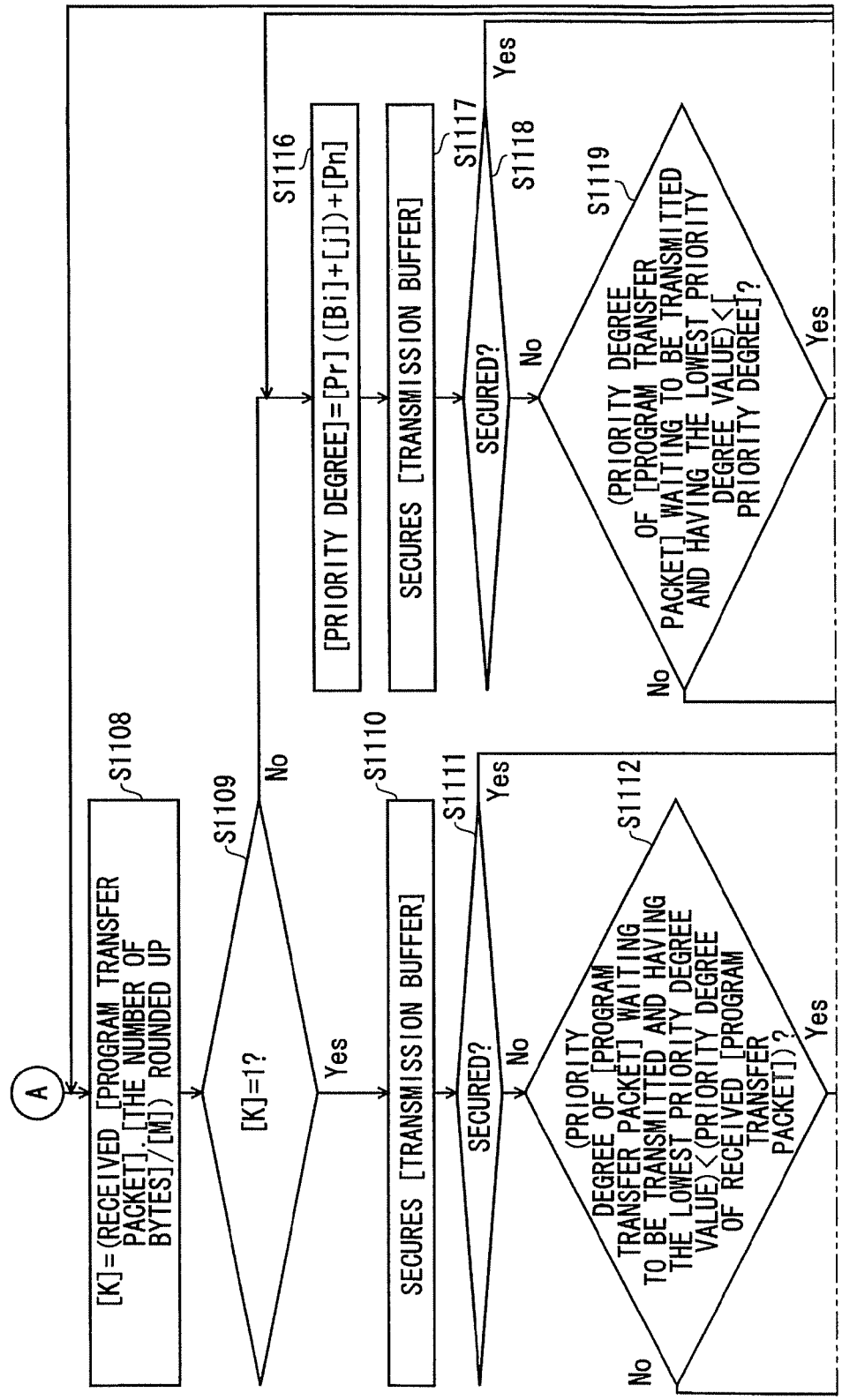
FIGS. 36A and 36B are flowcharts (2) illustrating the operation of the relay processing by the relay apparatus according to the fifth embodiment.
Figure 36B:
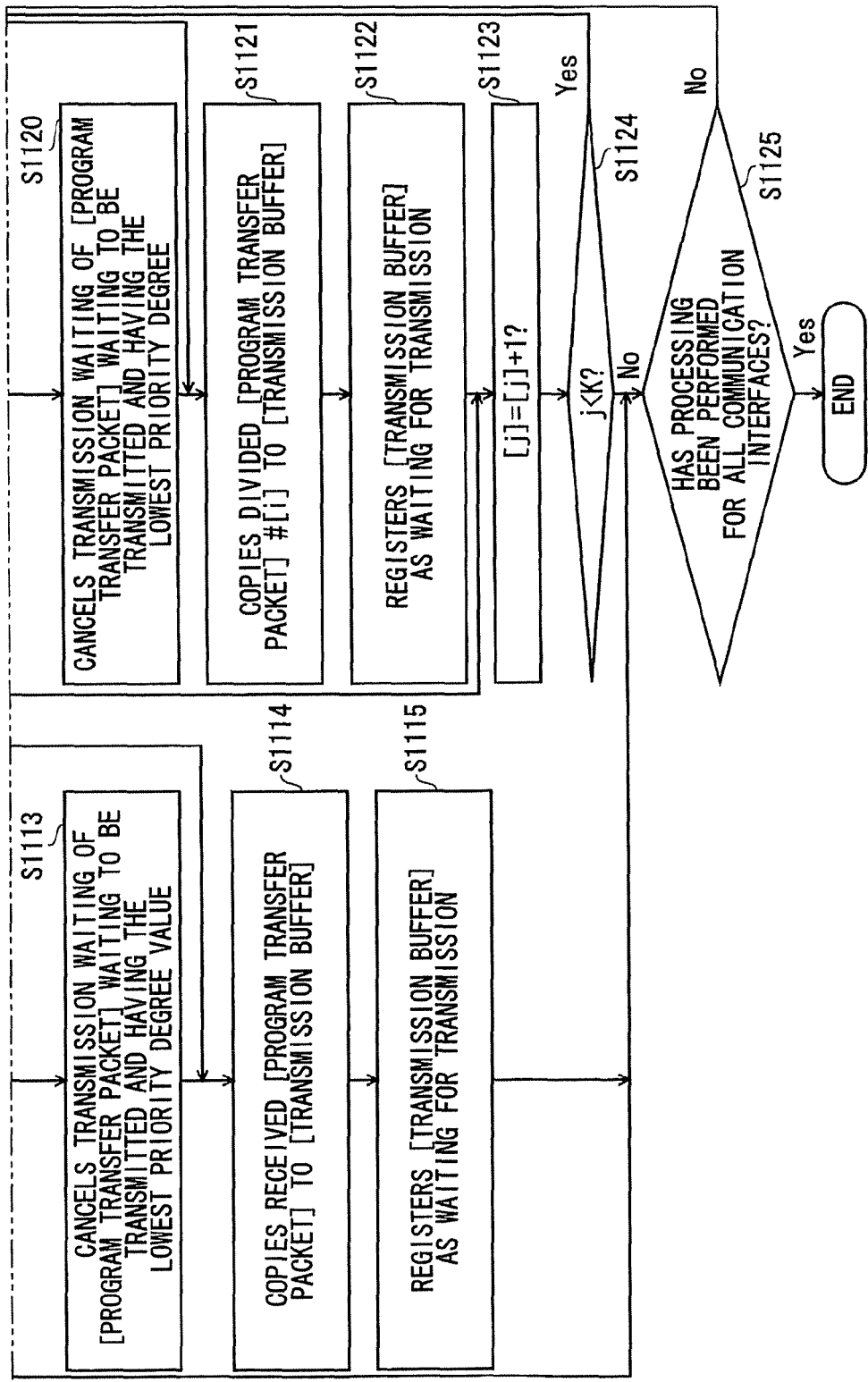

In the above embodiment, the relay apparatus may subdivide a program transfer packet. Accordingly, in a fifth embodiment described below, the configuration of and the processing by a relay apparatus 20a in the fifth embodiment will be described as a case where the relay apparatus 20a performs subdivision when the size of a received program transfer packet is large, with the use of FIGS. 34 to 36. FIG. 34 is a diagram illustrating an example of the control data configuration of the relay apparatus. FIGS. 35 and 36 are flowcharts illustrating the operation of relay processing by the relay apparatus according to a fifth embodiment.

First, an example of the control data configuration of the relay apparatus 20a according to the fifth embodiment will be described with the use of FIG. 34. As illustrated in FIG. 34, the relay apparatus 20a according to the fifth embodiment newly stores a "priority degree correspondence table" in which a phase "x" and a priority degree "Pr(x)" corresponding to the phase are associated with each other, "initial priority degree phase information" for each program file and "program division control data" for each communication interface.

The relay apparatus 20a stores "Pn" indicating the number of rounds for program transfer packets, a "transmission source" indicating the transmission source of the program transfer packets, a "destination" indicating the transmission destination of the program transfer packets and a "timer" indicating the expiration of the initial priority degree phase information, as the "initial priority degree phase information".

The relay apparatus 20a also stores, for each communication interface, "M" indicating a subdivider as "program subdivision control data". The "M" is a fixed value for each communication interface, and a power of 2 is desirable.

Next, the relay processing by the relay apparatus 20a according to the fifth embodiment will be described with the use of FIGS. 35 and 36. The relay apparatus 20a performs the relay processing described below, subdivides a received program transfer packet, and transmits divided program transfer packets.

When receiving a program transfer packet from the contents distribution apparatus 10 (operation S1101), the relay apparatus 20a searches for an initial priority degree phase corresponding to the "transmission source" and the "destination" of the received program transfer packet (operation S1102).

As a result of the search, if there is not a corresponding record (operation S1103: NO), the relay apparatus 20a newly generates an initial priority degree phase (operation S1104). If there is a corresponding record (operation S1103: YES), the relay apparatus 20a advances to S1105.

Then, the relay apparatus 20a updates the expiration of the initial priority degree phase to ten seconds (operation S1105) and judges whether the sequence number (SQN) is "0" (operation S1106). If the sequence number is "0" (operation 1106: YES), the relay apparatus 20a adds 1 to the number of transmission rounds "Pn" in the program distribution control data (operation S1107). If the sequence number is not "0" (operation S1106: NO), the relay apparatus 20a advances to S1108.

Next, the relay apparatus 20a sets a value which is obtained by dividing the number of bytes of the received program transfer packet by "M" in the program division control data as "K", sets a value which is obtained by multiplying a value obtained by dividing the sequence number by the received program transfer packet, by "K" as "Bi", and sets the value of "j" as "0" (operation S1108).

Then, the relay apparatus 20a judges whether "K" is 1 (operation s1109). As a result, if "K" is 1 (operation S1109: YES), the relay apparatus 20a secures the transmission buffer (operation S1110) and judges whether the transmission buffer is secured (operation S1111).

As a result, if the transmission buffer is not secured (operation S1111: NO), the packet relay apparatus 20a judges whether the priority degree of the received program transfer packet is higher than the priority degree of a program transfer packet waiting to be transmitted and having the lowest priority degree (operation S1112).

As a result, if the priority degree of the received program transfer packet is higher than the priority degree of the program transfer packet waiting to be transmitted and having the lowest priority degree (operation S1112: YES), the packet relay apparatus 20a cancels the transmission waiting of the program transfer packet waiting to be transmitted and having the lowest priority degree (operation S1113).

If the transmission buffer is secured at S1111 (operation S1111: YES), the packet relay apparatus 20 advances to S1114 without discarding a program transfer packet waiting to be transmitted.

Then, the packet relay apparatus 20a copies the received program transfer packet to the transmission buffer (operation S1114), registers the transmission buffer as waiting for transmission (operation S1115) and advances to S1125.

If the priority degree of the received program transfer packet is lower than the priority degree of the program transfer packet waiting to be transmitted and having the lowest priority degree at S1112 (operation S1112: NO), the packet relay apparatus 20a advances to S1125 without copying the received program transfer packet to the transmission buffer.

Returning to the description of S1109, if "K" is not 1 (operation S1109: NO), the packet relay apparatus 20a sets the priority of divided program transfer packets as "Pr(Bi+j)+Pn" (operation S1116), secures the transmission buffer (operation S1117) and judges whether the transmission buffer is secured (operation S1118).

As a result, if the transmission buffer is not secured (operation S1118: NO), the packet relay apparatus 20a judges whether the priority degree of the received program transfer packet is higher than the priority degree of the program transfer packet waiting to be transmitted and having the lowest priority degree (operation S1119).

As a result, if the priority degree set at S1116 is higher than the priority degree of the program transfer packet waiting to be transmitted and having the lowest priority degree (operation S1119: YES), the packet relay apparatus 20a cancels the transmission waiting of the program transfer packet waiting to be transmitted and having the lowest priority degree (operation S1120).

If the transmission buffer is secured at S1118 (operation S1118: YES), the packet relay apparatus 20a advances to S1121 without discarding a program transfer packet waiting to be transmitted.

Then, the packet relay apparatus 20a copies the received program transfer packet "#i" to the transmission buffer (operation S1121) and registers the transmission buffer as waiting for transmission (operation S1122).

If the priority degree set at S1116 is lower than the priority degree of the program transfer packet waiting to be transmitted and having the lowest priority degree at S1119 (operation S1119: NO), the packet relay apparatus 20a advances to S1123 without copying the received program transfer packet to the transmission buffer.

Then, the packet relay apparatus 20a sets a value obtained by adding 1 to "j" as "j" (operation S1123), judges whether "j" is smaller than "K" (operation S1124). If "j" is smaller than "K" (operation S1124: YES), the packet relay apparatus 20a returns to S1116. If "j" is equal to or larger than "K" (operation S1124: NO), the packet relay apparatus 20a advances to S1125.

After that, the packet relay apparatus 20a judges whether the processing of S1108 to S1123 has been performed for all the communication interfaces (operation S1125). If the processing has not been performed for all the communication interfaces (operation S1125: NO), the packet relay apparatus 20 repeats the processing of S1108 to S1124 until the processing is performed for all the communication interfaces. When the processing has been performed for all the communication interfaces (operation S1125: YES), the packet relay apparatus 20a terminates the relay processing.

Thus, since the packet relay apparatus 20a performs subdivision if the size of a program transfer packet received by the relay apparatus 20a is large, it is possible to efficiently transmit all packets to the client apparatuses 30 even if the size of a program transfer packet is large and subdivision by the relay apparatus 20a is required.

Sixth Embodiment

In the above embodiment, the contents distribution apparatus may automatically adjust a retransmission starting position. Accordingly, in a sixth embodiment described below, the configuration of and the processing by a contents distribution apparatus 10d in the sixth embodiment will be described as a case where the contents distribution apparatus 10d automatically adjusts the retransmission starting position, with the use of FIGS. 37 to 42.

Figure 39A:
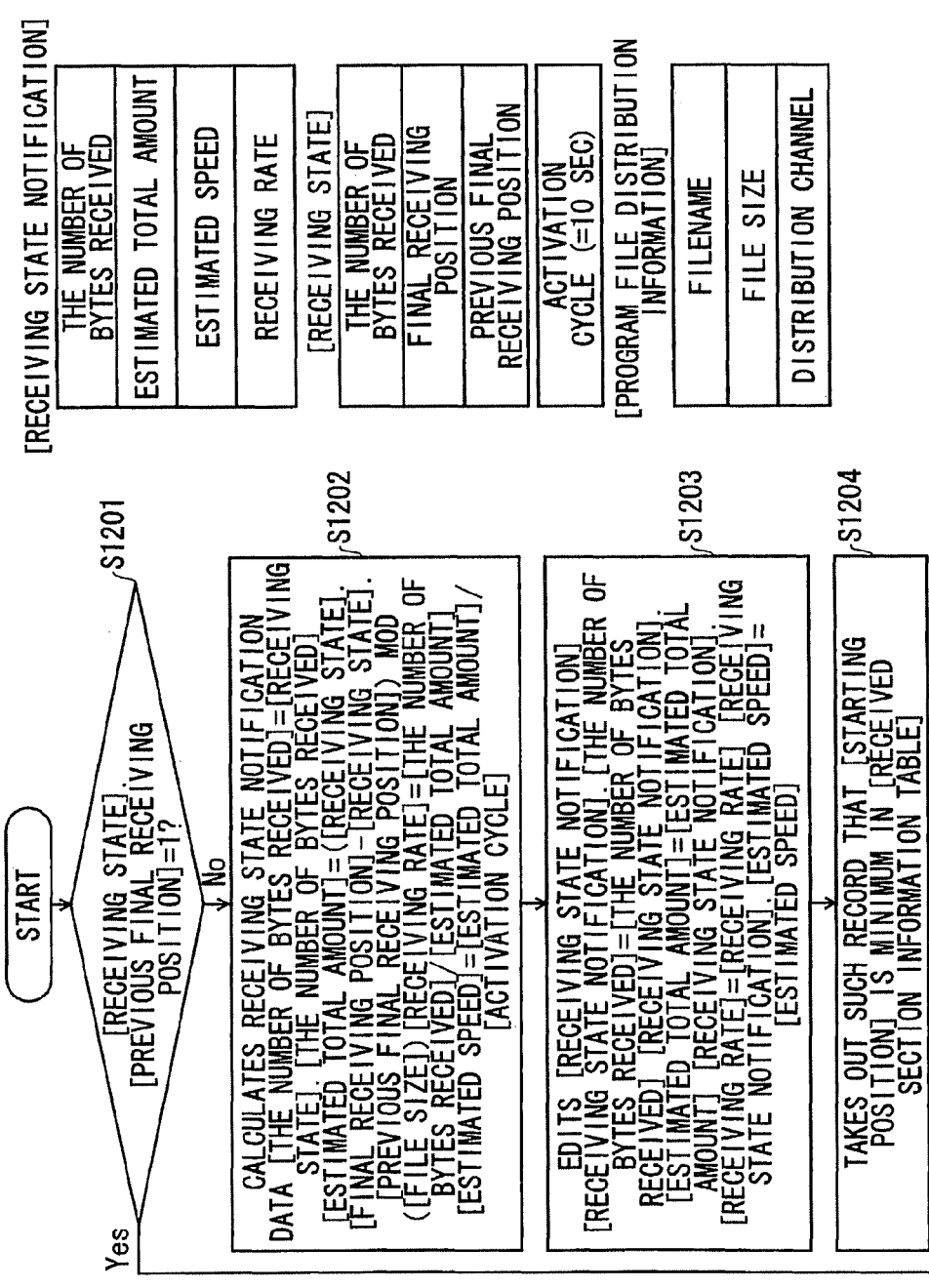
FIGS. 39A and 39B are flowcharts illustrating the operation of retransmission starting position specification transmission processing by a client apparatus according to a sixth embodiment.
Figure 39B:
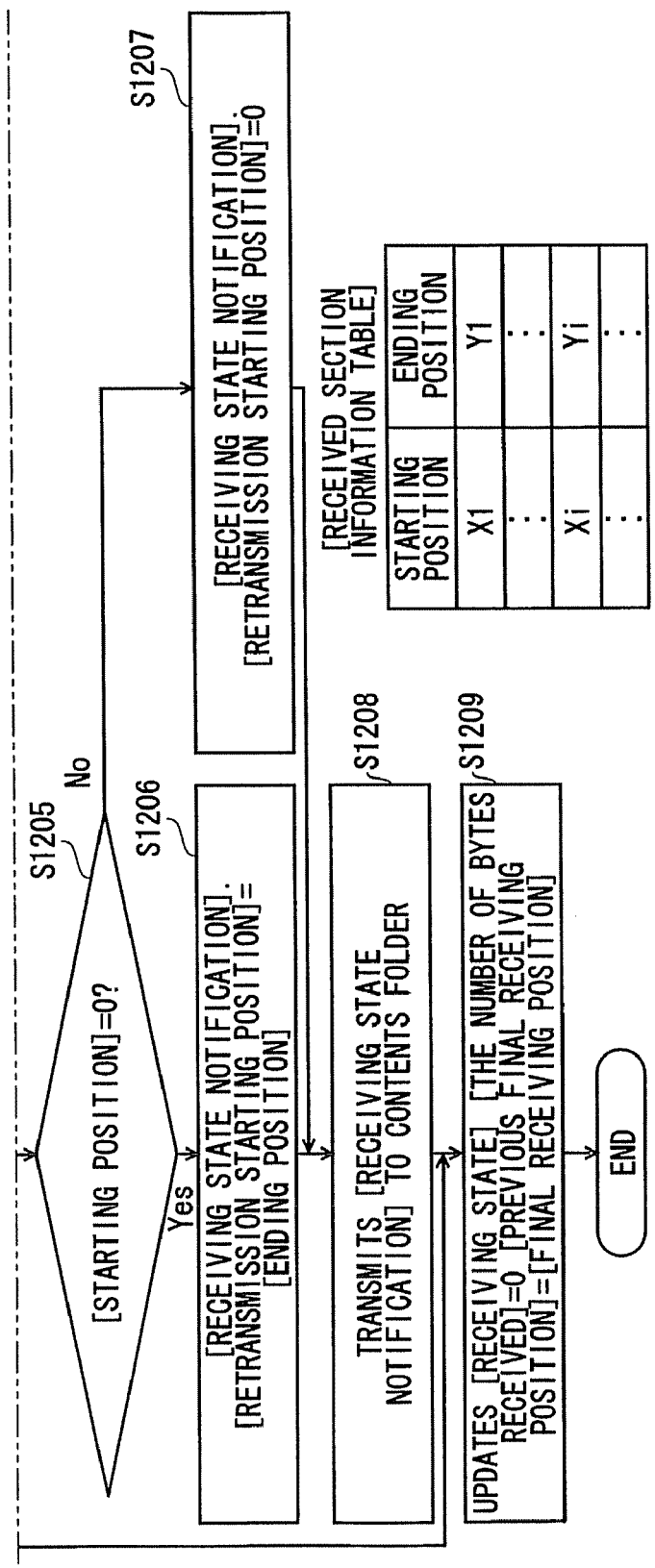
Figure 40A:
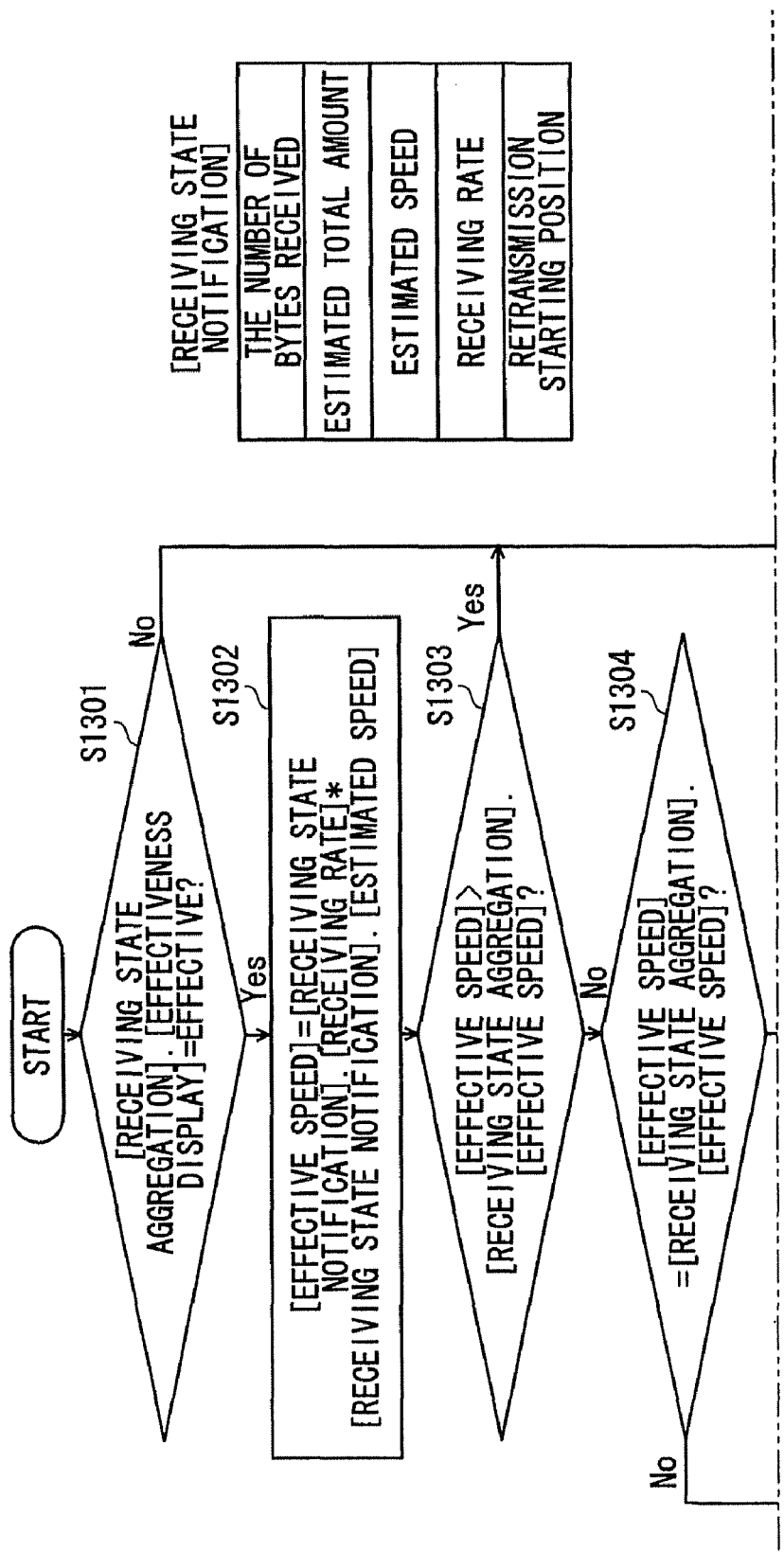
FIGS. 40A and 40B are flowcharts illustrating the operation of retransmission starting position specification receiving processing by a contents distribution apparatus according to the sixth embodiment.
Figure 40B:
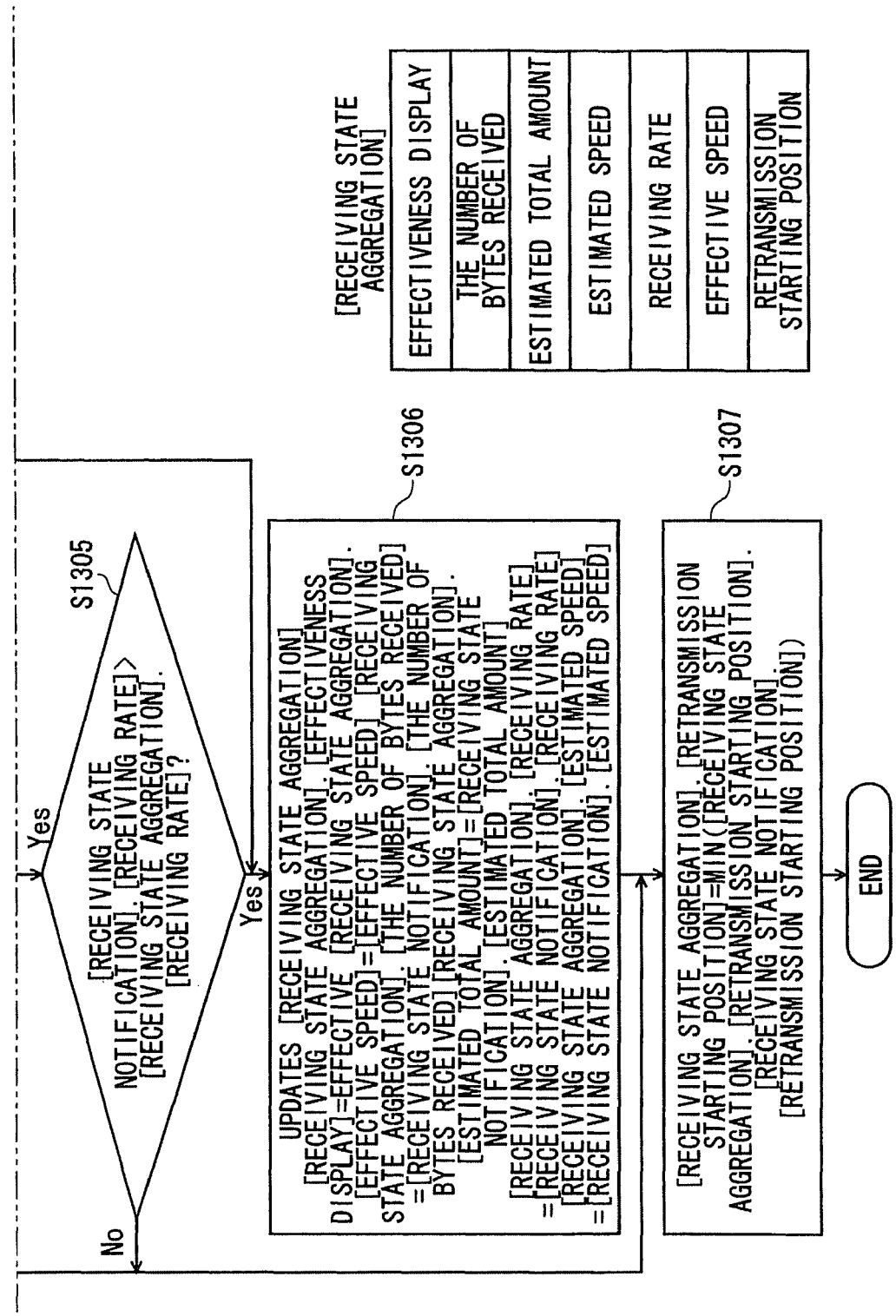
Figure 41A:
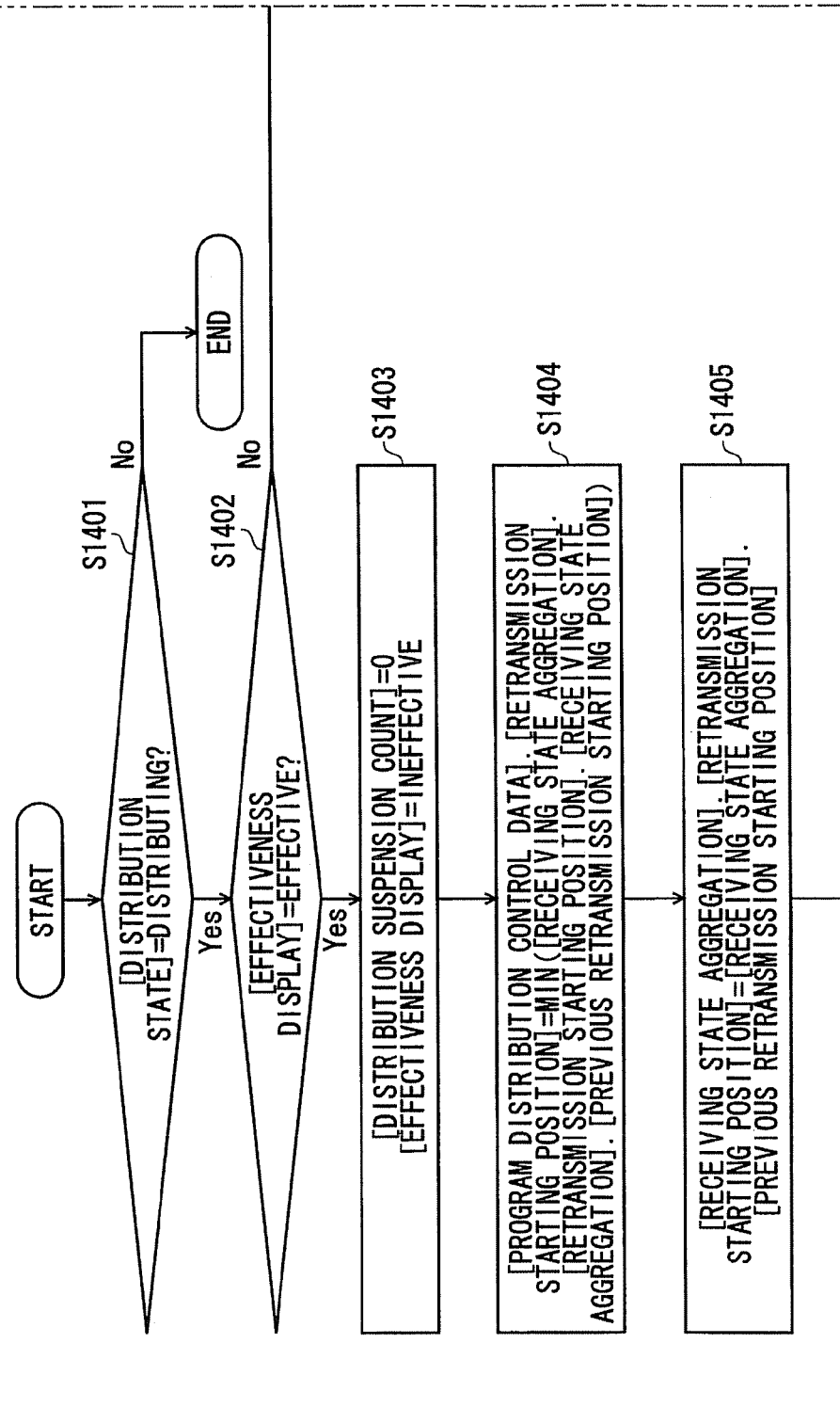
FIGS. 41A-D are flowcharts illustrating the operation of parameter adjustment processing by the contents distribution apparatus according to the sixth embodiment.
Figure 41B:
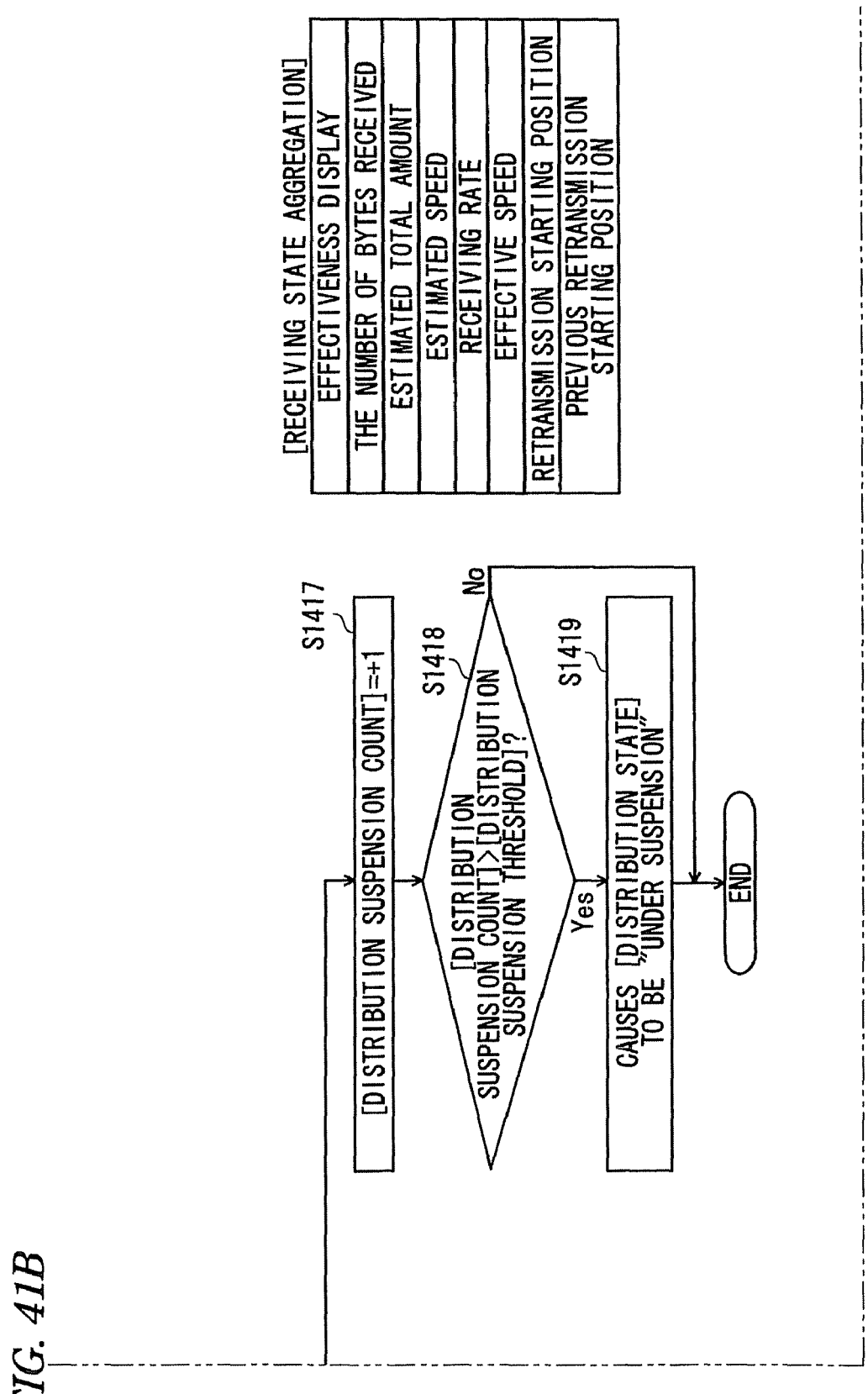
Figure 41C:
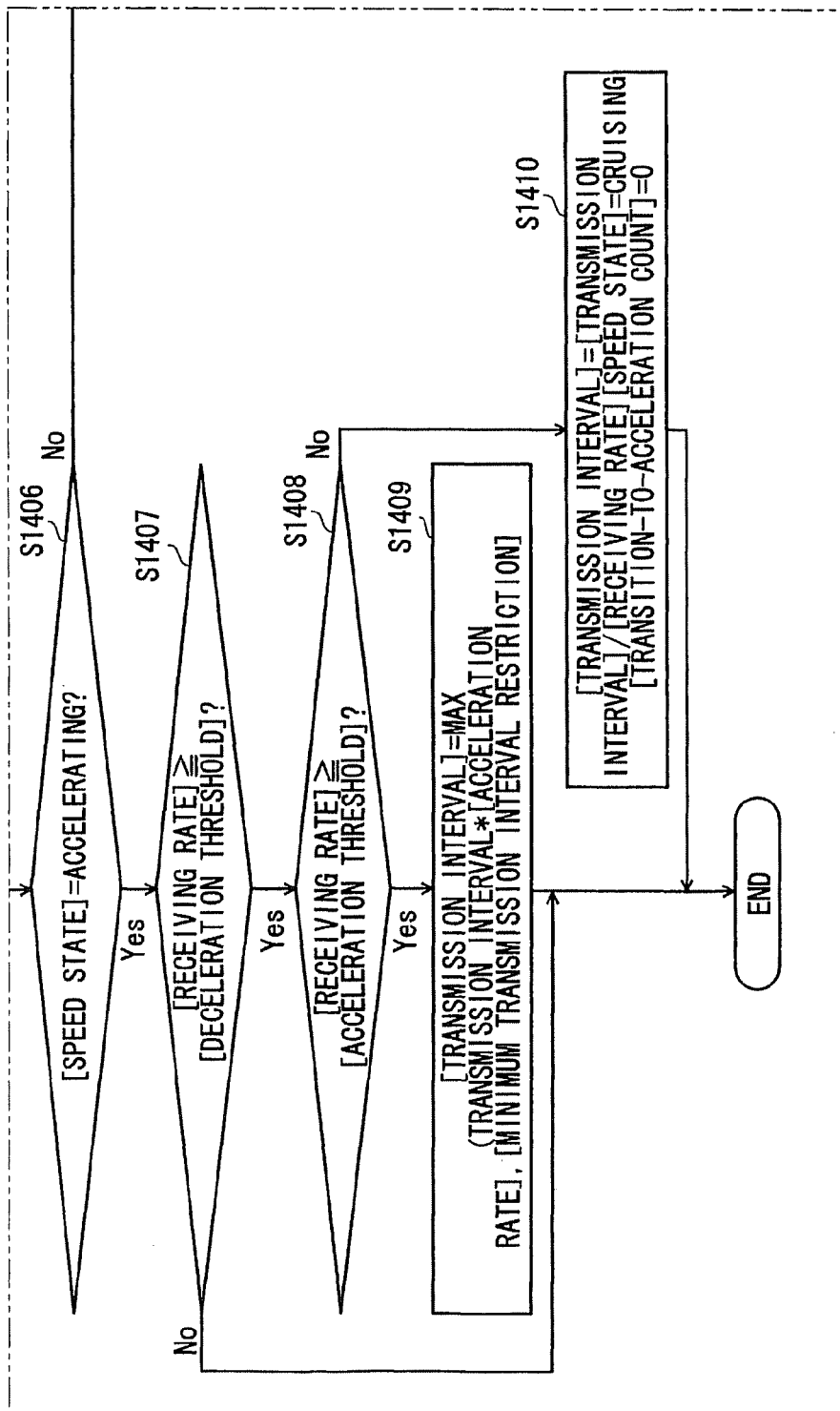
Figure 41D:
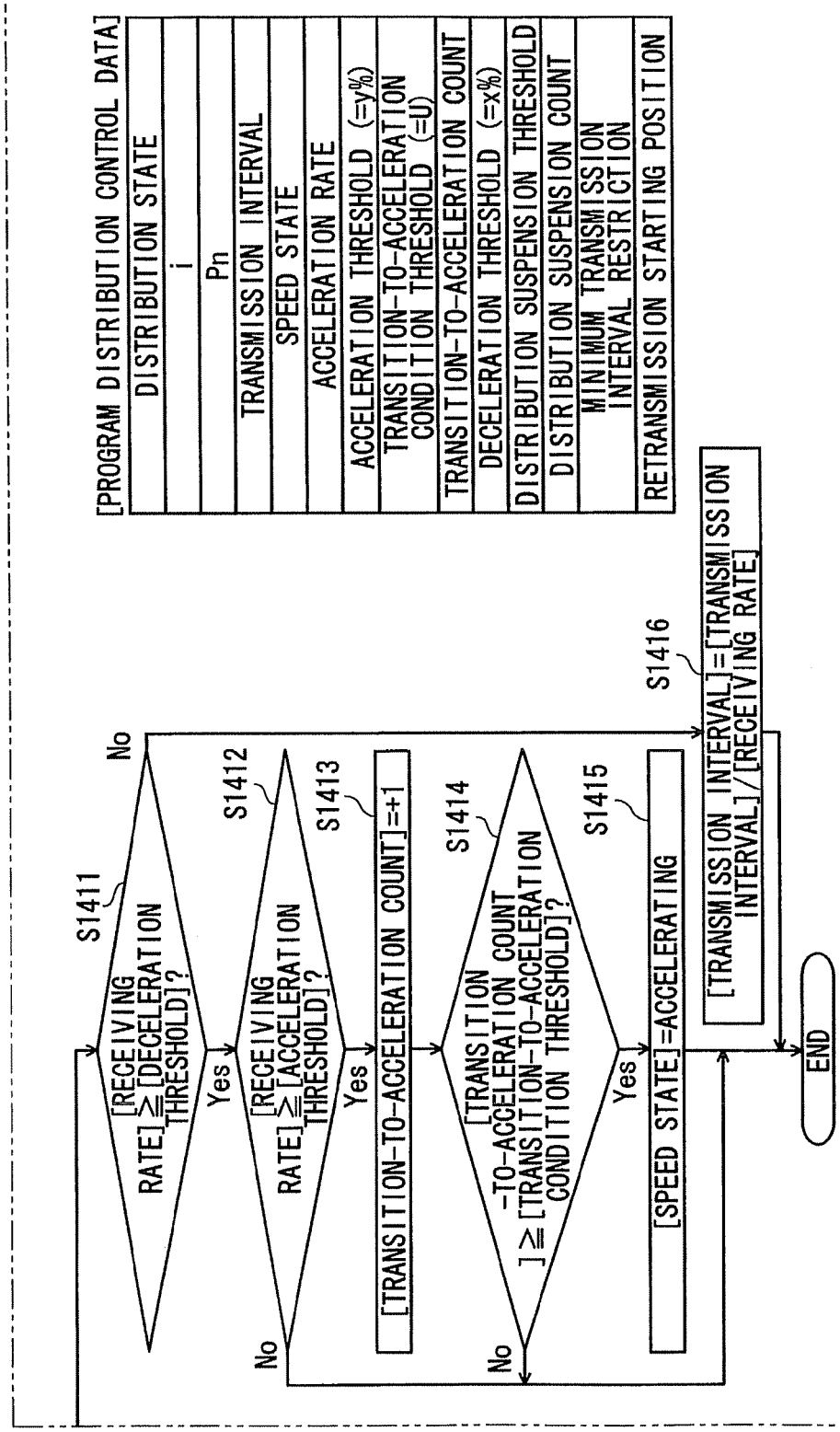
Figure 42:
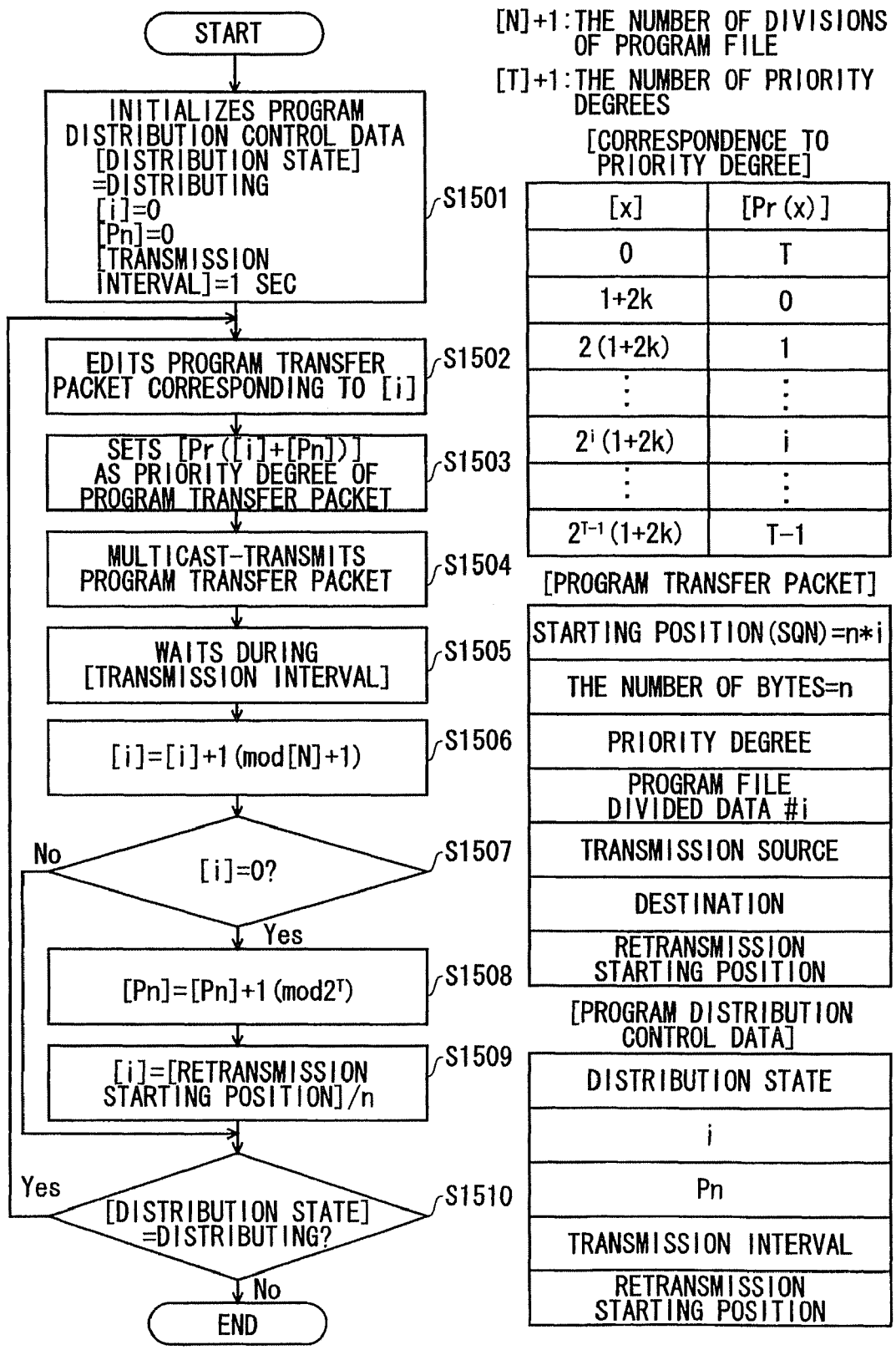
FIG. 42 is a flowchart illustrating the operation of program transfer packet transmission processing by the contents distribution apparatus according to the sixth embodiment.

FIG. 37 is a diagram illustrating an example of the data configuration of a receiving state notification. FIG. 38 is a diagram illustrating an example of the control data configuration of a contents folder. FIGS. 39A and 39B are flowcharts illustrating the operation of retransmission starting position specification transmission processing by a client apparatus according to the sixth embodiment. FIGS. 40A and 40B are flowcharts illustrating the operation of retransmission starting position specification receiving processing by the contents distribution apparatus according to the sixth embodiment. FIGS. 41A-D are flowcharts illustrating the operation of parameter adjustment processing by the contents distribution apparatus according to the sixth embodiment. FIG. 42 is a flowchart illustrating the operation of program transfer packet transmission processing by the contents distribution apparatus according to the sixth embodiment.

First, a "receiving state notification" for the client apparatus 30b according to the sixth embodiment to notify the contents distribution apparatus 10d of a program transfer packet receiving state is illustrated in FIG. 37. In the "receiving state notification" transmitted by the client apparatus 30b according to the sixth embodiment, there is newly stored a "retransmission starting position" indicating a position at which starting of retransmission of a program transfer packet is requested, in comparison with the "receiving state notification" transmitted by the client apparatus 30a according to the second embodiment illustrated in FIG. 25.

Program distribution control data of the contents distribution apparatus 10d according to the sixth embodiment is illustrated in FIG. 38. In the "program distribution control data" of the contents distribution apparatus 10d according to the sixth embodiment, a "retransmission starting position" which is the program transfer packet retransmission starting position determined by receiving state notifications received from multiple client apparatuses 30b, in comparison with the "receiving state aggregation" of the contents distribution apparatus 10a according to the second embodiment illustrated in FIG. 23.

An example of the control data configuration of the contents distribution apparatus 10d according to the sixth embodiment is illustrated in FIG. 38. In the "receiving state aggregation" of the contents distribution apparatus 10d according to the sixth embodiment, there are newly stored a "retransmission starting position" which is a retransmission starting position obtained by aggregating transmission/receiving state notifications received from the multiple client apparatuses and a "previous retransmission starting position" indicating the previous retransmission starting position, in comparison with the "receiving state aggregation" of the contents distribution apparatus 10a according to the second embodiment illustrated in FIG. 23.

In the contents distribution apparatus 10d, each time one round of transmission of program transfer packets is performed, the position of the top divided data in the round is determined in accordance with the "retransmission starting position" in the program distribution control data, and transmits a program transfer packet.

Next, the retransmission starting position specification transmission processing by the client apparatus 30b according to the sixth embodiment will be described. The retransmission starting position specification transmission processing by the client apparatus 30b according to the sixth embodiment is different from the receiving state notification transmission processing illustrated in FIG. 26 in that a transmission/receiving state notification including a retransmission starting position is transmitted to the contents distribution apparatus 10d.

That is, as illustrated in FIGS. 39A and 39B, after editing a receiving state notification (operation S1203), the client apparatus 30b takes out such a record with the minimum starting position in the received section information table 33b (operation S1204) and judges whether the starting position is "0" (operation S1205).

If the starting position is "0" (operation S1205: YES), the client apparatus 30b sets the retransmission starting position in the receiving state notification as an "ending position" (operation S1206) and transmits the receiving state notification to the contents distribution apparatus 10d (operation S1208).

If the starting position is not "0" (operation S1205: NO), the client apparatus 30b sets the retransmission starting position in the receiving state notification to "0" (operation S1207) and transmits the receiving state notification to the contents distribution apparatus 10d (operation S1208).

Next, receiving state notification receiving processing, transmission speed parameter adjustment processing, and program transfer packet transmission processing by the contents distribution apparatus 10d will be described. When receiving receiving state notifications, the contents distribution apparatus 10d performs the receiving state notification receiving processing described below and aggregates receiving states of the lot of client apparatuses.

The receiving state notification receiving processing by the contents distribution apparatus 10d is different from the receiving state notification receiving processing illustrated in FIG. 27 in that the retransmission starting position in the receiving state aggregation is obtained by aggregation. That is, as illustrated in FIGS. 40A and 40B, after updating the receiving state aggregation (operation S1306), the contents distribution apparatus 10d stores any of the "retransmission starting position" in the receiving state aggregation and the "retransmission starting positions" in the receiving state notifications, that is the minimum, as the retransmission starting position in the receiving state aggregation (operation S1307).

Next, the transmission speed parameter adjustment processing by the contents distribution apparatus 10d will be described. The contents distribution apparatus 10d executes the transmission speed parameter adjustment processing described below at a predetermined cycle (for example, at a 10-second cycle) to adjust the program transfer packet transmission interval and the retransmission starting position.

The transmission speed parameter adjustment processing by the contents distribution apparatus 10d is different from the transmission speed parameter adjustment processing illustrated in FIGS. 28A-D in that the retransmission starting position is adjusted. That is, after setting the distribution suspension count in the program distribution control data to "0" and setting the effectiveness display in the receiving state aggregation as "ineffective" (operation S1403), the contents distribution apparatus 10d stores any of the "retransmission starting position" in the receiving state aggregation and the "previous retransmission starting position" in the receiving state aggregation, that is the minimum, as the retransmission starting position in the receiving state aggregation (operation S1404), as illustrated in FIGS. 41A-D.

Then, after updating the "retransmission starting position" in the receiving state aggregation with the "previous retransmission starting position" in the receiving state aggregation (operation S1405), the contents distribution apparatus 10d performs processing for adjusting the program transfer packet transmission interval (operations S1406 to S1416).

Next, the program transfer packet transmission processing by the contents distribution apparatus 10d will be described. The contents distribution apparatus 10d executes the program transfer packet transmission processing described below. Each time one round of transmission of program transfer packets is performed, the contents distribution apparatus 10d determines the position of the top divided data in the round in accordance with the "retransmission starting position" in the program distribution control data, and transmits program transfer packets.

The program transfer packet transmission processing by the contents distribution apparatus 10d is different from the program transfer packet transmission processing illustrated in FIG. 18 in that the retransmission starting position is automatically adjusted. That is, as illustrated in FIG. 42, after adding 1 to the number of transmission rounds "Pn" in the program distribution control data (operation S1508), the contents distribution apparatus 10d updates "i" with the "retransmission starting position" in the program distribution control data (operation S1509).

Thus, since the contents distribution apparatus automatically adjusts the retransmission starting position and skips a divided block which has been already received to shorten distribution time, it is possible to transmit all packets to the client apparatuses more efficiently.

Seventh Embodiment

Though description has been made on a case where the contents distribution apparatus automatically adjusts the retransmission starting position in the above sixth embodiment, the embodiment is not limited thereto. It is also possible that an aggregation apparatus specifies the retransmission starting position to the contents distribution apparatus.

Accordingly, in a seventh embodiment described below, the configuration of and the processing by an aggregation apparatus 40a in the seventh embodiment will be described as a case where the aggregation apparatus 40a specifies the retransmission starting position to a contents distribution apparatus, with the use of FIGS. 43 to 45.

Figure 44A:
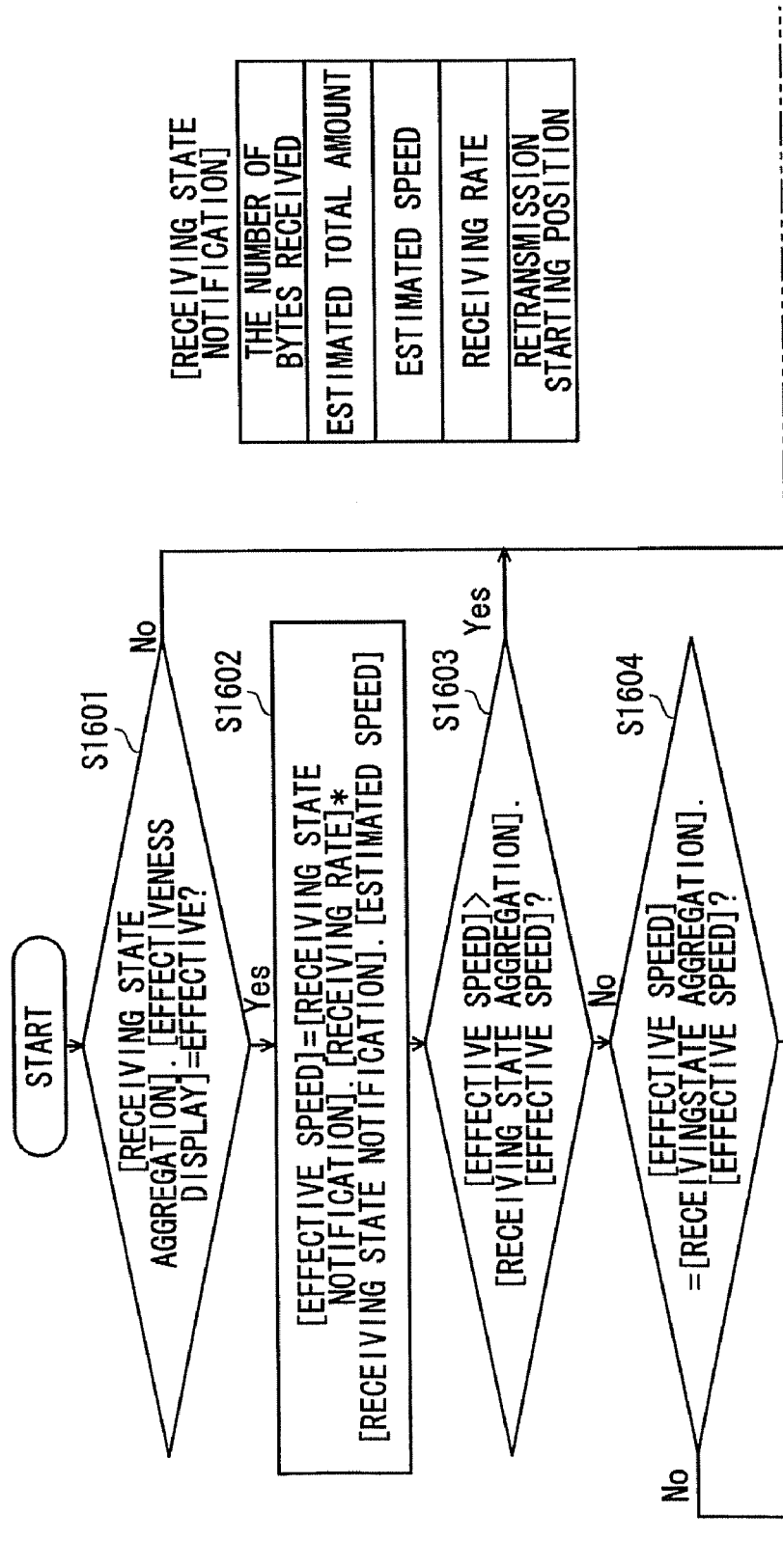
FIGS. 44A and 44B are flowcharts illustrating the operation of retransmission starting position specification receiving processing by an aggregation apparatus according to a seventh embodiment.
Figure 44B:
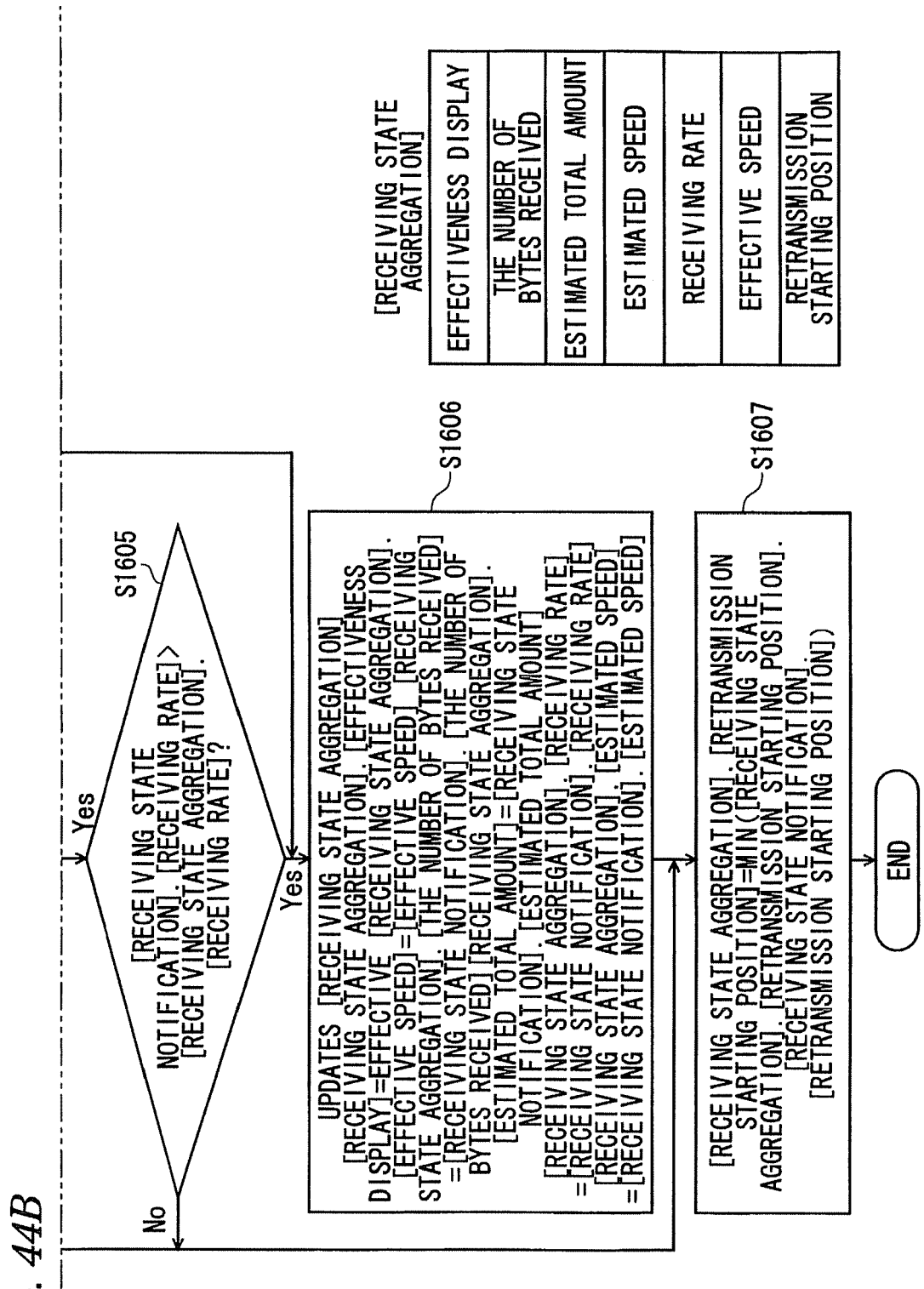

FIG. 43 is a diagram illustrating an example of the control data configuration of the aggregation apparatus. FIGS. 44A and 44B are flowcharts illustrating the operation of retransmission starting position specification receiving processing by the aggregation apparatus according to the seventh embodiment. FIG. 45 is a flowchart illustrating the operation of retransmission starting position specification transmission processing by the aggregation apparatus according to the seventh embodiment.

First, an example of the control data configuration of the aggregation apparatus 40a according to the seventh embodiment will be described with the use of FIG. 43. As illustrated in FIG. 43, the aggregation apparatus 40a according to the seventh embodiment stores "receiving state aggregation" in which receiving states received from multiple client apparatuses are aggregated. The receiving state aggregation has information similar to the information in the receiving state aggregation of the contents distribution apparatus 10d according to the sixth embodiment illustrated in FIG. 38.

Next, the retransmission starting position specification receiving processing and the retransmission starting position specification transmission processing by the aggregation apparatus 40a according to the seventh embodiment will be described. The retransmission starting position specification receiving processing by the aggregation apparatus 40a according to the seventh embodiment is different from the receiving state notification receiving processing illustrated in FIG. 30 in that the retransmission starting position in the receiving state aggregation is obtained by aggregation. That is, as illustrated in FIGS. 44A and 44B, after updating the receiving state aggregation (operation S1606), the aggregation apparatus 40a stores any of the "retransmission starting position" in the receiving state aggregation and the "retransmission starting positions" in the receiving state notifications, that is the minimum, as the retransmission starting position in the receiving state aggregation (operation S1607).

Next, the retransmission starting position specification transmission processing by the aggregation apparatus 40a according to the seventh embodiment will be described. The retransmission starting position specification transmission processing by the aggregation apparatus 40a according to the seventh embodiment is different from the receiving state notification transmission processing illustrated in FIG. 31 in that a transmission/receiving state notification including a retransmission starting position is transmitted to the contents distribution apparatus or an upper aggregation apparatus.

Figure 45:
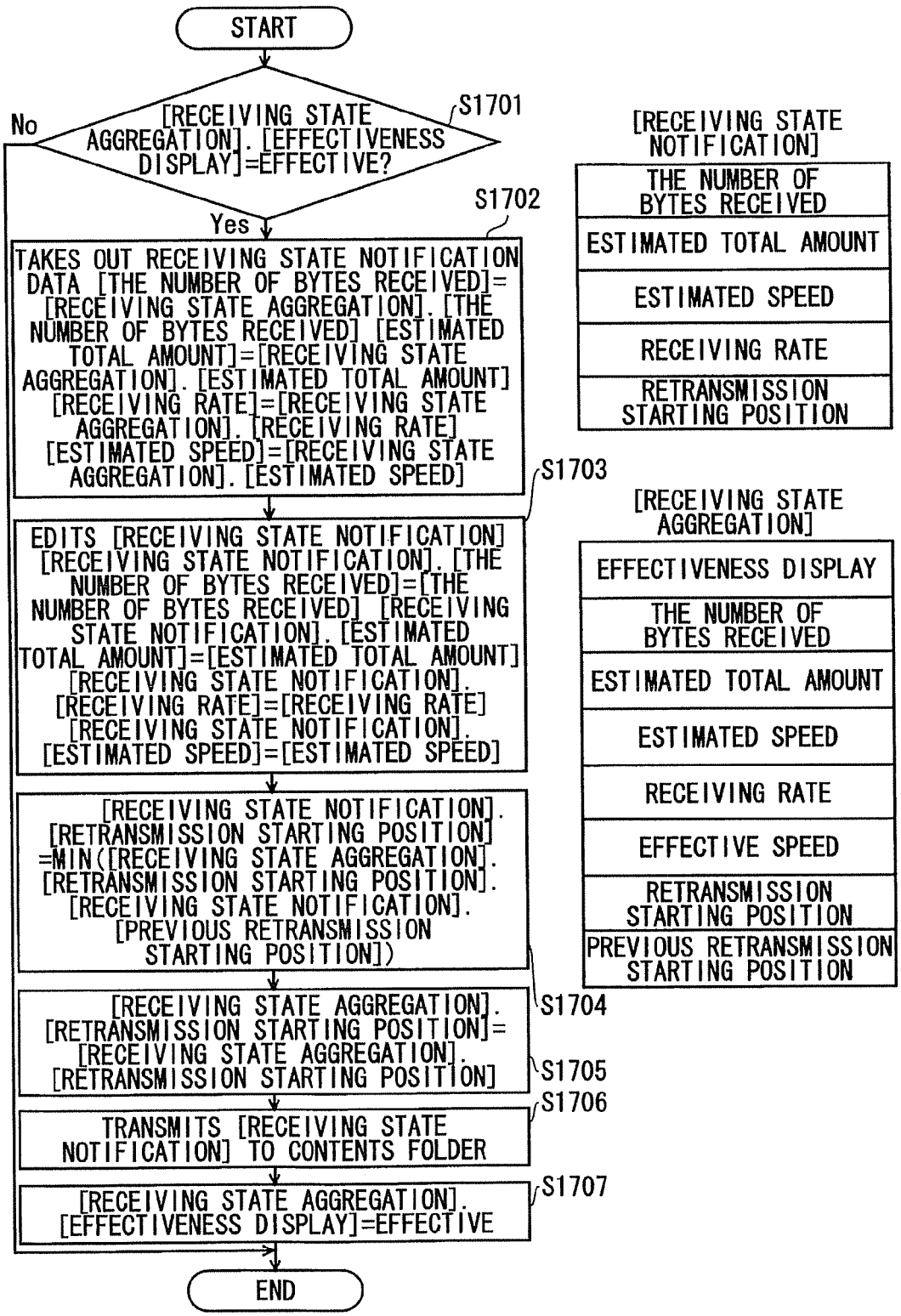
FIG. 45 is a flowchart illustrating the operation of retransmission starting position specification transmission processing by the aggregation apparatus according to the seventh embodiment.

That is, as illustrated in FIG. 45, after editing a receiving state notification using receiving state notification data (operation S1703), the aggregation apparatus 40a stores any of the "retransmission starting position" in the receiving state aggregation and the "previous retransmission starting position" in the receiving state aggregation, that is the minimum, as the retransmission starting position in the receiving state aggregation (operation S1704).

Then, after updating the "previous retransmission starting position" in the receiving state aggregation with the "retransmission starting position" in the receiving state aggregation (operation S1705), the aggregation apparatus 40a transmits a transmission/receiving state notification including the retransmission starting position to the contents distribution apparatus or an upper aggregation apparatus (operation S1706).

Thus, since the aggregation apparatus 40a specifies a retransmission starting position to the contents distribution apparatus, it is possible to efficiently transmit all packets to the client apparatuses while reducing the load on the contents distribution apparatus 10.

Eighth Embodiment

Figure 47A:
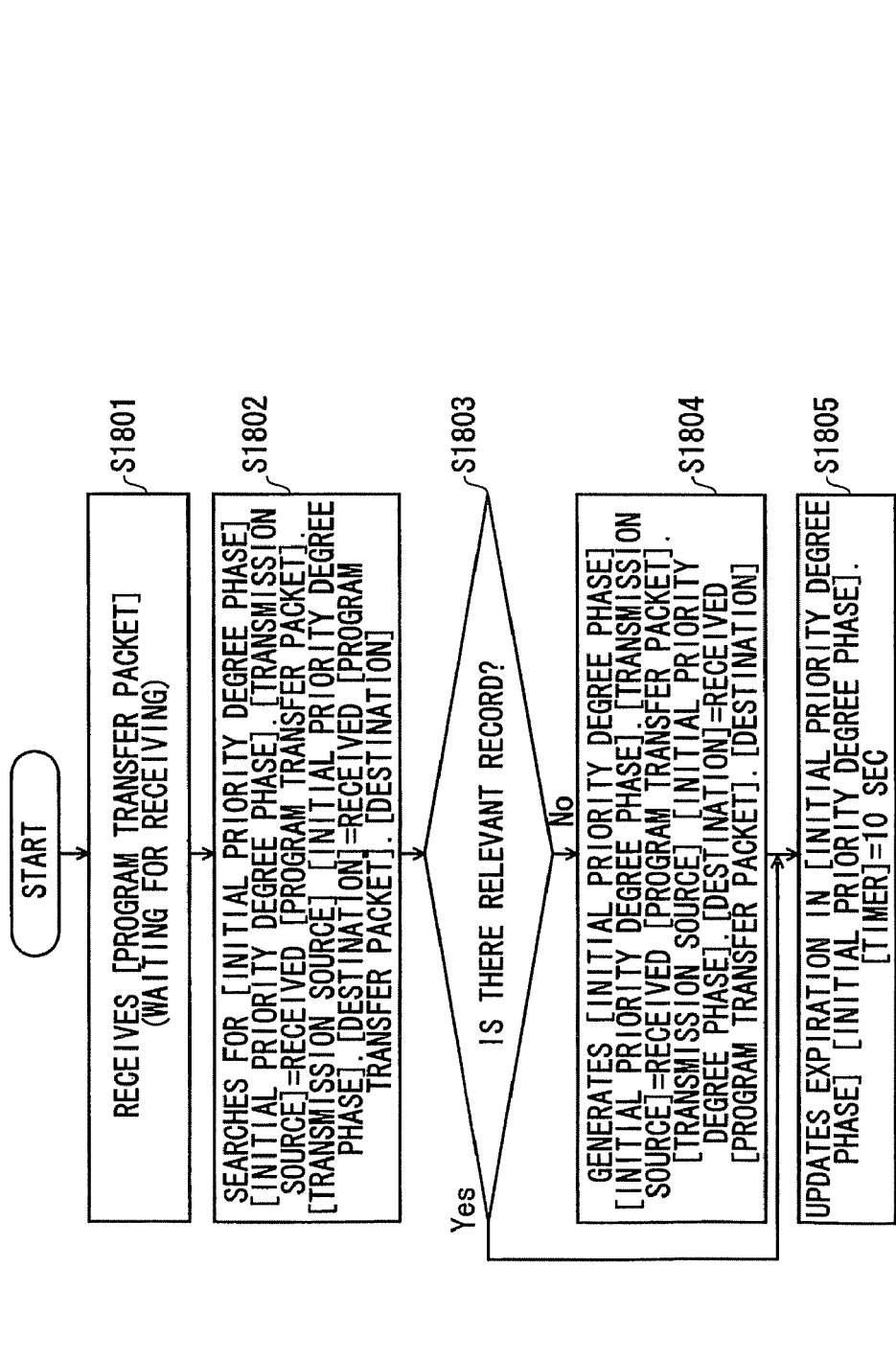
FIGS. 47A and 47B are flowcharts (1) illustrating the operation of relay processing by a relay apparatus according to an eighth embodiment.
Figure 47B:
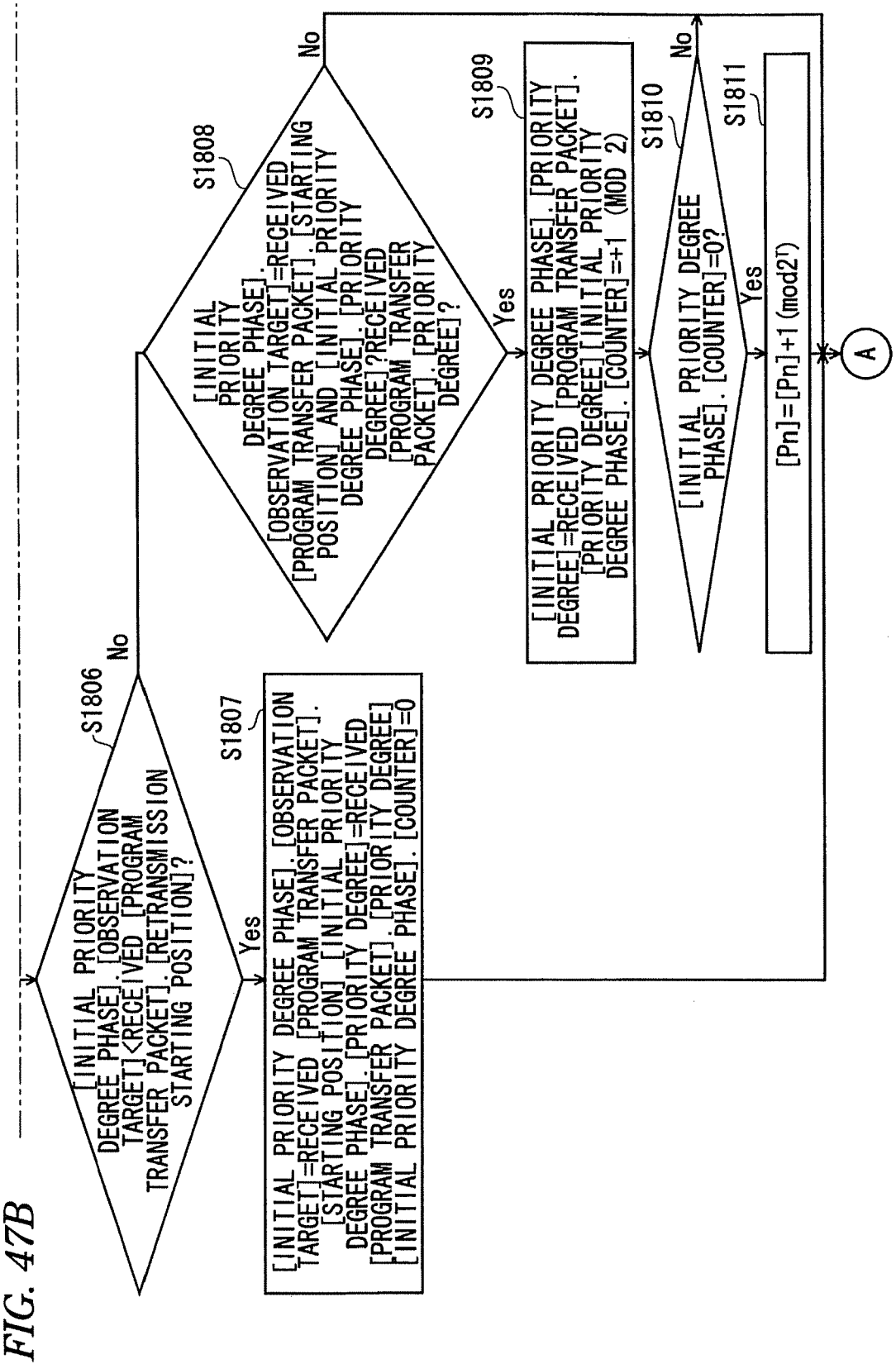

In the above embodiment, it is also possible that a relay apparatus observes a packet at a predetermined division position and advances the phase of the priority degree. Accordingly, in an eighth embodiment described below, the configuration of and the processing by a relay apparatus 20b in the eighth embodiment will be described as a case where the relay apparatus 20b performs control so as to advance the phase of the priority degree whenever receiving a program transfer packet at a division position to which the relay apparatus 20b pays attention, from the contents distribution apparatus a predetermined number of times (three times), with the use of FIGS. 46 to 48. FIG. 46 is a diagram for illustrating an example of the control data configuration of the relay apparatus. FIGS. 47 and 48 are flowcharts illustrating the operation of relay processing by the relay apparatus according to the eighth embodiment.

First, an example of the control data configuration of the relay apparatus 20b according to the eighth embodiment will be described with the use of FIG. 46. As illustrated in FIG. 46, in the initial priority degree phase of the relay apparatus 20b according to the eighth embodiment, there are newly stored an "observation target" indicating the starting position of program transfer packets as an observation target, a "priority degree" indicating the priority degree of the program transfer packet and a "counter" for counting three observations, in comparison with the initial priority degree phase of the relay apparatus 20a according to the fifth embodiment illustrated in FIG. 35.

Next, relay processing by the relay apparatus 20b according to the eighth embodiment will be described. The relay processing by the relay apparatus 20b according to the eighth embodiment is different from the relay processing illustrated in FIGS. 35 and 36 in that, whenever receiving a program transfer packet at a division position to the relay apparatus 20b pays attention, from the contents distribution apparatus a specified number of times (three times), the relay apparatus 20b advances the phase of the priority degree.

Figure 48A:
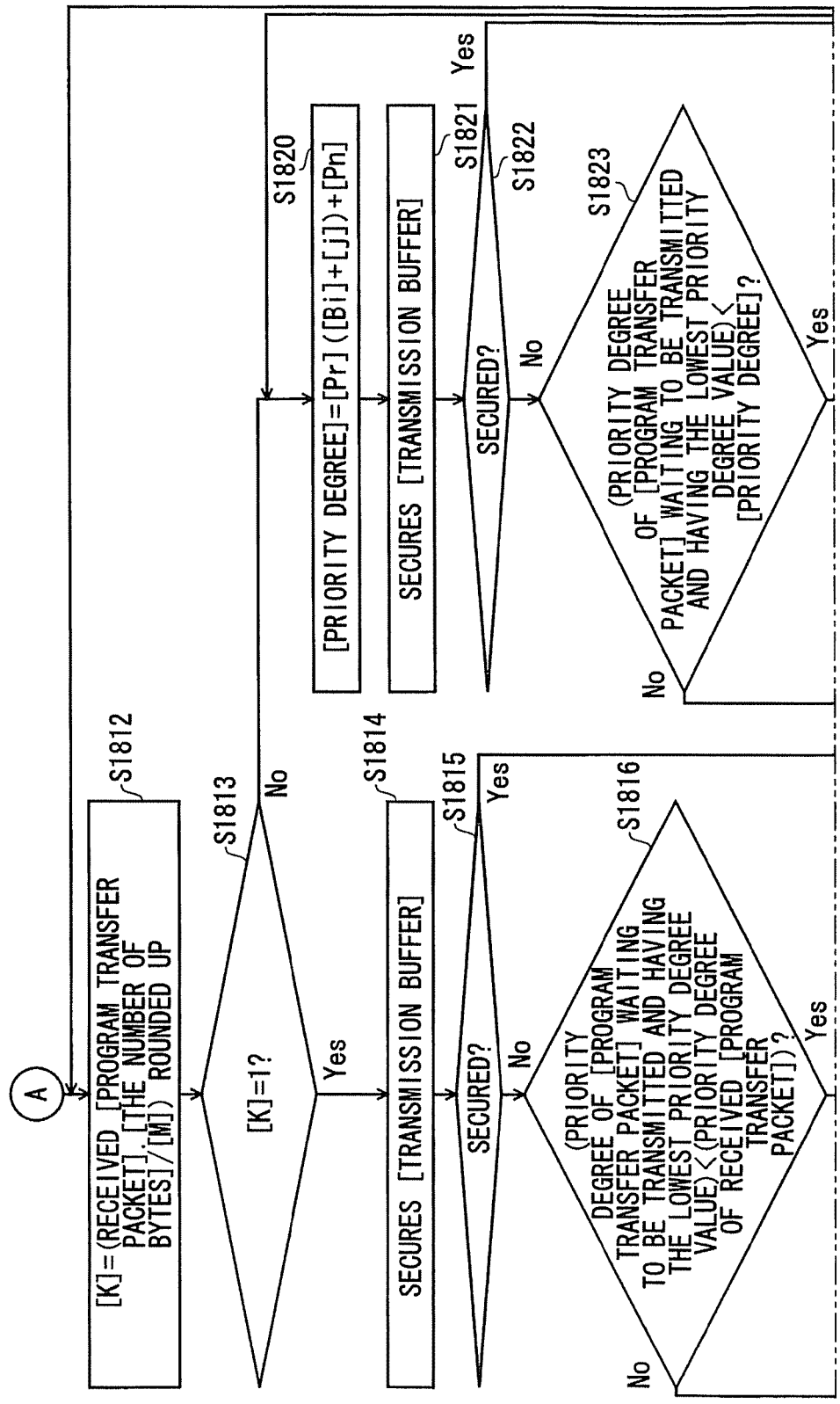
FIGS. 48A and 48B are flowcharts (2) illustrating the operation of the relay processing by the relay apparatus according to the eighth embodiment.
Figure 48B:
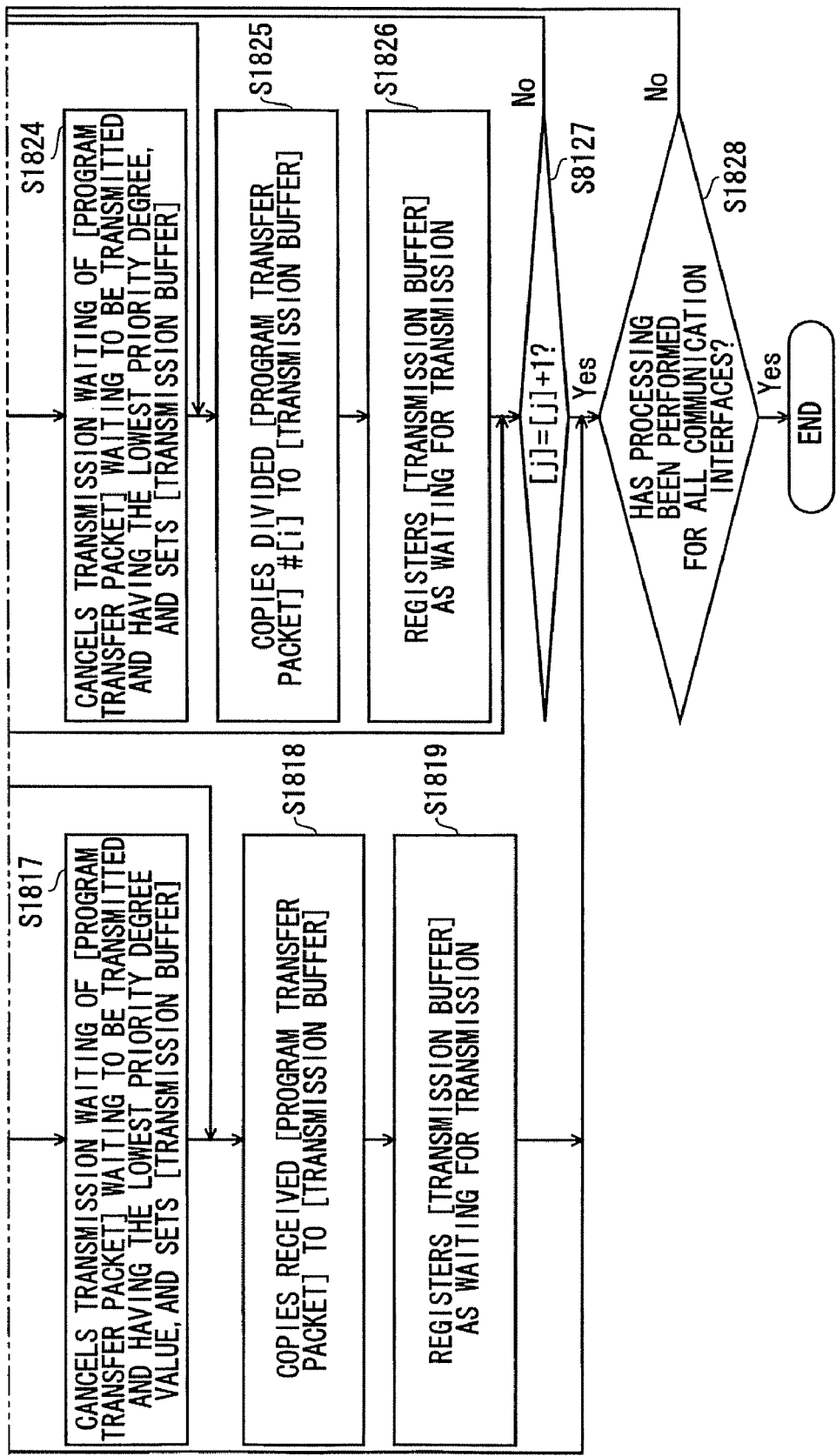

That is, as illustrated in FIGS. 48A and 48B, after updating the expiration in the initial priority degree phase to ten seconds (operation S1805), the relay apparatus 20b judges whether the observation target in the initial priority degree phase is smaller than the retransmission starting position of the received program transfer packet (operation S1806). That is, it is judged whether or not the observation target in the initial priority degree phase is a divided block which has already been received.

As a result, if the observation target in the initial priority degree phase is smaller than the retransmission starting position of the received program transfer packet (operation S1806: YES), the relay apparatus 20b sets the "starting position" of the received program transfer packet as the "observation target" in the initial priority degree phase, sets the "priority degree" of the received program transfer packet as the "priority degree" in the initial priority degree phase, and sets the counter in the "initial priority degree phase" to "0" (operation S1807).

If the observation target in the initial priority degree phase is equal to or larger than the retransmission starting position of the received program transfer packet (operation S1806: NO), the relay apparatus 20b judges whether the observation target in the initial priority degree phase and the starting position of the received program transfer packet are the same and the priority degree in the initial priority degree phase and the priority degree of the received program transfer packet are different from each other (operation S1808).

As a result, if the observation target in the initial priority degree phase and the starting position of the received program transfer packet are the same and the priority degree in the initial priority degree phase and the priority degree of the received program transfer packet are different from each other (operation S1808: YES), the relay apparatus 20b sets the priority degree of the received program transfer packet as the priority degree in the initial priority degree phase, and adds "1" to the counter in the initial priority degree phase (operation S1809).

Then, the relay apparatus 20b judges whether the count in the initial priority degree phase is "0" (operation S1810). That is, the relay apparatus 20b judges whether or not the value obtained by adding "1" to the counter in the initial priority degree phase is "2" and the observation target has been observed three times (operation S1810).

As a result, if the count in the initial priority degree phase is "0" (operation S1810: YES), the relay apparatus 20b adds 1 to the number of transmission rounds "Pn" in the program distribution control data (operation S1811) and advances the priority phase by one. The subsequent relay processing is similar to the relay processing by the relay apparatus according to the fifth embodiment which has been described with reference to FIG. 38.

Figure 49:
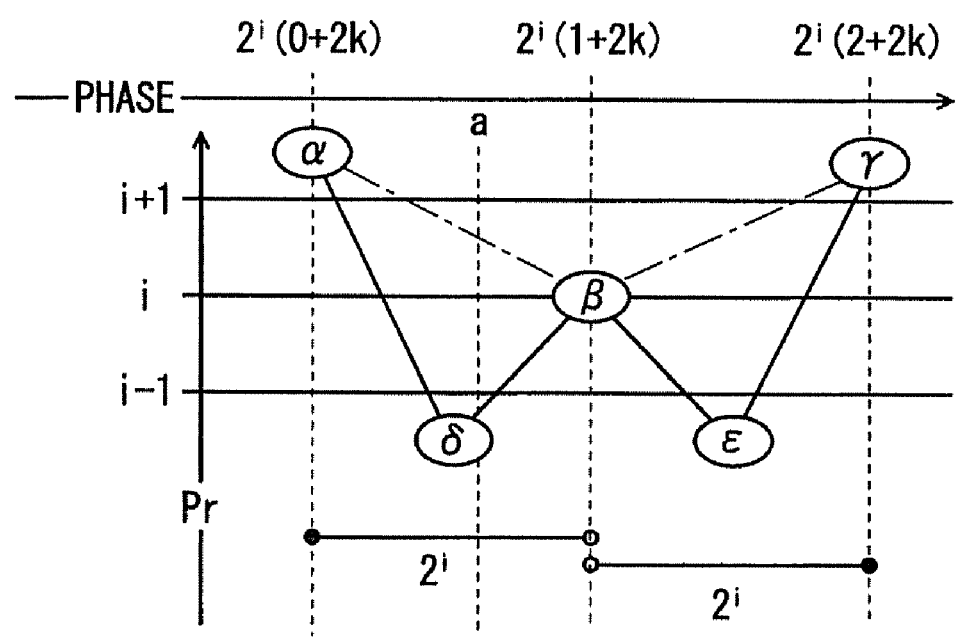
FIG. 49 is a diagram illustrating the relation between speed ratio and the number of rounds required for completion of distribution.

Here, the relation between the speed ratio and the number of rounds required before completion of distribution will be described with the use of FIGS. 49 and 50. FIG. 49 illustrates the principle of the relation between the speed ratio and the number of rounds required before completion of distribution. For example, by giving the priority degree Pr(x) to 2-raised-to-the-power-of-T phases x, there is not a phase having a priority degree equal to or above i among 2-raised-to-the-power-of-i phases before and after [x], including [x], when {PR(X)}=i is satisfied. Thus, when 2-raised-to-the-power-of-i rounds are performed in the case where the speed ratio is larger than 1/(2 raised to the power of i), [x] is definitely selected.

Figure 50:
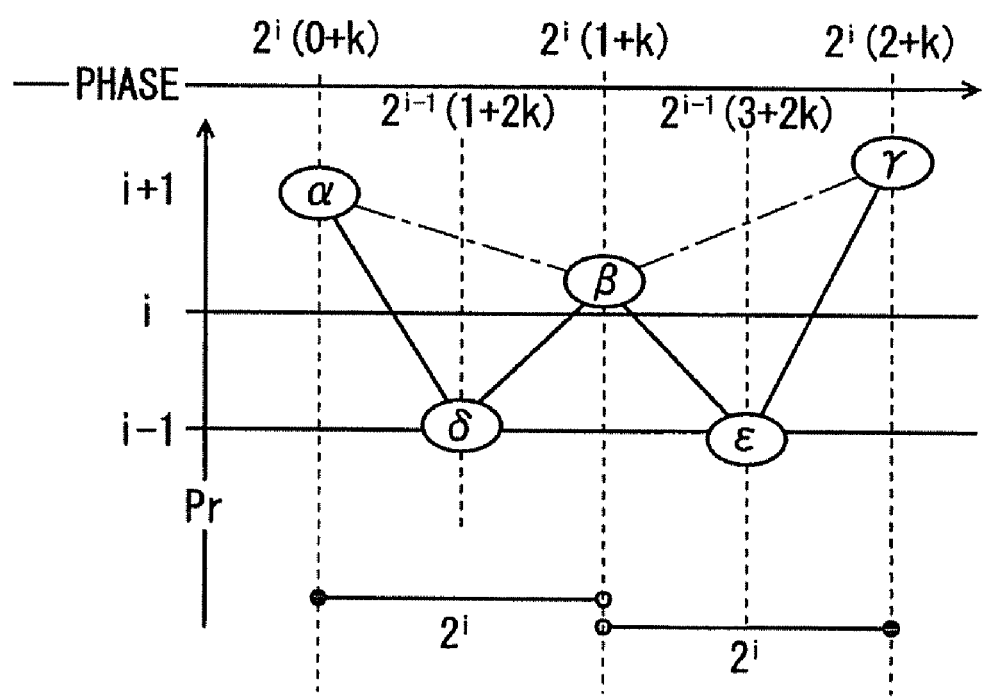
FIG. 50 is a diagram illustrating the relation between speed ratio and distribution accuracy based on the number of detections.

That is, as illustrated in FIG. 50, if the relay apparatus observes a particular observation target [a] three times when the relay apparatus is in an area with a speed ratio equal to or above 1/(2 raised to the power of i), it means that the relay apparatus observes packets having a priority degree equal to or above (i−1) three times. This means that (2 raised to the power of i) rounds have been performed while the three-time observations have been performed. Therefore, as illustrated in FIG. 49, it can be said that all divided data positions have been definitely selected at least once and relay processing has been performed therefor.

Thus, whenever receiving a program transfer packet at a division position which the relay apparatus 20$b$ pays attention to, from the contents distribution apparatus a specified number of times (three times), the relay apparatus 20$b$ performs control so as to advance the phase of the priority degree. Therefore, an advantage is obtained that all packets are efficiently transmitted to the client apparatuses while causing the client apparatuses to receive all the program transfer packets definitely.

Ninth Embodiment

The embodiments of the present invention have been described. However, the present invention may be practiced in various different embodiments other than the embodiments described above. Therefore, other embodiments included in the present invention will be described below as a ninth embodiment.

(1) System Configuration and the Like

The components of each apparatus illustrated in the figures are functionally conceptually illustrated, and they are not necessarily required to be physically configured as illustrated in the figures. That is, a specific form of distribution/integration of each apparatus is not limited to that illustrated in the figures. All or a part of the apparatus can be configured by performing functional or physical distribution/integration in arbitrary units according to various loads or the use state. For example, the data divider 12$a$ and the priority degree setter 12$b$ may be integrated. Furthermore, all or any part of each processing function executed in each apparatus can be realized by a CPU and a program which is analyzed and executed by the CPU or realized as hardware by a wired logic.

Furthermore, among the processes described in the embodiments, all or a part of processing described as being automatically performed can be manually performed, or all or a part of processing described as being manually performed can be automatically performed by a well-known method. In addition, the processes, control procedures, specific names, and information including various data and parameters shown in this document or illustrated in the drawings may be arbitrarily changed unless otherwise specified.

(2) Program

The multicast data distribution method described in the embodiments can be realized by executing a program prepared in advance on a computer such as a personal computer and a workstation. This program can be distributed via a network such as the Internet. It is also possible to execute this program by recording it into a computer-readable recording medium such as a hard disk, flexible disk (FD), CD-ROM, MO and DVD reading it by a computer.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data distribution apparatus comprising:
   a packet divider which divides contents data into multiple contents data and packetizes each of the divided contents data to generate a transfer packet;
   a priority degree setter which assigns a phase to each transfer packet generated by the packet divider according to a position of the transfer packet in the contents data, and sets a priority degree indicating the degree of priority of being transmitted to a transmission destination for each transfer packet to which the phase has been assigned;
   a packet transmitter which sequentially transmits the transfer packets to which the priority degrees have been set by the priority degree setter, beginning at a top of the contents data; and
   a phase controller which changes the phase assigned to each of the transfer packets when each round of transmission of all the transfer packets by the packet transmitter ends.

2. The data distribution apparatus according to claim 1, wherein
   the priority degree setter sets, for the transfer packets, priority degrees in a superposed wave shape which is a shape in which priority and non-priority are alternately repeated and priority and non-priority are also repeated at a 2-raised-to-the-power-of-2 cycle.

3. The data distribution apparatus according to claim 1, wherein
   the packet transmitter adjusts the transmission speed of the transfer packets according to the receiving state of a transmission destination apparatus, which is a transmission destination of the transmission packets, and sequentially transmits the transfer packets at the adjusted transmission speed, beginning at the top of the contents data.

4. The data distribution apparatus according to claim 3, further comprising a receiving state aggregator which receives receiving states from multiple transmission destination apparatuses, which are transmission destinations of the transfer packets, and aggregates the receiving states; wherein
the packet transmitter adjusts the transmission speed of the transfer packets according to the receiving state aggregated by the receiving state aggregator, and sequentially transmits the transfer packets at the adjusted transmission speed, beginning at the top of the contents data.

5. The data distribution apparatus according to claim 1, wherein, when receiving information about a received transfer packet from a transmission destination apparatus which is a transmission destination of the transfer packets, the packet transmitter transmits transfer packets, skipping the received transfer packet.

6. A relay apparatus comprising:
a data divider which subdivides transfer packets transmitted from a data distribution apparatus;
a priority degree setter which assigns a phase to each transfer packet subdivided by the packet subdivider according to a position of the transfer packet in the whole contents data, and resets a priority degree corresponding to the phase for each of the transfer packets;
a packet relay which sequentially relays the transfer packets for which the priority degrees have been set by the priority degree resetter, beginning at the top of the contents data; and
a phase controller which changes the phase assigned to each of the transfer packets when receiving a first of the transfer packets from the data distribution apparatus.

7. A data distribution method comprising:
dividing contents data into multiple contents data and packetizing each of the divided contents data to generate transfer packets;
assigning a phase to each of the transfer packets according to a position of the transfer packet in the whole contents data, and setting a priority degree indicating the degree of priority of being transmitted to a transmission destination for each of the transfer packets to which the phase has been assigned;
sequentially transmitting the transfer packets to which the priority degrees have been set, beginning at the top of the contents data; and
changing the phase assigned to each of the transfer packets when each round of transmission of the transfer packets ends.

8. A non-transitory computer readable recording medium storing a data distribution program which when executed causes a computer to perform the following operations:
dividing contents data into multiple contents data and packetizing each of the divided contents data to generate transfer packets;
a assigning a phase to each of the transfer packets generated by the packet division procedure according to a position of the transfer packet in the whole contents data, and setting a priority degree indicating the degree of priority of being transmitted to a transmission destination for each transfer packet to which the phase has been assigned;
sequentially transmitting the transfer packets to which the priority degrees have been set by the priority degree setting procedure, beginning at the top of the contents data; and
changing the phase assigned to each of the transfer packets when each round of transmission of all the transfer packets by the packet transmission procedure ends.

\* \* \* \* \*